United States Patent
Ishii

(10) Patent No.: US 10,959,207 B2
(45) Date of Patent: Mar. 23, 2021

(54) WIRELESS TELECOMMUNICATIONS METHODS AND APPARATUS USING SYSTEM INFORMATION VALUE TAG

(71) Applicant: Sharp Kabushiki Kaisha, Sakai (JP)

(72) Inventor: Atsushi Ishii, Vancouver, WA (US)

(73) Assignees: SHARP KABUSHIKI KAISHA, Sakai (JP); FG Innovation Company Limited, Tuen Mun (HK)

( * ) Notice: Subject to any disclaimer, the term of this patent is extended or adjusted under 35 U.S.C. 154(b) by 0 days.

(21) Appl. No.: 15/659,085

(22) Filed: Jul. 25, 2017

(65) Prior Publication Data

US 2018/0063815 A1 Mar. 1, 2018

Related U.S. Application Data

(60) Provisional application No. 62/378,562, filed on Aug. 23, 2016.

(51) Int. Cl.

| | |
|---|---|
| *H04W 72/00* | (2009.01) |
| *H04W 48/12* | (2009.01) |
| *H04W 72/12* | (2009.01) |
| *H04W 64/00* | (2009.01) |
| *H04W 88/02* | (2009.01) |
| *H04W 88/08* | (2009.01) |

(52) U.S. Cl.
CPC ......... *H04W 72/005* (2013.01); *H04W 48/12* (2013.01); *H04W 72/1205* (2013.01); *H04W 64/00* (2013.01); *H04W 88/02* (2013.01); *H04W 88/08* (2013.01)

(58) Field of Classification Search
CPC ..... H04W 4/70; H04W 72/042; H04W 76/27; H04W 68/02; H04W 72/005; H04W 72/04; H04W 52/0216; H04W 88/08; H04W 4/02; H04W 72/0406; H04W 24/02; H04W 72/1205; H04W 48/12; H04W 64/00; H04W 88/02; H04L 5/0035

See application file for complete search history.

(56) References Cited

U.S. PATENT DOCUMENTS

| | | | | |
|---|---|---|---|---|
| 6,628,946 B1 * | 9/2003 | Wiberg | ................. | H04W 48/12 455/434 |
| 8,538,444 B2 | 9/2013 | Lee et al. | | |
| 10,341,941 B2 * | 7/2019 | Ishii | ...................... | H04W 48/12 |
| 2008/0125043 A1 * | 5/2008 | Karmanenko | ........ | H04W 12/10 455/41.2 |
| 2008/0287134 A1 * | 11/2008 | Catovic | ................. | H04W 68/02 455/445 |

(Continued)

FOREIGN PATENT DOCUMENTS

| | | |
|---|---|---|
| CN | 1371576 A | 9/2002 |
| CN | 105580399 A | 5/2016 |

(Continued)

OTHER PUBLICATIONS

Agiwal et al., U.S. Appl. No. 62/301,016, filed Feb. 29, 2016.*

(Continued)

*Primary Examiner* — Daniel Lai
(74) *Attorney, Agent, or Firm* — ScienBiziP, P.C.

(57) ABSTRACT

A geographical area identifier which specifies a geographical area for which a value tag is valid is used for assessing second type system information available from an access node.

12 Claims, 50 Drawing Sheets

(56) References Cited

U.S. PATENT DOCUMENTS

| | | | |
|---|---|---|---|
| 2009/0262693 A1 | 10/2009 | Wang et al. | |
| 2010/0022250 A1* | 1/2010 | Petrovic | H04J 11/0093 455/450 |
| 2010/0227611 A1 | 9/2010 | Schmidt et al. | |
| 2011/0103288 A1 | 5/2011 | Lee et al. | |
| 2011/0320856 A1* | 12/2011 | Deivasigamani | H04L 1/0053 714/2 |
| 2012/0300725 A1* | 11/2012 | Kwon | H04L 1/0027 370/329 |
| 2015/0201368 A1* | 7/2015 | Cudak | H04W 48/12 370/329 |
| 2015/0382284 A1 | 12/2015 | Brismar | |
| 2016/0021483 A1* | 1/2016 | Wei | H04W 4/70 455/41.2 |
| 2016/0174135 A1* | 6/2016 | Yan | H04W 76/10 455/434 |
| 2017/0251500 A1* | 8/2017 | Agiwal | H04W 4/06 |
| 2017/0280372 A1* | 9/2017 | Martin | H04W 16/26 |

FOREIGN PATENT DOCUMENTS

| | | | | |
|---|---|---|---|---|
| EP | 1 686 826 A2 | 8/2006 | | |
| EP | 1686826 A2 | 8/2006 | | |
| EP | 2 816 741 A2 | 12/2014 | | |
| EP | 2943015 A1 * | 11/2015 | | H04W 48/12 |
| WO | WO 2008/044664 A1 | 4/2008 | | |

OTHER PUBLICATIONS

R2-163853, 3GPP TSG-RAN WG2 Meeting #94, ETRI, "System information handling in NR", Nanjing, China, May 23-27, 2016.
R2-163743, 3GPP TSG-RAN WG2 Meeting #94, ZTE, "Consideration on the System Information in NR", Nanjing, P.R. China, May 23-27, 2016.
R2-163586, 3GPP TSG-RAN WG2 Meeting #94, Intel Corporation, "System information for standalone NR deployment", Nanjing, China, May 23-27, 2016.
R2-163470, 3GPP TSG RAN WG2 Meeting #94, CATT, "System information in NR", Nanjing, China, May 23-27, 2016.
R2-163371, 3GPP TSG-RAN WG2 Meeting #94, Samsung, "System Information Signalling Design in NR", Nanjing, China, May 23-27, 2016.
R2-164127, 3GPP TSG-RAN2 Meeting #94, Huawei, HiSilicon, "System information design", Nanjing, China, May 23-27, 2016.
R2-164122, 3GPP TSG-RAN WG2 Meeting #94, Qualcomm Incorporated, Convida Wireless, "NR System Information Provisioning", Nanjing, China May 23-27, 2016.
Tdoc R2-164088, 3GPP TSG-RAN WG2 #94, InterDigital Communications, "System Information Acquisition for New Radio Access", Nanjing, China, May 23-27, 2016.
R2-164078, 3GPP TSG-RAN WG2 #94 R2-164078, LG Electronics Inc., "Observations about on-demand SI delivery mechanism", Nanjing, China, May 23-27, 2016.
R2-164067, 3GPP TSG-RAN WG2 Meeting #94, Convida Wireless, "NR System Information Aspects", Nanjing, China, May 23-27, 2016 China.
Tdoc R2-164006, 3GPP TSG-RAN WG2 #94, Ericsson, "Requirements for System Information distribution", Nanjing, P.R. China, May 23-27, 2016.
Tdoc R2-163997, 3GPP TSG-RAN WG2 #94, Ericsson, "Solution principles for system information distribution", Nanjing, P.R. China, May 23-27, 2016.
R2-163980, 3GPP TSG RAN WG2 Meeting #94, NEC, "System information on demand in standalone NR", Nanjing, China, May 23-27, 2016.
R2-163977, 3GPP TSG RAN WG2 Meeting #94, Sony, "System Information Enhancements for NR", Nanjing, China, May 23-27, 2016.
R2-163975, 3GPP TSG-RAN WG2 #94, NTT Docomo, Inc., "System Information design for standalone NR operation", Nanjing, China, May 23-27, 2016.
International Preliminary Report on Patentability dated Feb. 26, 2019 in PCT application PCT/US2017/043589.
Final Office Action dated Nov. 27, 2019 in U.S. Appl. No. 16/433,844.
R2-161140, 3GPP TSG RAN WG2 Meeting #93, Sony, "System Information Area Scope and Value Tag", St. Julian's, Malta, Feb. 15-19, 2016.
R2-165007, 3GPP TSG-RAN WG2 Meeting #95, Intel Corporation, "System Information for standalone NR deployment", Gothenberg, Sweden, Aug. 22-26, 2016.
Intel Corporation, "System information for standalone NR deployment", 3GPP Draft; R2-165007, 3rd Generation Partnership Project (3GPP), Mobile Competence Centre: 650, Route Des Lucioles; F-06921 Sophia-Antipolis Cedex; France, vol. RAN WG2, No. Gothenburg, Sweden; Aug. 22, 2016-Aug. 26, 2016, Aug. 21, 2016 (Aug. 21, 2016), XP051126648, Retrieved from the Internet: URL:http://www.3gpp.org/ftp/Meetings-3GPP-SYNC-RAN2/Docs/ [retrieved on Aug. 21, 2016]*Section 2.4*.
Sony, "System Information Area Scope and Value Tag", 3GPP Draft; R2-161140-NBIOT SIB, 3rd Generation Partnership Project (3GPP), Mobile Competence Centre; 650, Route Des Lucioles; F-06921 Sophia-Antipolis Cedex; France, vol. RAN WG2, No. St. Julian's, Malta; Feb. 15, 2016-Feb. 19, 2016, Feb. 14, 2016 (Feb. 14, 2016), XP051055124, Retrieved from the Internet: URL:http://www.3gpp.org/ftp/Meetings-3GPP-SYNC/RAN2/Docs/ [retrieved on Feb. 14, 2016] * Section 2 *.

* cited by examiner

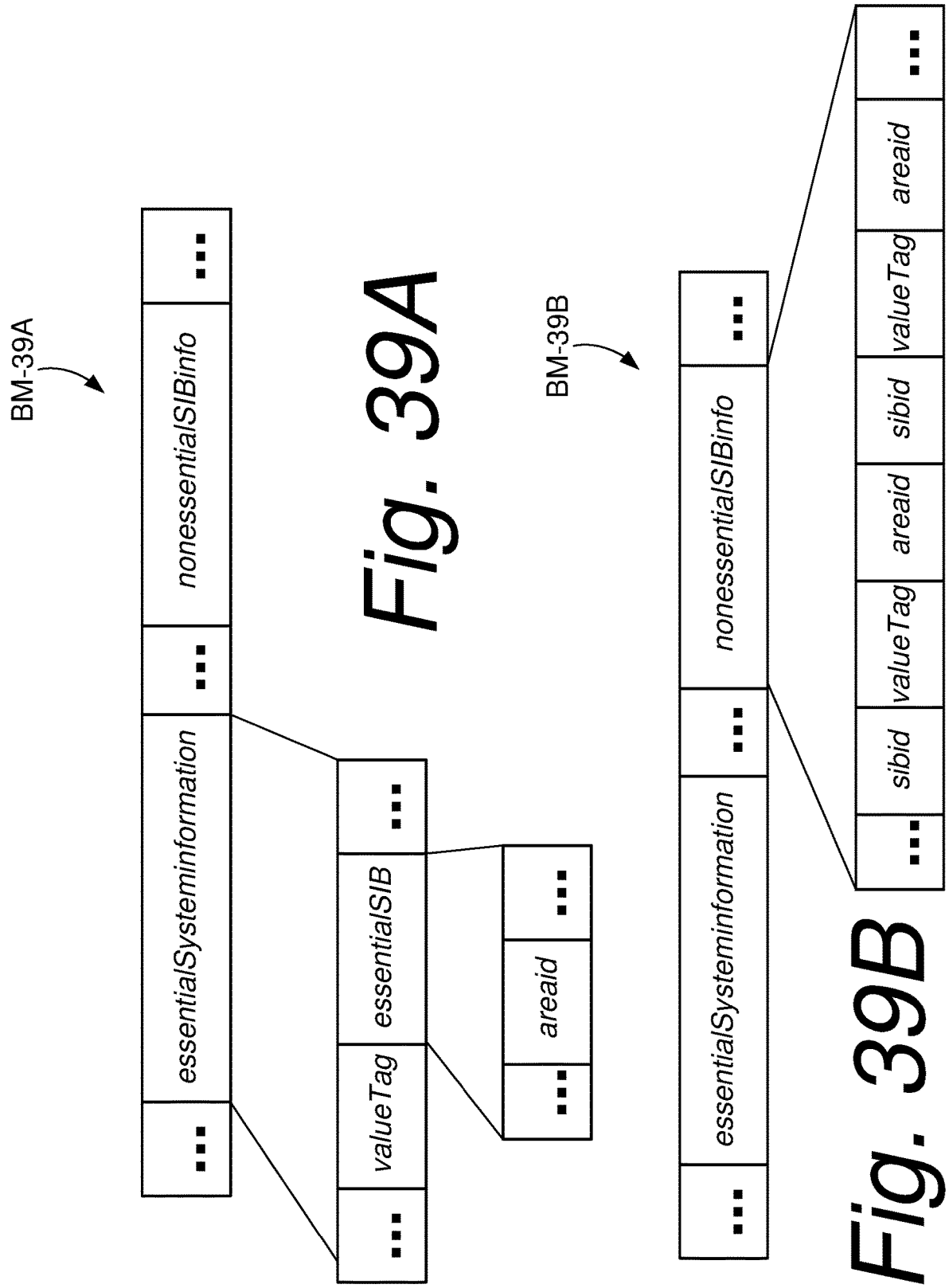

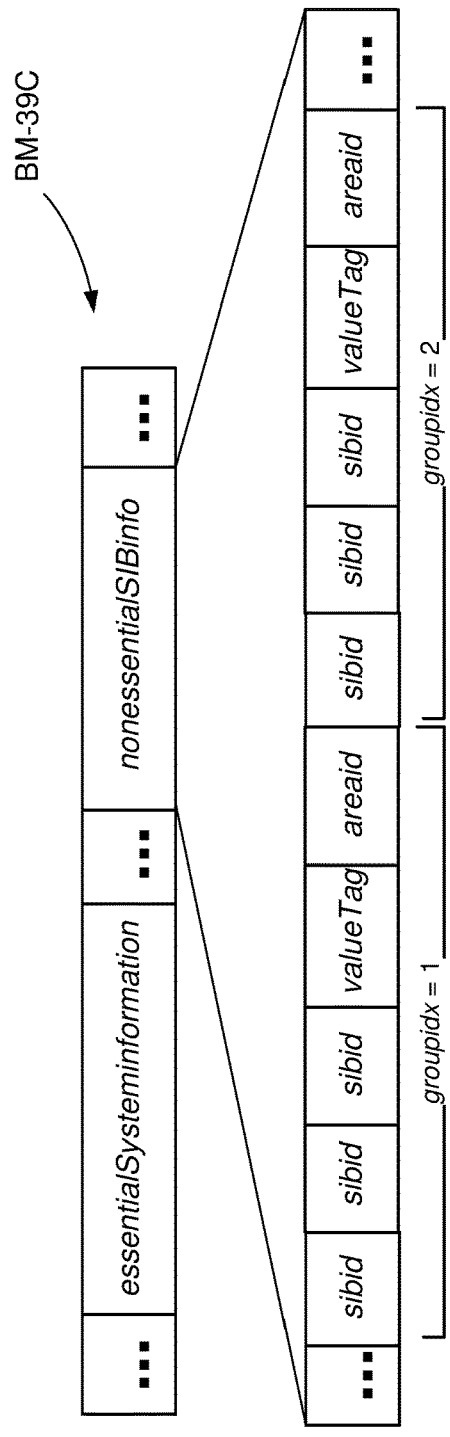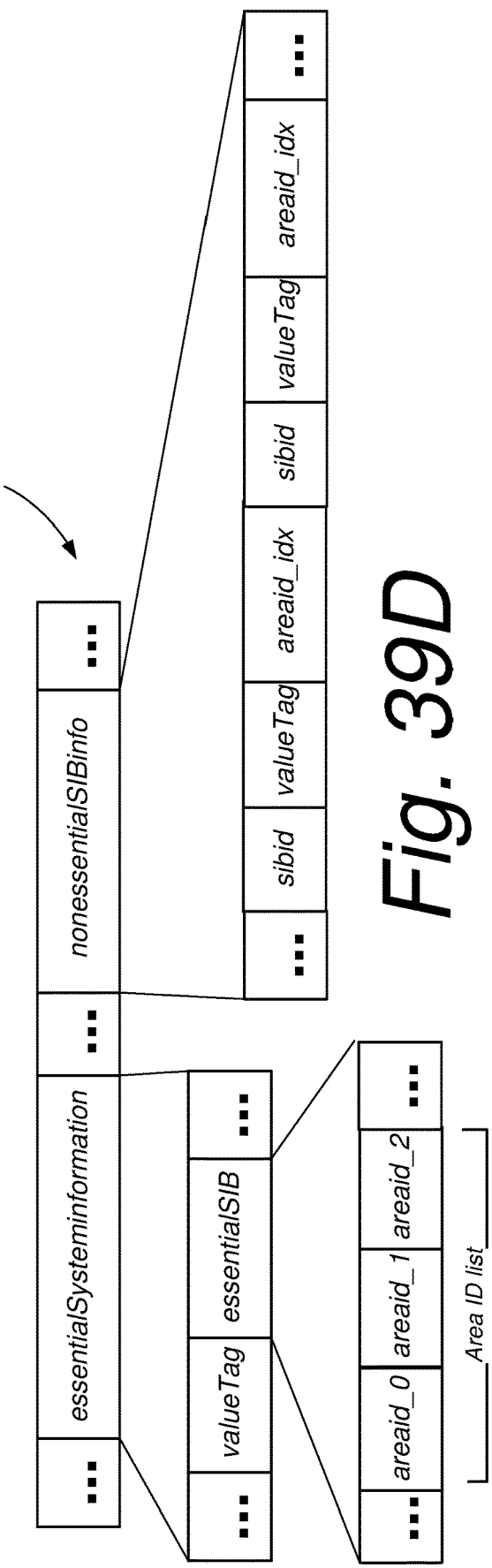

US 10,959,207 B2

WIRELESS TELECOMMUNICATIONS METHODS AND APPARATUS USING SYSTEM INFORMATION VALUE TAG

This application claims the priority and benefit of U.S. Provisional Patent application 62/378,562, filed Aug. 23, 2016, which is incorporated herein by reference in its entirety.

TECHNICAL FIELD

The technology relates to wireless communications, and particularly to methods and apparatus for requesting, transmitting, and using system information (SI) in wireless communications.

BACKGROUND

In wireless communication systems, a radio access network generally comprises one or more access nodes (such as a base station) which communicate on radio channels over a radio or air interface with plural wireless terminals. In some technologies such a wireless terminal is also called a User Equipment (UE). A group known as the 3rd Generation Partnership Project ("3GPP") has undertaken to define globally applicable technical specifications and technical reports for present and future generation wireless communication systems. The 3GPP Long Term Evolution ("LTE") and 3GPP LTE Advanced (LTE-A) are projects to improve an earlier Universal Mobile Telecommunications System ("UMTS") mobile phone or device standard in a manner to cope with future requirements.

In typical cellular mobile communication systems, the base station broadcasts on the radio channels certain information which is required for mobile stations to access to the network. In Long-Term Evolution (LTE) and LTE Advanced (LTE-A), such information is called "system information" ("SI"). Each access node, such as an evolved NodeB ("eNB"), broadcasts such system information to its coverage area via several System Information Blocks (SIBs) on downlink radio resources allocated to the access node.

A wireless terminal ("UE"), after entering a coverage area of an eNB, is required to obtain all the SIBs which are necessary to access to the system. For sake of UEs under coverage, the eNB periodically broadcasts all SIBs relevant for offered services, not just SIBs that are required for access to the system. Each type of SIBs is transmitted in a designated radio resource(s) with its own pre-determined/configurable frequency.

This all-broadcast-based periodic delivery method (e.g., collective broadcast of all SIBs, not just those necessary for system access) is efficient under a condition where many UEs are almost always flowing into the coverage area (such as a macro cell). However, this approach may result in wasting valuable radio resources in case of small cell deployment. Therefore, more efficient methods of SIB transmission are desired.

What is needed, therefore, and an example object of the technology disclosed herein, are methods, apparatus, and techniques for more efficient transmission of system information blocks (SIBs).

SUMMARY

In one of its example aspects the technology disclosed herein concerns an access node of a radio access network. The access node comprises processor circuitry and a transmitter. The processor circuitry configured to schedule periodic transmission of a broadcast message, the broadcast message comprising: first type system information; identification of second type system information available from the access node; a value tag associated with the second type system information; and a geographical area identifier which specifies a geographical area for which the value tag is valid, the geographical area being served by the access node and a group comprising at least one other access node. The transmitter is configured to transmit the broadcast message over a radio interface.

In another of its example aspects the technology disclosed herein concerns an access node of a radio access network comprising processor circuitry and a transmitter, wherein the processor circuitry is configured to generate check information based on content of system information available at the access node and the transmitter is configured to transmit the check information over a radio interface.

In another of its example aspects, an access node of a radio access network comprises receiver circuitry and processor circuitry. The receiver circuitry is configured to receive a message over a radio interface from a wireless terminal. The processor circuitry is configured: to perform an analysis upon check information included in the received message, the check information being based on content of system information believed current by the wireless terminal, the analysis comprising a comparison of the check information included in the received message with check information derived by the access node with respect to content of the system information deemed current by the access node; and to generate a response message for the wireless terminal in accordance with the analysis. The transmitter is configured to transmit the response message over the radio interface to the wireless terminal.

In another of its aspects the technology disclosed herein concerns an access node of a radio access network comprising processor circuitry and transmitter circuitry. The processor circuitry is configured: to include system information in a message for transmission over a radio interface to a wireless terminal, the system information facilitating use of communication services provided by the access node; and to include in a message to the wireless terminal a validity timer value, the validity timer value specifying a time period during which content of the system information remains valid in a geographical area served by the access node and a group comprising at least one other access node. The transmitter circuitry is configured to transmit messages to the wireless terminal over the radio interface.

In another of its aspects the technology disclosed herein concerns a method in an access node of a radio access network. In a basic mode the method comprises: scheduling periodic transmission of a broadcast message. The broadcast message comprises: first type system information; identification of second type system information available from the access node; a value tag associated with the second type system information; and, a geographical area identifier which specifies a geographical area for which the value tag is valid, the geographical area being served by the access node and a group comprising at least one other access node. The method further comprises transmitting the broadcast message over a radio interface.

In another of its aspects the technology disclosed herein concerns a method in an access node of a radio access network. In a basic mode the method comprises: generating check information based on content of system information available at the access node; and transmitting the check information over a radio interface.

In another of its aspects the technology disclosed herein concerns a method in an access node of a radio access network. In a basic mode the method comprises: receiving a message over a radio interface from a wireless terminal; performing an analysis upon check information included in the received message, the check information being based on content of system information believed current by the wireless terminal, the analysis comprising a comparison of the check information included in the received message with check information derived by the access node with respect to content of the system information deemed current by the access node; generating a response message for the wireless terminal in accordance with the analysis; and, transmitting the response message over the radio interface to the wireless terminal.

In another of its aspects the technology disclosed herein concerns a method in an access node of a radio access network. In a basic mode the method comprises: generating a validity timer value which specifies a time period during which content of system information facilitating use of communication services provided by the access node remains valid in a geographical area served by the access node and a group comprising at least one other access node; and, transmitting the value timer value to the wireless terminal over the radio interface.

In another of its example aspects the technology disclosed herein concerns a wireless terminal comprising: a receiver and processor circuitry. The receiver configured is to receive from a first access node: first type system information; second type system information; a value tag associated with the second type system information; and, a geographical area identifier which specifies a geographical area for which the value tag is valid, the geographical area being served by the access node and a group comprising at least one other access node. The receiver is further configured to camp on a cell served by a second access node. The processor circuitry is configured to make a determination regarding applicability of the second type system information to the cell served by the second access node at least partially in dependence on the geographical area identifier.

In another of its aspects the technology disclosed herein concerns a wireless terminal comprising a receiver and processor circuitry. The receiver is configured to receive from an access node: first type system information; second type system information; a value tag associated with the second type system information; and, a geographical area identifier which specifies a geographical area for which the value tag is valid, the geographical area being served by the access node and a group comprising at least one other access node. The processor circuitry is configured to make a determination regarding applicability of the second type system information to a cell served by the access node at least partially in dependence on the geographical area identifier and a validity timer value, the validity timer value specifying a time period during which the second type system information system information obtained from the first access node remains valid in the geographical area.

In another of its aspects the technology disclosed herein concerns a wireless terminal comprising a receiver and processor circuitry. The receiver is configured to receive from a first access node: first type system information; second type system information; a value tag associated with the second type system information; and, if provided by the first access node, a geographical area identifier which specifies a geographical area for which the value tag is valid, the geographical area being served by the access node and a group comprising at least one other access node. The receiver is also configured to camp on a cell served by a second access node. The processor circuitry is configured to make a first determination regarding provision by the first access node of the geographical area identifier and on the basis of the first determination to make a second determination regarding applicability of the second type system information to the cell served by the second access node.

In another of its aspects the technology disclosed herein concerns a method in a wireless terminal. The method comprises receiving from a first access node: first type system information; second type system information; a value tag associated with the second type system information; a geographical area identifier which specifies a geographical area for which the value tag is valid, the geographical area being served by the access node and a group comprising at least one other access node; camping on a cell served by a second access node; and, making a determination regarding applicability of the second type system information to the cell served by the second access node at least partially in dependence on the geographical area identifier.

In another of its aspects the technology disclosed herein concerns a method in a wireless terminal. The method comprises receiving from an access node: first type system information; second type system information; a value tag associated with the second type system information; a geographical area identifier which specifies a geographical area for which the value tag is valid, the geographical area being served by the access node and a group comprising at least one other access node; and, a validity timer value, the validity timer value specifying a time period during which the second type system information system information obtained from the first access node remains valid in the geographical area. The method further comprises making a determination regarding applicability of the second type system information to a cell served by the access node at least partially in dependence on the geographical area identifier and the validity timer value.

In another of its example aspects the technology disclosed herein concerns method in a wireless terminal. The method comprises receiving from a first access node: first type system information; second type system information; a value tag associated with the second type system information; and, if provided by the first access node, a geographical area identifier which specifies a geographical area for which the value tag is valid, the geographical area being served by the access node and a group comprising at least one other access node. The method further comprises making a first determination regarding provision by the first access node of the geographical area identifier and on the basis of the first determination to make a second determination regarding applicability of the second type system information to a cell served by the second access node.

BRIEF DESCRIPTION OF THE DRAWINGS

The foregoing and other objects, features, and advantages of the technology disclosed herein will be apparent from the following more particular description of preferred embodiments as illustrated in the accompanying drawings in which reference characters refer to the same parts throughout the various views. The drawings are not necessarily to scale, emphasis instead being placed upon illustrating the principles of the technology disclosed herein.

FIG. 39A-FIG. 39E are diagrammatic views showing various different manners of inclusion/obtaining geographical area identifier from respectively differently formatted broadcast messages.

FIG. 53 is a schematic view showing an example communications system comprising a radio access node and a wireless terminal, and wherein

DETAILED DESCRIPTION

Figure 1:
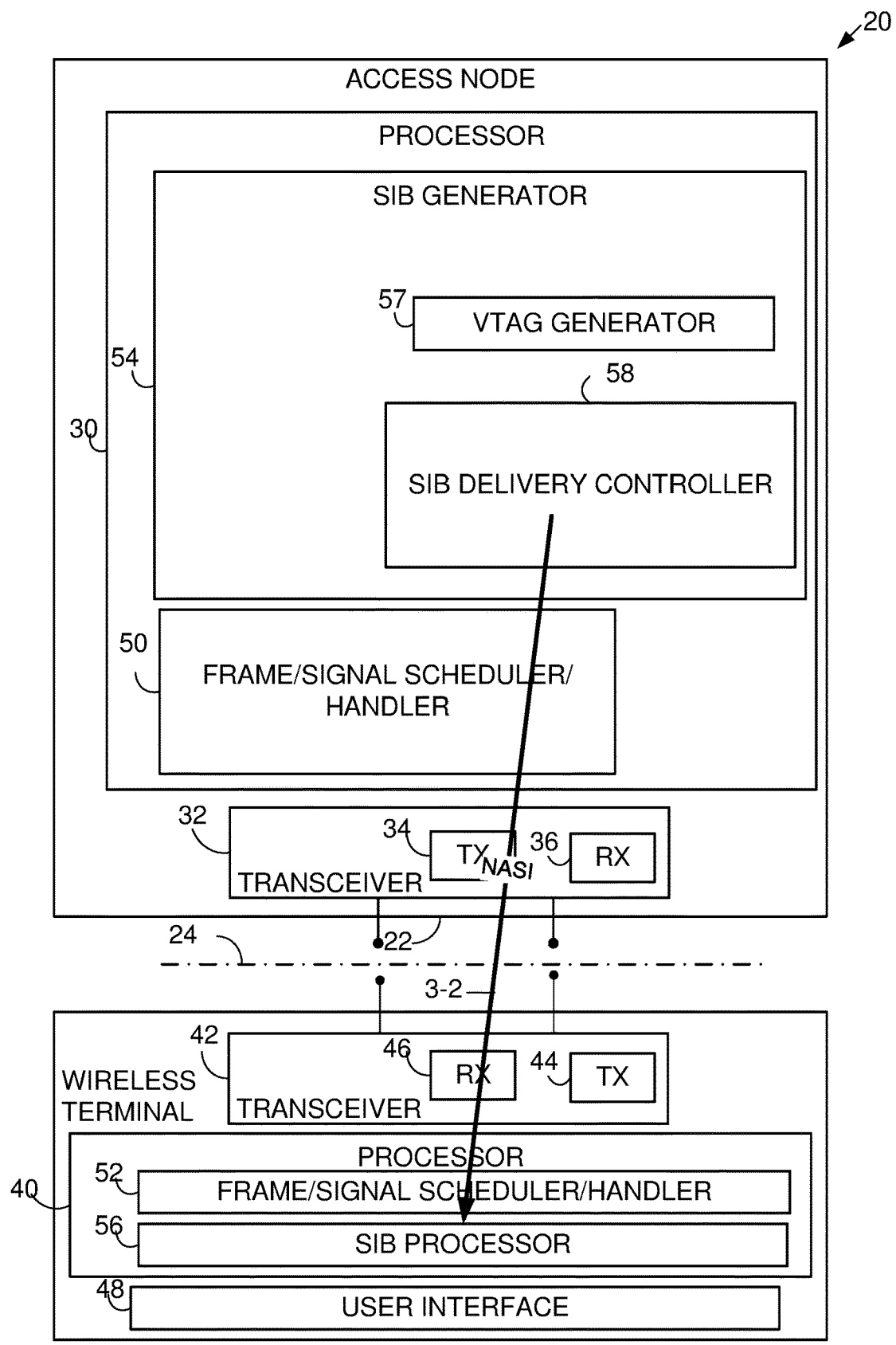
FIG. 1 is a schematic view showing an example communications system comprising a radio access node and a wireless terminal, and wherein the radio access node provides a value tag for system information (SI).

In the following description, for purposes of explanation and not limitation, specific details are set forth such as particular architectures, interfaces, techniques, etc. in order to provide a thorough understanding of the technology disclosed herein. However, it will be apparent to those skilled in the art that the technology disclosed herein may be practiced in other embodiments that depart from these specific details. That is, those skilled in the art will be able to devise various arrangements which, although not explicitly described or shown herein, embody the principles of the technology disclosed herein and are included within its spirit and scope. In some instances, detailed descriptions of well-known devices, circuits, and methods are omitted so as not to obscure the description of the technology disclosed herein with unnecessary detail. All statements herein reciting principles, aspects, and embodiments of the technology disclosed herein, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that block diagrams herein can represent conceptual views of illustrative circuitry or other functional units embodying the principles of the technology. Similarly, it will be appreciated that any flow charts, state transition diagrams, pseudocode, and the like represent various processes which may be substantially represented in computer readable medium and so executed by a computer or processor, whether or not such computer or processor is explicitly shown.

As used herein, the term "core network" can refer to a device, group of devices, or sub-system in a telecommunication network that provides services to users of the telecommunications network. Examples of services provided by a core network include aggregation, authentication, call switching, service invocation, gateways to other networks, etc.

As used herein, the term "wireless terminal" can refer to any electronic device used to communicate voice and/or data via a telecommunications system, such as (but not limited to) a cellular network. Other terminology used to refer to wireless terminals and non-limiting examples of such devices can include user equipment terminal, UE, mobile station, mobile device, access terminal, subscriber station, mobile terminal, remote station, user terminal, terminal, subscriber unit, cellular phones, smart phones, personal digital assistants ("PDAs"), laptop computers, netbooks, e-readers, wireless modems, etc.

As used herein, the term "access node", "node", or "base station" can refer to any device or group of devices that facilitates wireless communication or otherwise provides an interface between a wireless terminal and a telecommunications system. A non-limiting example of a base station can include, in the 3GPP specification, a Node B ("NB"), an enhanced Node B ("eNB"), a home eNB ("HeNB"), a 5G (New Radio [NR]) gNB, or some other similar terminology. Another non-limiting example of a base station is an access point. An access point may be an electronic device that provides access for wireless terminal to a data network, such as (but not limited to) a Local Area Network ("LAN"), Wide Area Network ("WAN"), the Internet, etc. Although some examples of the systems and methods disclosed herein may be described in relation to given standards (e.g., 3GPP Releases 8, 9, 10, 11, and/or 12), the scope of the present disclosure should not be limited in this regard. At least some aspects of the systems and methods disclosed herein may be utilized in other types of wireless communication systems.

As used herein, the term "telecommunication system" or "communications system" can refer to any network of devices used to transmit information. A non-limiting example of a telecommunication system is a cellular network or other wireless communication system.

As used herein, the term "cellular network" can refer to a network distributed over cells, each cell served by at least one fixed-location transceiver, such as a base station. A "cell" may be any communication channel that is specified by standardization or regulatory bodies to be used for International Mobile Telecommunications-Advanced ("IMTAdvanced"). All or a subset of the cell may be adopted by 3GPP as licensed bands (e.g., frequency band) to be used for communication between a base station, such as a Node B, and a UE terminal. A cellular network using licensed frequency bands can include configured cells. Configured cells can include cells of which a UE terminal is aware and in which it is allowed by a base station to transmit or receive information.

FIG. 1 shows an example communications system 20 wherein radio access node 22 communicates over air or radio interface 24 (e.g., Uu interface) with wireless terminal 26. As mentioned above, the radio access node 22 may be any suitable node for communicating with the wireless terminal 26, such as a base station node, or eNodeB ("eNB"), for example. The node 22 comprises node processor circuitry ("node processor 30") and node transceiver circuitry 32. The node transceiver circuitry 32 typically comprises node transmitter circuitry 34 and node receiver circuitry 36, which are also called node transmitter and node receiver, respectively.

The wireless terminal 26 comprises terminal processor 40 and terminal transceiver circuitry 42. The terminal transceiver circuitry 42 typically comprises terminal transmitter circuitry 44 and terminal receiver circuitry 46, which are also called terminal transmitter 44 and terminal receiver 46, respectively. The wireless terminal 26 also typically comprises user interface 48. The terminal user interface 48 may serve for both user input and output operations, and may comprise (for example) a screen such as a touch screen that can both display information to the user and receive information entered by the user. The user interface 48 may also include other types of devices, such as a speaker, a microphone, or a haptic feedback device, for example.

For both the radio access node 22 and radio interface 24, the respective transceiver circuitries 22 include antenna(s). The respective transmitter circuits 34 and 44 may comprise, e.g., amplifier(s), modulation circuitry and other conventional transmission equipment. The respective receiver circuits 36 and 46 may comprise, e.g., e.g., amplifiers, demodulation circuitry, and other conventional receiver equipment.

In general operation node, 22 and wireless terminal 26 communicate with each other across radio interface 24 using predefined configurations of information. By way of non-limiting example, the radio access node 22 and wireless terminal 26 may communicate over radio interface 24 using "frames" of information that may be configured to include various channels. In Long Term Evolution (LTE), for example, a frame, which may have both downlink portion(s) and uplink portion(s), may comprise plural subframes, with each LTE subframe in turn being divided into two slots. The frame may be conceptualized as a resource grid (a two dimensional grid) comprised of resource elements (RE). Each column of the two dimensional grid represents a symbol (e.g., an OFDM symbol on downlink (DL) from node to wireless terminal; an SC-FDMA symbol in an uplink (UL) frame from wireless terminal to node). Each row of the grid represents a subcarrier. The frame and subframe structure serves only as an example of a technique of formatting of information that is to be transmitted over a radio or air interface. It should be understood that "frame" and "subframe" may be utilized interchangeably or may include or be realized by other units of information formatting, and as such may bear other terminology (such as blocks, for example).

To cater to the transmission of information between radio access node 22 and wireless terminal 26 over radio interface 24, the node processor 30 and terminal processor 40 of FIG. 1 are shown as comprising respective information handlers. For an example implementation in which the information is communicated via frames, the information handler for radio access node 22 is shown as node frame/signal scheduler/handler 50, while the information handler for wireless terminal 26 is shown as terminal frame/signal handler 52.

The node processor 30 of radio access node 22 also includes system information (SI) generator 54. The wireless terminal 26 uses the system information (SI) generated by radio access node 22, and even in some example implementations specifically requests certain system information (SI), in on-demand fashion. To that end the terminal processor 40 of wireless terminal 26 is shown as comprising SIB processor 56.

The node processor 30, and system information (SI) generator 54 in particular, generates a value tag which is associated with the system information (SI). The value tag, also known as a version tag or "Vtag", is configured to provide an indication of the version or vintage of system information with which the value tag is associated. In example implementations the value tag may take the form of a numeral or character, e.g., "1" for first version, "2" for second version, etc., or "A" for first version, "B", for second version, etc. Any other convention for differentiating between values or versions may instead be employed. To this end system information (SI) generator 54 is shown as comprising value tag generator 57.

The value tag generator 57 serves, e.g., to change the value tag when a parameter of the system information is changed. For example, the value tag generator 57 may increment a number of the value tag when a parameter of the system information is changed.

Figure 2:
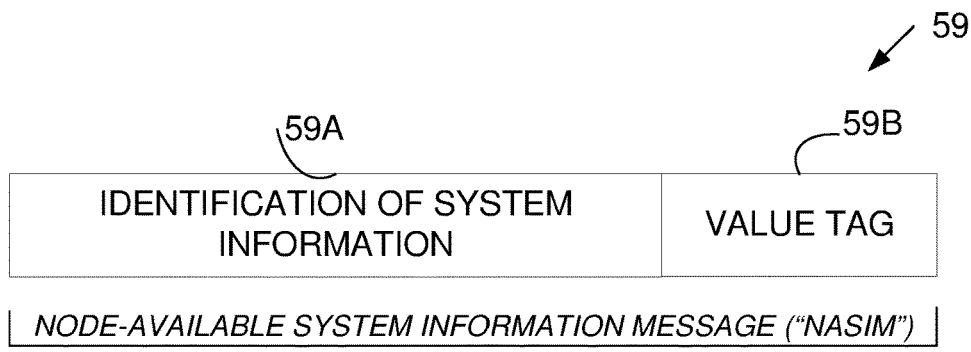
FIG. 2 is a diagrammatic view of a node-available system information message according to an example embodiment and mode.

The system information (SI) generator 54 also comprises SIB delivery controller 58, which controls the timing and content of delivery of system information (SI), as well as timing and delivery of certain node-available system information ("NASI"). In an example embodiment and mode, illustrated in FIG. 2, the node-available system information comprises a node-available system information message NASIM 59 which includes both an identification of the system information that is available from the radio access node 22, and the value tag associated with that available system information. To this end, the NASIM 59 of FIG. 2 shows an identification of system information field or information element 59A, and a value tag field or information element 59B.

Figure 3:
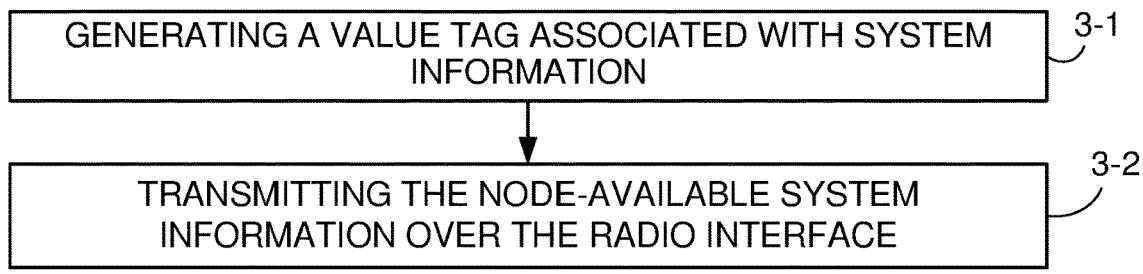
FIG. 3 is a flowchart showing example, representative, basic acts or steps performed by the radio access node of FIG. 1.

FIG. 3 depicts certain example, representative, basic acts or steps performed by the radio access node 22 of FIG. 1. Act 3-1 comprises generating a value tag associated with system information that is available at the radio access node 22. As is understood in the art, the system information facilitates use of communication services provided by the access node. Act 3-2 comprises transmitting over the radio interface 24 the node-available system information ("NASI"). Such transmission may be by means of the node-available system information message NASIM 59. An arrow 3-2 in FIG. 1 corresponds to act 3-2 (and, in an example implementation, to the node-available system information message NASIM 59). As indicated above and with respect to FIG. 2, the node-available system information message comprises an identification of the system information and the value tag associated with the system information.

Figure 4:
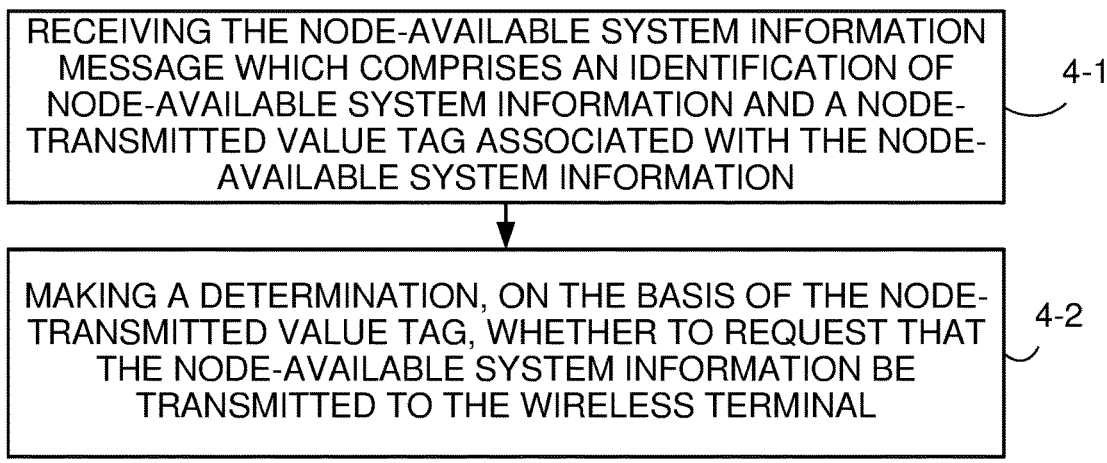
FIG. 4 is a flowchart showing example, representative, basic acts or steps performed by the wireless terminal of FIG. 1

FIG. 4 depicts certain example, representative, basic acts or steps performed by the wireless terminal 26 of FIG. 1. Act 4-1 comprises receiving, from the radio access node 22, the node-available system information message (3-2) which comprises an identification of node-available system information and a node-transmitted value tag associated with the node-available system information. Act 4-2 comprises making a determination, on the basis of the node-transmitted value tag, whether to request that the node-available system information be transmitted to the wireless terminal. If the determination of act 4-2 indicates that the available system information as advertised in the node-available system information message (3-2) should be obtained (e.g., because that available system information has a more recent value tag), then the wireless terminal 26 sends a request message to the radio access node 22 to obtain the advertised system information.

Figure 5:
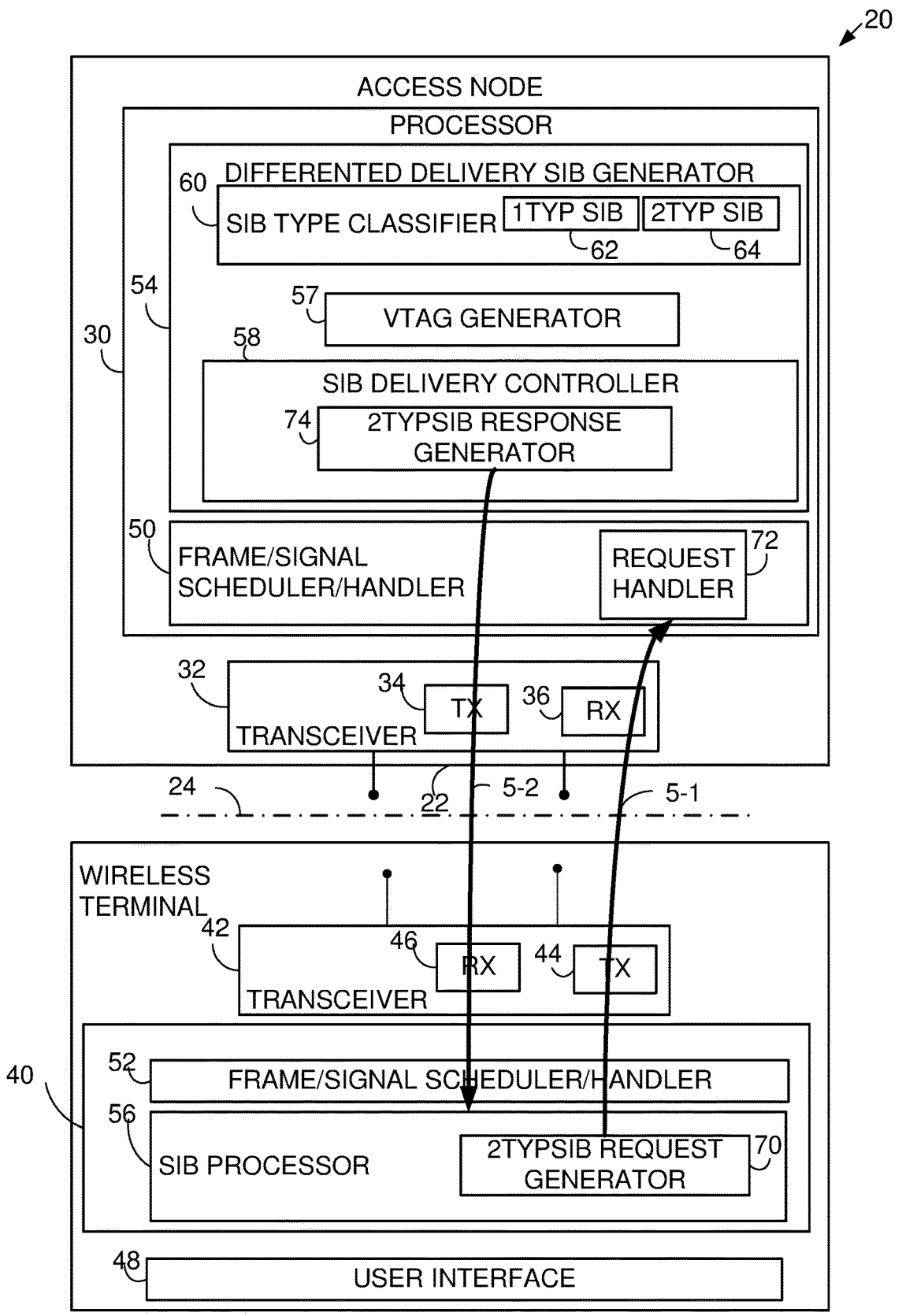
FIG. 5 is a schematic view showing an example communications system comprising a radio access node and a wireless terminal, and wherein the radio access node provides a value tag for system information (SI) along with differentiated delivery of system information (SI).

FIG. 5 illustrates certain example embodiment and mode wherein system information (SI) is classified into plural categories or types, and delivery of each category or type of system information (SI) is separately triggered and thus separately delivered across radio interface 24 to one or more wireless terminals. Accordingly, the system information (SI) generator of radio access node 22 is also known as differentiated delivery SIB generator 54.

In view of the fact that, in certain example embodiments and modes, the system information (SI) is classified into plural categories or types, the system information (SI) generator 54 is depicted in FIG. 5 as comprising SIB type classifier 60 which defines the plural categories or types of system information, and may further define an association between the plural types and respective system information blocks. For sake of example two representative categories or types of system information (SI) are shown as defined by the SIB type classifier 60 in FIG. 5: a first type of system information (1TYP SIB) and a second type of system information (2TYP SIB). Definitions and procedures for handling for the first type of system information (1TYP SIB) and the second type of system information (2TYP SIB) may be selectively configured and maintained, and are accordingly reflected by 1TYPSIB controller 62 and 2TYPSIB controller 64, respectively.

In an example embodiment and mode, the first type of system information (1TYP SIB) is SIB "essential system information", which means system information (SI) which is essential to or minimally required by the wireless terminal 26 for initial access to the radio access network and to radio interface 24 in particular. Essential system information may be also referred as "minimum system information". On the other hand, in the same example embodiment and mode, the second type of system information (2TYP SIB) is non-essential system information (SI). "Non-essential" system information (SI) is defined as all other types of information, and thus excludes the minimal information required for initial access. Non-essential system information may be also referred as "other system information". As such the second type of system information (2TYP SIB) may facilitate utilization of certain features or services provided by or through radio access node 22. Thus, the first type system information comprises information which is periodically broadcasted by the transmitter and which is required for initial access to the radio access network, but the second type system information is not required for initial access to the radio access network.

In example embodiments and modes described herein, the radio access node 22 separately delivers the different types of system information, e.g., delivers the second type of system information (2TYP SIB) separately from the first type of system information (1TYP SIB). For example, the node processor 30 may schedule periodic transmissions by the transmitter of first type system information over the radio interface; and thereafter or separately from the periodic transmissions of the first type system information, schedule transmission by the transmitter of second type system information over the radio interface. Accordingly, in example embodiments and modes, the SIB delivery controller 58, among other things, may implement the "differentiated" delivery of the second type of system information (2TYP SIB) apart from the first type of system information (1TYP SIB). As explained herein, the transmission of second type system information may be either by unicast or broadcast.

FIG. 5 further illustrates that wireless terminal 26 may, after obtaining initial access to the communications system 20 (e.g., as a result of receiving the first type of system information (1TYP SIB)), recognize or appreciate that the wireless terminal 26 may need the second type of system information (2TYP SIB). Thus the wireless terminal 26 may make a special request for the second type of system information (2TYP SIB). The FIG. 5 embodiment and mode is thus an example of the radio access node 22 providing second type system information "on demand" Such request or demand for second type of system information (2TYP SIB) may arise, for example, when the wireless terminal 26 seeks to utilize a certain service provided by the communications system 20 or a functionality of wireless terminal 26 which, although not required for access, may enhance operation of wireless terminal 26. Accordingly, FIG. 5 shows the SIB processor 56 of wireless terminal 26 as comprising 2TYPSIB request generator 70, which may generate a 2TYPSIB request depicted by arrow 5-1.

FIG. 5 further shows node frame/signal scheduler/handler 50 as comprising 2TYPSIB request handler 72, and further shows the SIB delivery controller 58 as comprising 2TYPSIB response generator 74. In the FIG. 5 embodiment and mode, the 2TYPSIB response generator 74 generates a response message 5-2 which includes one or more requested system information blocks (SIBs), e.g., includes at least one block of the second type system information.

Thus, in the FIG. 5 embodiment and mode, the node processor 30 schedules periodic transmissions by the transmitter of first type system information over the radio interface. Thereafter or separately from the periodic transmissions of the first type system information, and upon request by the wireless terminal 26, the node processor 30 schedules transmission by the transmitter of second type system information over the radio interface. The request by the wireless terminal 26 may arise after the wireless terminal 26 receives the node-available system information message NASIM 59, which advises of the value tag for the node-available system information. Thus, in the FIG. 5 embodiment and mode, the value tag is associated with the second type system information.

Figure 6:
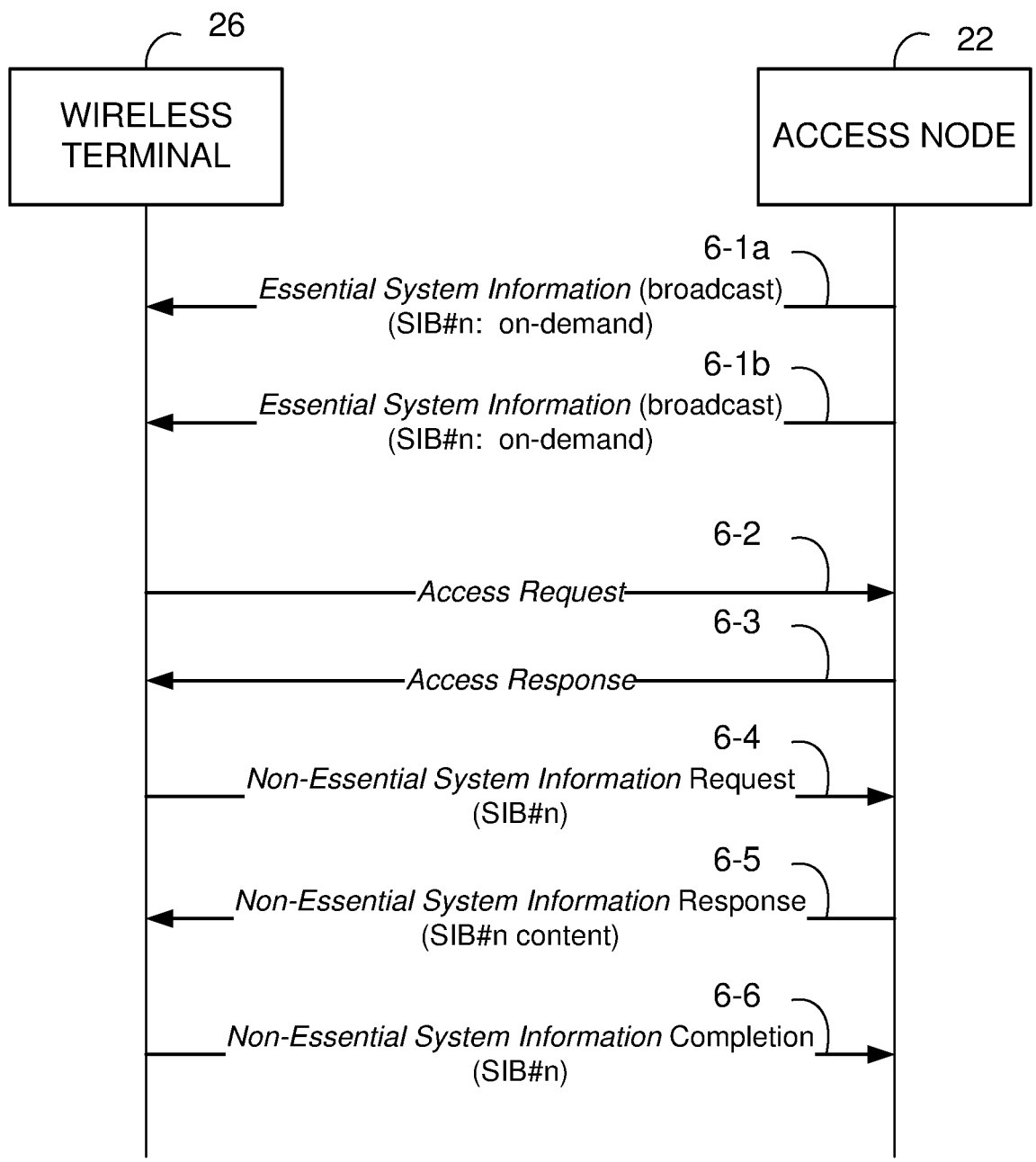
FIG. 6 is a diagrammatic view showing example message flow for the example communications system of FIG. 5.

FIG. 6 shows an exemplary message flow for the embodiment of FIG. 5. In the FIG. 6 message flow, when a wireless terminal enters the coverage area of the radio access node 22, the wireless terminal first receives from the radio access node 22 the Essential System Information (i.e., first type of system information (1TYP SIB), and in particular receives Essential System Information periodically broadcasted in messages containing the essential SIB(s) as information elements. The periodic broadcast by the radio access node 22 of the Essential System Information is shown by messages 6-1a and 6-1b of FIG. 6, it being understood (in FIG. 6 and other similar drawings) that there may be more than two such broadcast messages. An example Essential System Information message for the FIG. 5 embodiment and mode is shown in FIG. 7 and hereinafter described.

Figure 7:
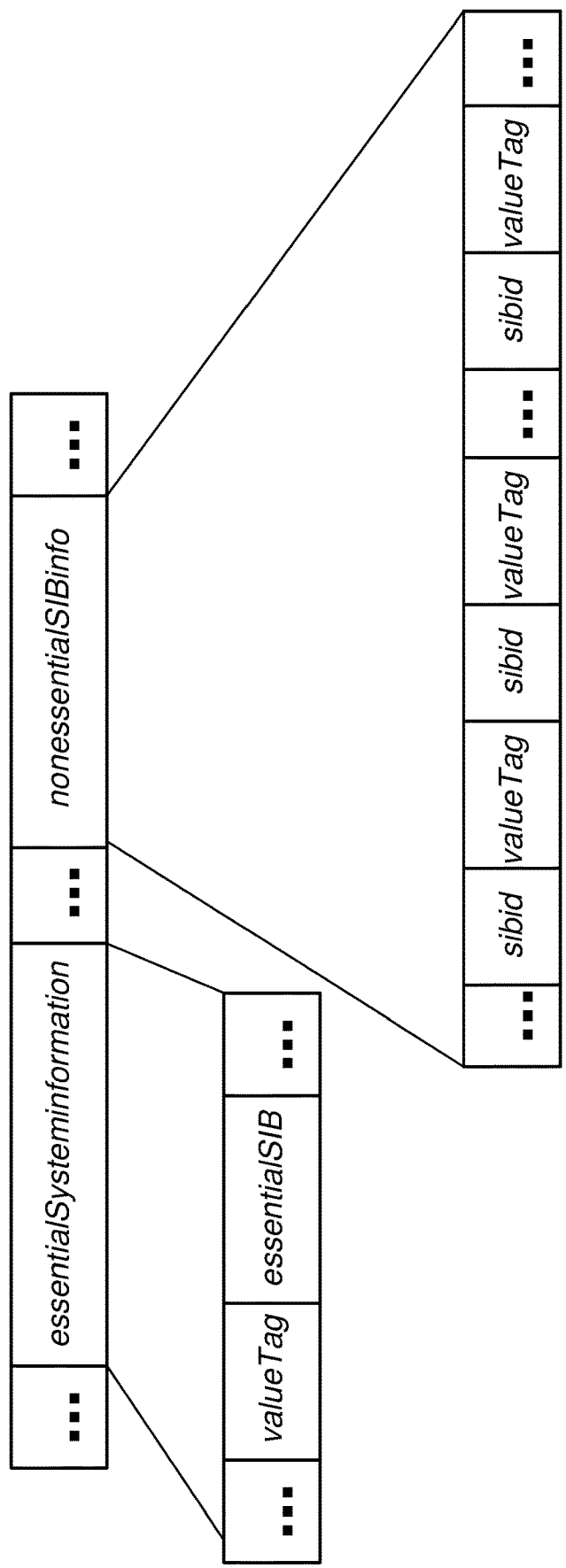
FIG. 7 is a diagrammatic view showing an example format of an Essential System Information message according to an example implementation of the system of FIG. 5.

As shown in FIG. 7, the Essential System Information message may comprise a nonEssentialSIBInfo information element which includes the identification of the non-essential SIBs. If the nonEssentialSIBInfo information element is not present in the message, or if the information element is present but the list is empty, the wireless terminal assumes that there is no second type system information available from this access node 22.

Upon receiving the Essential System Information, i.e., the first type of system information (1TYP SIB), the wireless terminal 26 initiates the system access procedure by sending an Access Request message 6-2, which is acknowledged by radio access node 22 with an Access Response message 6-3. Following the system access procedure (comprised of the acts just described), the wireless terminal 26 sends a Non-essential System Information Request message 6-4 to radio access node 22. The Non-essential System Information Request message 6-4 may be generated by 2TYP SIG request generator 70 of FIG. 5, and may include an indication of one or more pieces of second type of system information (2TYP SIB), e.g., one or more SIB numbers (SIB #), that the wireless terminal 26 desires. The wireless terminal 26 was made aware of the existence of the second type system information from the nonEssentialsSIBinfo information element. Such indication of desired SIB # may be expressed in an information element of the Non-essential System Information Request message 6-4. The Non-essential System Information Request message 6-4 may be sent using uplink dedicated resources (e.g., radio resources of a frame).

In response to the Non-essential System Information Request message 3-4, the radio access node 22 may send Non-essential System Information Response message 6-5 using the downlink dedicated resources. The Non-essential System Information Response message 6-5 comprises the requested SIB #n (e.g., the SIB #n requested by the wireless terminal 26). The requested SIB #n may be included in an information element of the Non-essential System Information Response message 6-5. Afterwards, when the wireless terminal 26 has successfully obtained the requested SIB #n from the Non-essential System Information Response message 6-5, the wireless terminal 26 may send to the radio access node 22 a Non-essential System Information Completion message 6-6, at which point the radio access node 22 may release the uplink/downlink dedicated resources. Alternatively, the radio access node 22 may release the uplink/downlink dedicated resources after sending Non-essential System Information Response message 6-5.

An example Essential System Information message for the FIG. 5 embodiment and mode is shown in FIG. 7. In the embodiment and mode of FIG. 5 and FIG. 6, one or more and preferably a non-essential (e.g., second type) SIB is associated with a value tag that uniquely identifies a specific version of content for that SIB. When broadcasting Essential System Information message, the radio access node 22 of FIG. 5 includes the value tags for the latest contents of non-essential SIBs. Further, the value tag changes when any configuration parameters in the corresponding SIB gets updated. In one example implementation, the value tag is incremented by one upon the SIB update. Other types of modifications, e.g., decrementation, version prefixes or suffixes, may be employed.

FIG. 7 shows an example format of the Essential System Information message, wherein the nonEssentialSIBInfo information element each sibId is paired with valueTag, the value tag of the corresponding non-essential SIB. Thus, in an example implementation, the node-available system information message NASIM 59 may be an Essential System Information message as shown in FIG. 7. FIG. 7 particularly shows that the Essential System Information message may also, when functioning as the node-available system information message NASIM 59, include an information element specifying what non-essential SIBs are available at this radio access node 22 upon request. FIG. 7 shows the essentialSystemInformation information element carrying at least one essential SIB and a nonEssentialSIBInfo information element may include a list of identifiers (sibId's) for such available non-essential SIBs. In addition, for one or more and preferably each non-essential SIBs a value tag is provided in the nonEssentialSIBInfo information element.

FIG. 7 also shows that Essential SIB(s) may be also associated with at least one value tag, which is different from the ones for non-essential SIBs, and may be conveyed as a part of the Essential System Information message.

In certain example embodiments and modes, the value tag of a non-essential SIB may be valid within one radio access node 22, e.g., valid within a coverage area or cell served by the radio access node 22. But in other example embodiments and modes, the value tag may have collective applicability, e.g., be capable of expressing a value for more than one cell, for more than one piece of system information (e.g., more than one SIB), etc. In other words, the applicable "base" of the value tag, the information to which the value tag pertains, may be selectively defined in terms of various factors such as area, number of SIBs, and so forth.

Figure 8:
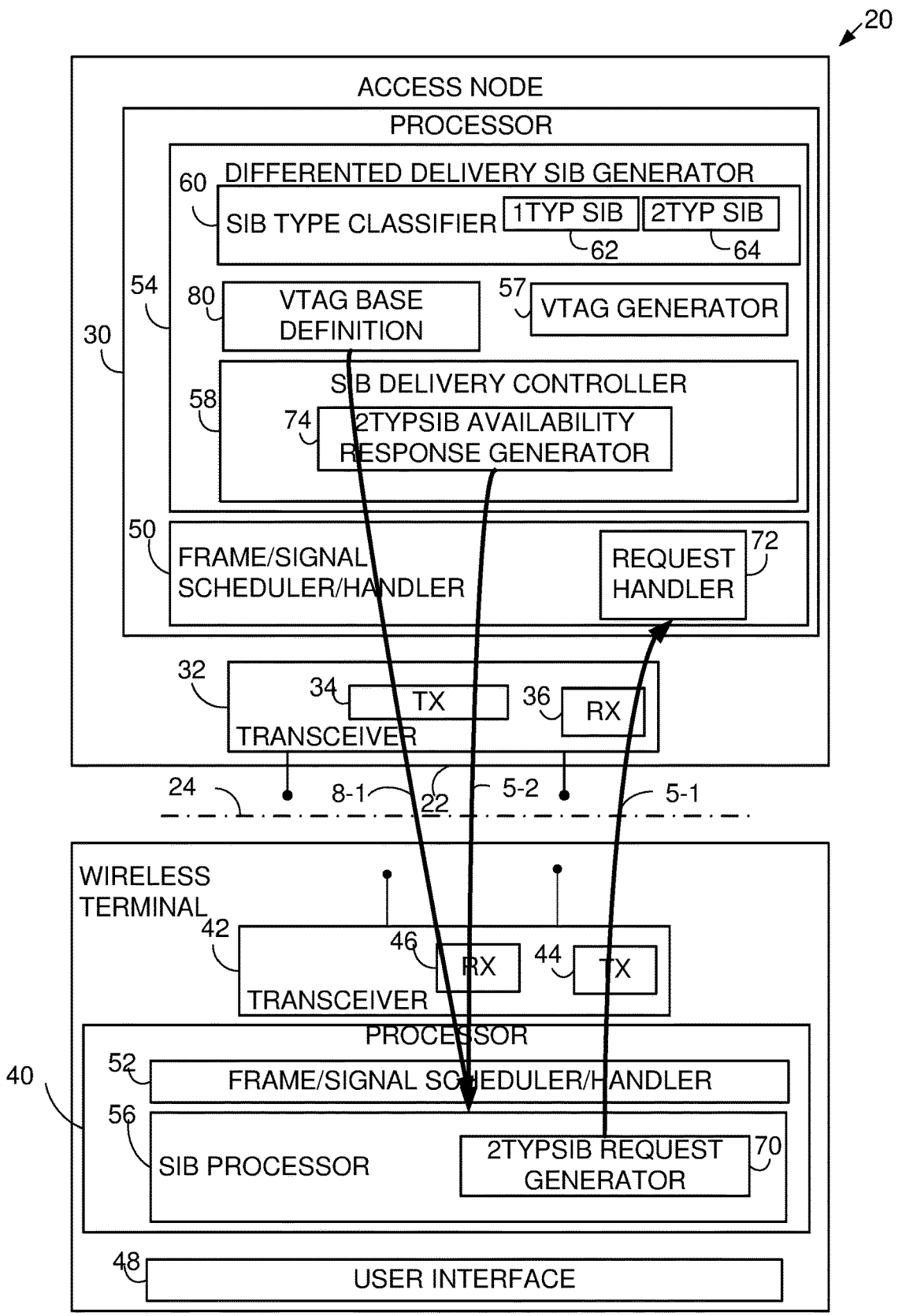
FIG. 8 is a schematic view showing an example communications system comprising a radio access node and a wireless terminal, and wherein the radio access node provides a value tag for system information (SI) along with definition of a base of second type system information to which the value tag applies.

In the above regard, in an example embodiment and mode shown in FIG. 8, the system information (SI) generator 54 includes not only the value tag generator 57, but also logic, memory, or controller for a value tag base definition 80. In an example implementation, for example, the value tag base definition 80 may specify that the value tag is valid in at least one geographical area comprising a plurality of radio access nodes. Thus, the node processor 30 may generate the value tag to be valid in a geographical area served by the access node and a group of at least one other access node. In such example implementation, the value tag base definition 80, or value tag "validity area", may be separately signaled from the radio access nodes to the wireless terminals in their respective coverage areas. That is, the node processor 30 may generate a signal (such as signal 8-1 of FIG. 8) to define the group of other access nodes.

Thus, in the FIG. 8 embodiment and mode, a wireless terminal may consider a non-essential system information, a second type SIB, to be "current" if (1) it was received in the validity area of the radio access node upon which the wireless terminal is camping; (2) the value tag of the received non-essential SIB is the same as the one that the camped radio access node is currently advertising in the Essential System Information message, and (3) it was received within a pre-determined or network-configured time period from the present time.

Figure 9:
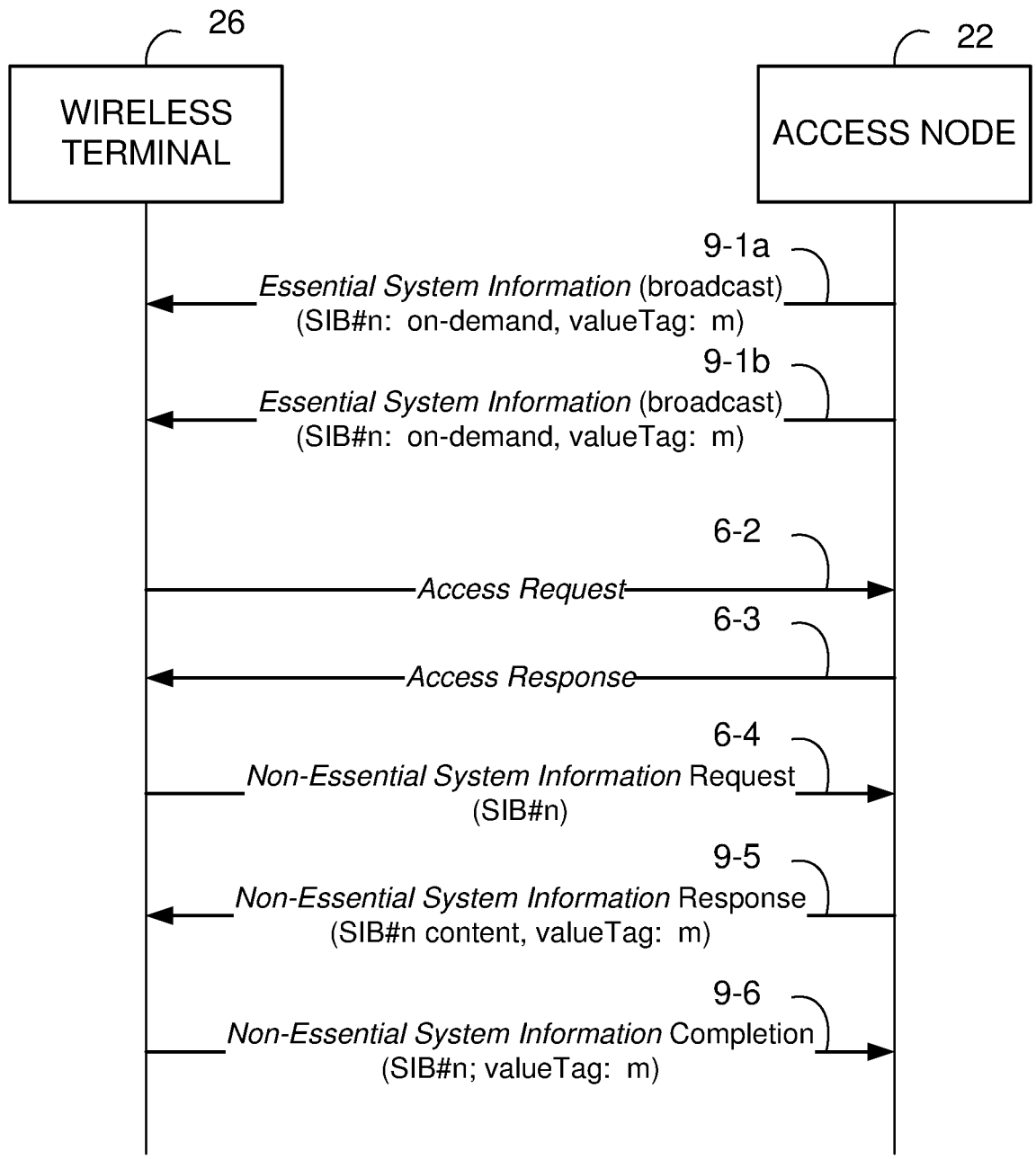
FIG. 9 is a diagrammatic view showing example message flow for the example communications system of FIG. 8.

FIG. 9 shows an example message flow for the example embodiment and mode of FIG. 8. In the example embodiment and mode of FIG. 8 it is assumed that the wireless terminal 26 makes an on-demand request for second type system information (SI). Accordingly, in FIG. 9, the Essential System Information messages 9-1a and 9-1b are indicated as being "SIB #n: on-demand" Further, as explained above, the Essential System Information messages 9-1a and 9-1b may include the value tag ("valueTag: m"). After receiving the Essential System Information, the wireless terminal 26 may perform an access procedure comprising Access Request message 6-2 and Access Response message 6-3.

In the FIG. 9 scenario the wireless terminal 26 may not need to take further action respecting the second type of system information if the wireless terminal 26 has previously received the SIB #n and the value tag for the previously-received SIB #n as stored at the wireless terminal 26 is current (e.g., is "m"). Otherwise, if the wireless terminal 26 has a value tag for the SIB #n which is older than "m", the wireless terminal 26 may proceed to request the SIB #n transmission using the Non-Essential System Information Request message 6-4, in a manner similar to that described in a previous embodiment.

Thus, in the example embodiment and mode of FIG. 8 and FIG. 9, the Non-essential System Information Response message and/or Non-essential System Information Completion message may contain the value tag with the current value (valueTag=m).

Figure 10:
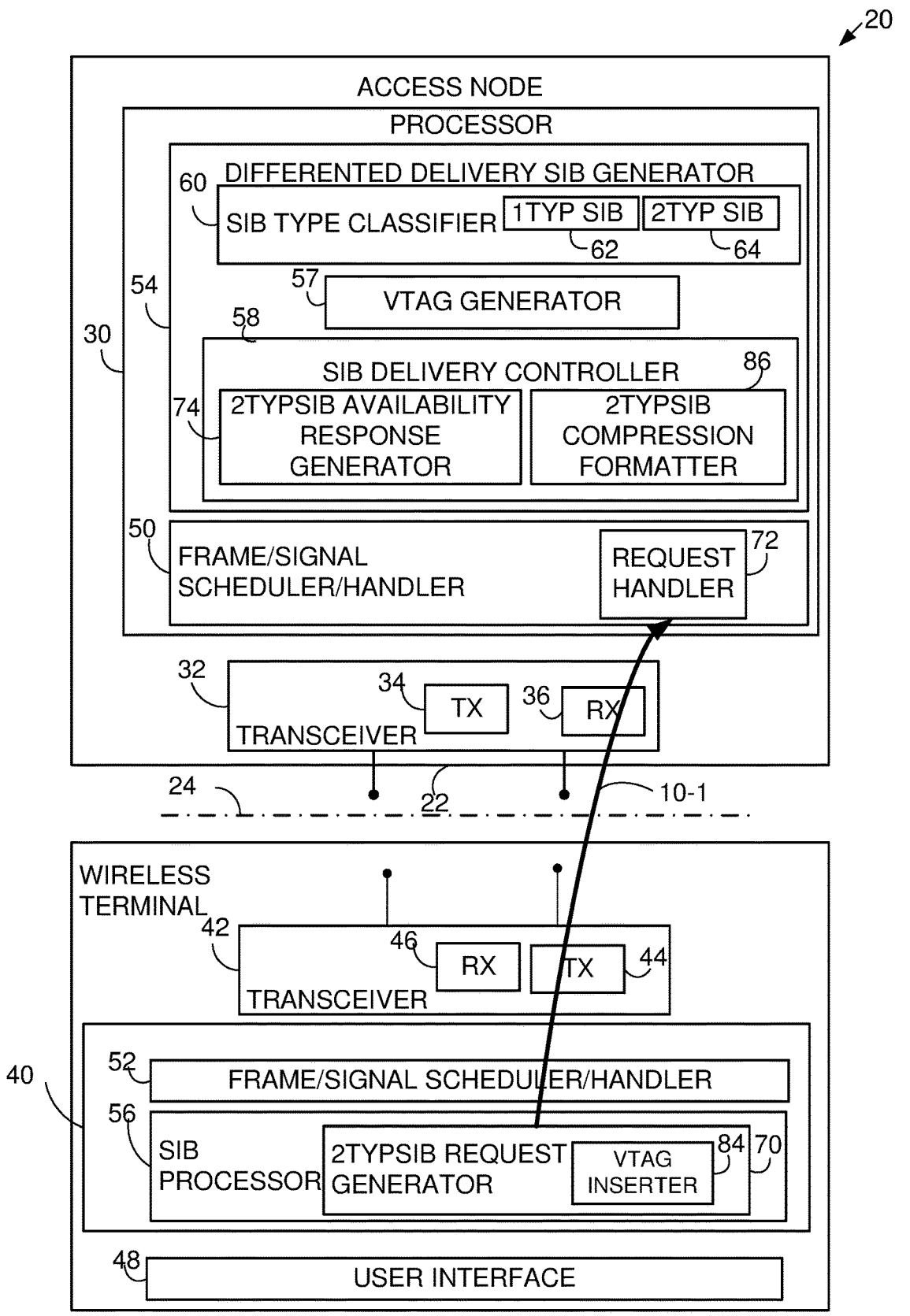
FIG. 10 is a schematic view showing an example communications system comprising a radio access node and a wireless terminal, and wherein the wireless terminal provides a stored value tag for stored second type system information system information (SI) when requesting second type system information from the radio access node.

In an example embodiment and mode shown in FIG. 10, the wireless terminal 26 may optionally include in request message 10-1 (requesting the second type system information) the stored values tags of the requested second type system information. This may occur in a situation in which the wireless terminal 26 already has stored values for the second type system information and already has stored value tags for the stored second type system information, but the wireless terminal 26 does not know if the stored second type system information is or is not truly current in terms of network usage for each of the stored SIBs of the second type system information. The wireless terminal 26 may request second type system information for plural different second type system information SIBs, and the plural second type system information SIBs may each have different value tags.

In the example embodiment and mode of FIG. 10, the wireless terminal 26 comprises value tag inserter functionality 84, which includes in the request message 10-1 the stored value tag for the second type system information already stored at wireless terminal 26. Moreover, as understood below, the radio access node 22 and SIB delivery controller 58 in particular may comprise a compression formatter for the second type system information, e.g., 2TYPSIB compression formatter 86.

Thus, the FIG. 10 example embodiment and mode is similar to the embodiment and mode of FIG. 8, but the wireless terminal 26 may optionally include in the Non-essential System Information Request message 10-1 the value tags of the requested non-essential SIBs, where the wireless terminal 26 obtained those value tags when it previously received the corresponding non-essential SIBS.

Figure 11:
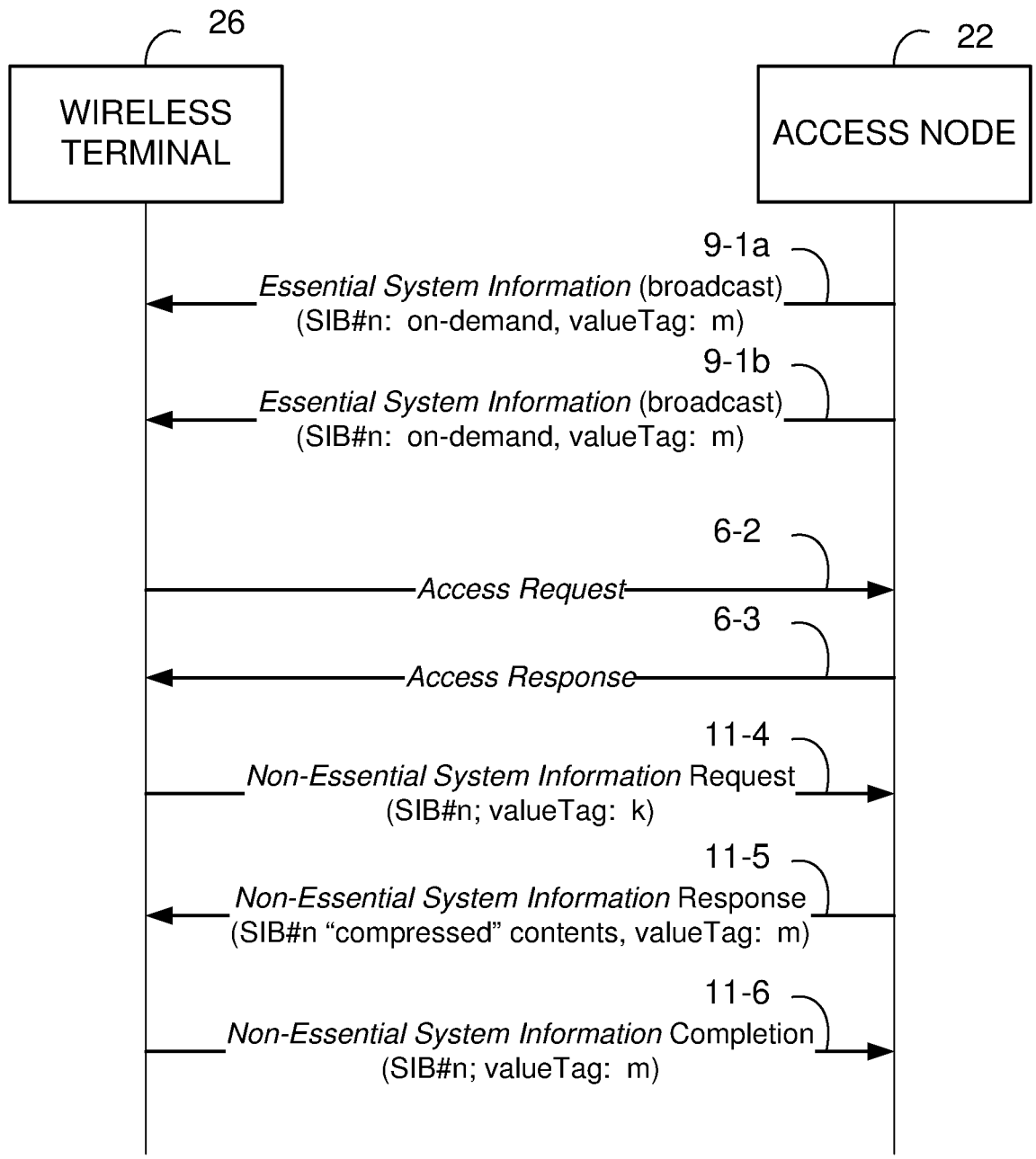
FIG. 11 is a diagrammatic view showing example message flow for the example communications system of FIG. 1-10.

An exemplary scenario of the FIG. 10 embodiment and mode is illustrated in the message flow of FIG. 11. FIG. 11 shows, by the Non-essential System Information Request message 11-4 (which corresponds to message 10-1 of FIG. 10), that valueTag=k for its requested SIB #n. Based on this received value tag, the radio access node 22 and the 2TYPSIB compression formatter 86 in particular may compose "compressed" content of the SIB #n to be delivered via Non-essential System Information Response message 11-5.

In one example implementation of FIG. 10 and FIG. 11, the compressed content comprises the differences between the current SIB #n (valueTag=m) and the previously transmitted (valueTag=k). For example, if SIB #n consists of parameters p1 to p10 and if only p3 and p7 have been updated (if the radio access node 22 has newer values only for parameters P3 and p7 of second type system information), the compressed content of the Non-essential System Information Response message 11-5 may include only p3 and p7 with updated values.

Figure 12:
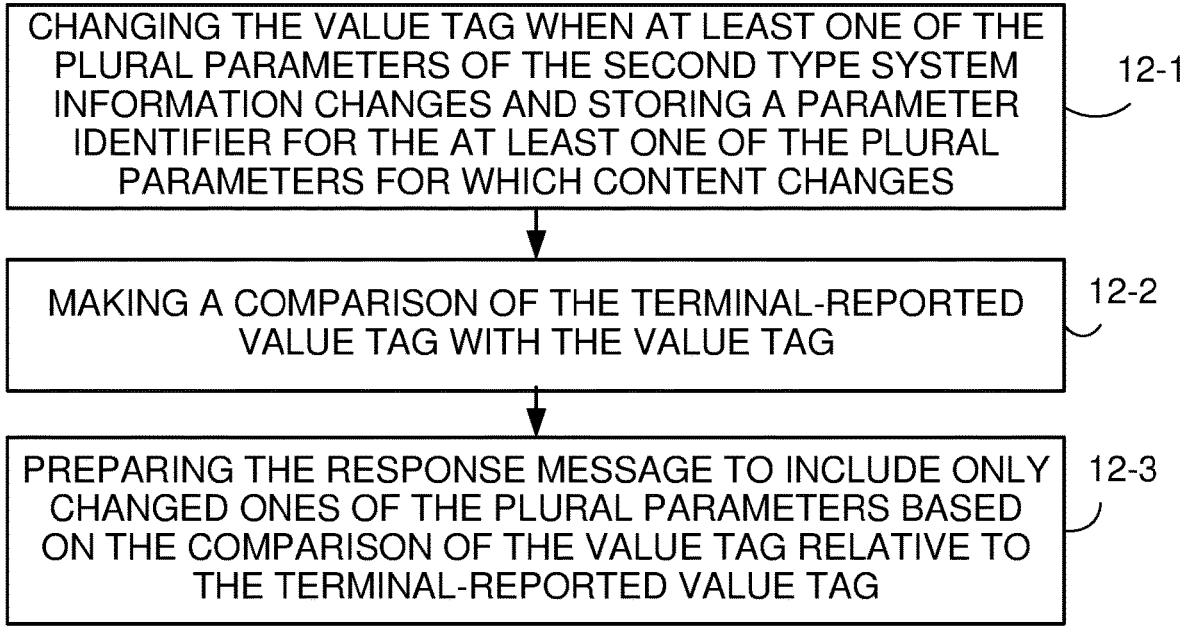
FIG. 12 is a flowchart showing example, representative, basic acts or steps performed by the radio access node of FIG. 10 in implementing certain acts of FIG. 11.

Thus the example embodiment and mode of FIG. 10 and FIG. 11 is particularly but not exclusively applicable to situations in which the second type system information comprises plural parameters and the receiver is configured to receive a wireless terminal-reported value tag in the request message. Basic example acts performed by radio access node 22 in conjunction with the example embodiment and mode of FIG. 10 and FIG. 11 are shown in FIG. 12. Act 12-1 comprises the node processor 30 (and system information (SI) generator 54 in particular) changing the value tag when at least one of the plural parameters of the second type system information changes and to store a parameter identifier for the at least one of the plural parameters for which content changes. Act 12-2 comprises making a comparison of the terminal-reported value tag (e.g., the value tag reported in the request message 10-1) with the value tag (the changed value tag). Act 12-3 comprises preparing the response message (e.g., the Non-essential System Information Response message 11-5) to include only changed ones of the plural parameters based on the comparison of the value tag relative to the terminal-reported value tag.

In some cases, the radio access node 22 may have an option to send the non-compressed versions of the requested non-essential SIBs even if the Non-essential System Information Request message contains value tags. One example of such cases is where the radio access node 22 no longer stores the contents of the previously transmitted non-essential SIBs indicated by the received value tags.

Figure 13:
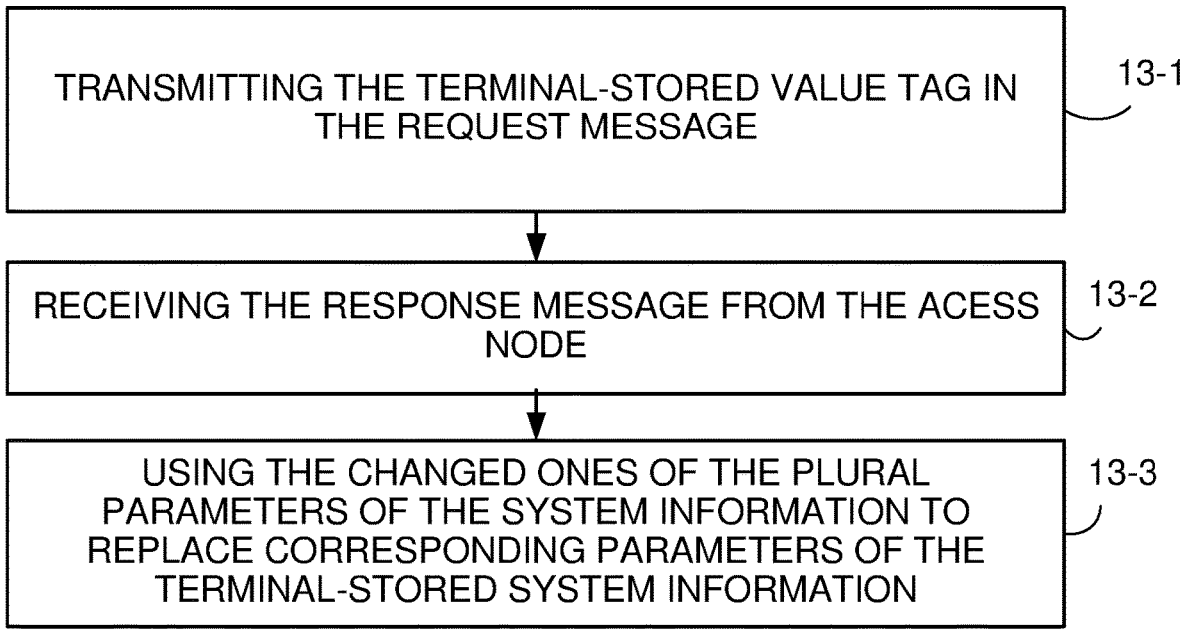
FIG. 13 is a flowchart showing example, representative, basic acts or steps performed by the wireless terminal of FIG. 10 in implementing certain acts of FIG. 11.

Basic example acts performed by wireless terminal 26 in conjunction with the example embodiment and mode of FIG. 10 and FIG. 11 are shown in FIG. 13. Act 13-1 comprises the wireless terminal 26 transmitting the terminal-stored value tag in the request message (e.g., in message 11-4). Act 13-2 comprises the wireless terminal 26 receiving the response message (e.g., message 11-5) from the access node. As mentioned above, the response message includes changed ones of the plural parameters based on a comparison at the access node of the node-reported value tag relative to the terminal-stored value tag. Act 13-3 comprises the wireless terminal 26 using the changed ones of the plural parameters of the system information to replace corresponding parameters of the terminal-stored system information.

In the above regard, the wireless terminal 26 may construct the entire SIB #n using the received compressed content and the content of SIB #n saved in its memory. In the example described above, the wireless terminal 26 may overwrite saved p3 and p7 with the ones received in the compressed content. The UE further updates the saved value tag for SIB #n to valueTag=m.

In typical deployments, the content of system information is stable and even if it has some updates those updates are generally minor. By the approach described in the example embodiment of FIG. 10 and FIG. 11, it is possible to reduce the data size of the Non-essential System Information Response message.

Figure 14:
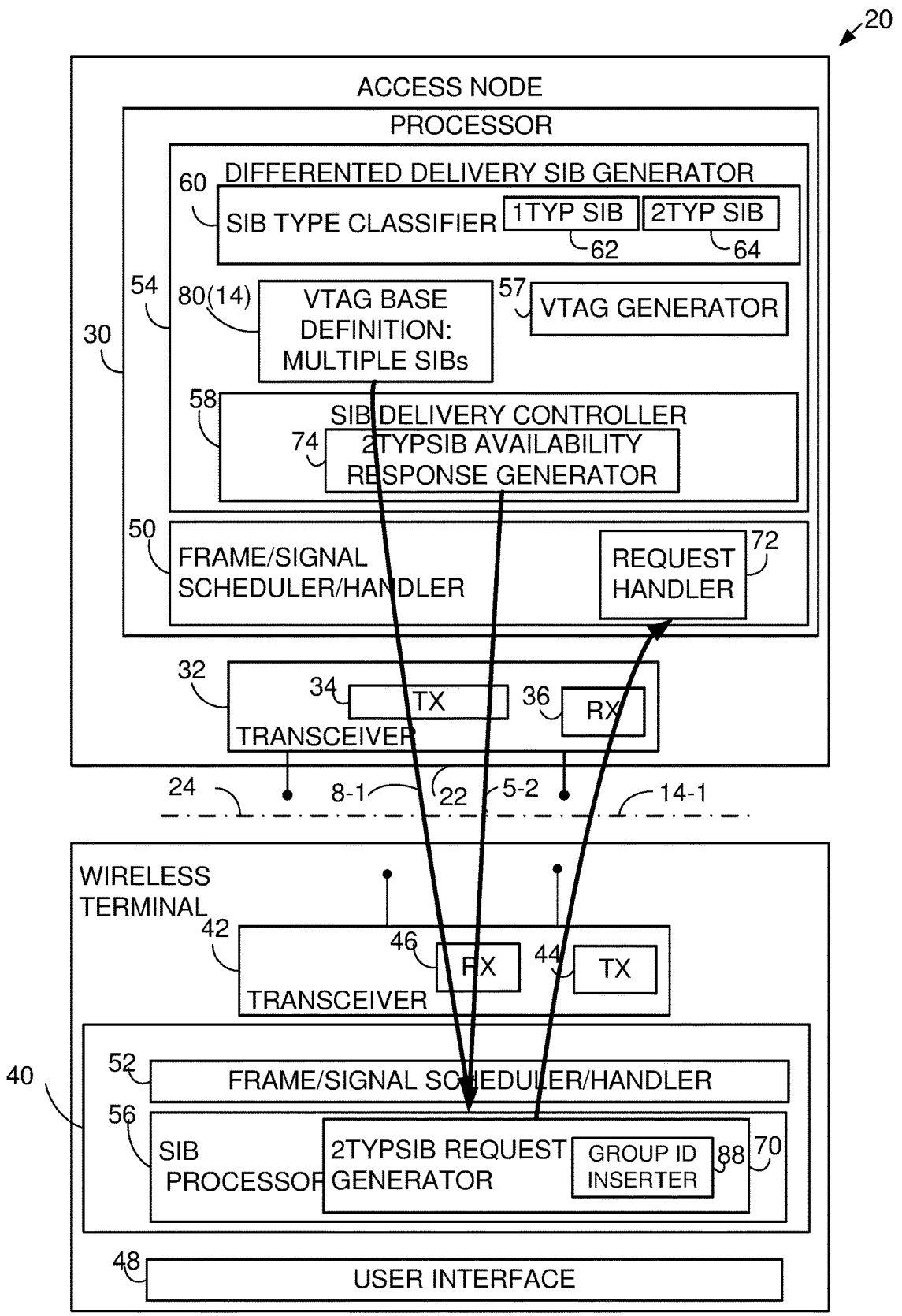
FIG. 14 is a schematic view showing an example communications system comprising a radio access node and a wireless terminal, and wherein the radio access node provides a value tag which is associated with a group of plural system information blocks (SIBs).

The example embodiment and mode of FIG. 14 is similar to the embodiment and mode of FIG. 8, but differs in that a value tag may represent a value or version for an aggregation of multiple non-essential SIBs, e.g., a group of second type system information blocks. In particular, the value tag base definition 80(14) of the embodiment and mode of FIG. 14 defines multiple sibIds associated with one valueTag to thereby form a non-essential or second type system information SIB "group". Thus, in the FIG. 14 embodiment and mode, the node processor 30 generates the value tag to be associated with a group of plural second type system information blocks. The 2TYP SIG request generator 70 of the wireless terminal 26 of FIG. 14 includes a group identifier inserter ("group ID inserter 88") which includes, in a request message 14-1, an identification of the group of second type system information blocks which are the subject of a second type system information request. The request message 14-1 also may include a value tag associated with the group.

Figure 15:
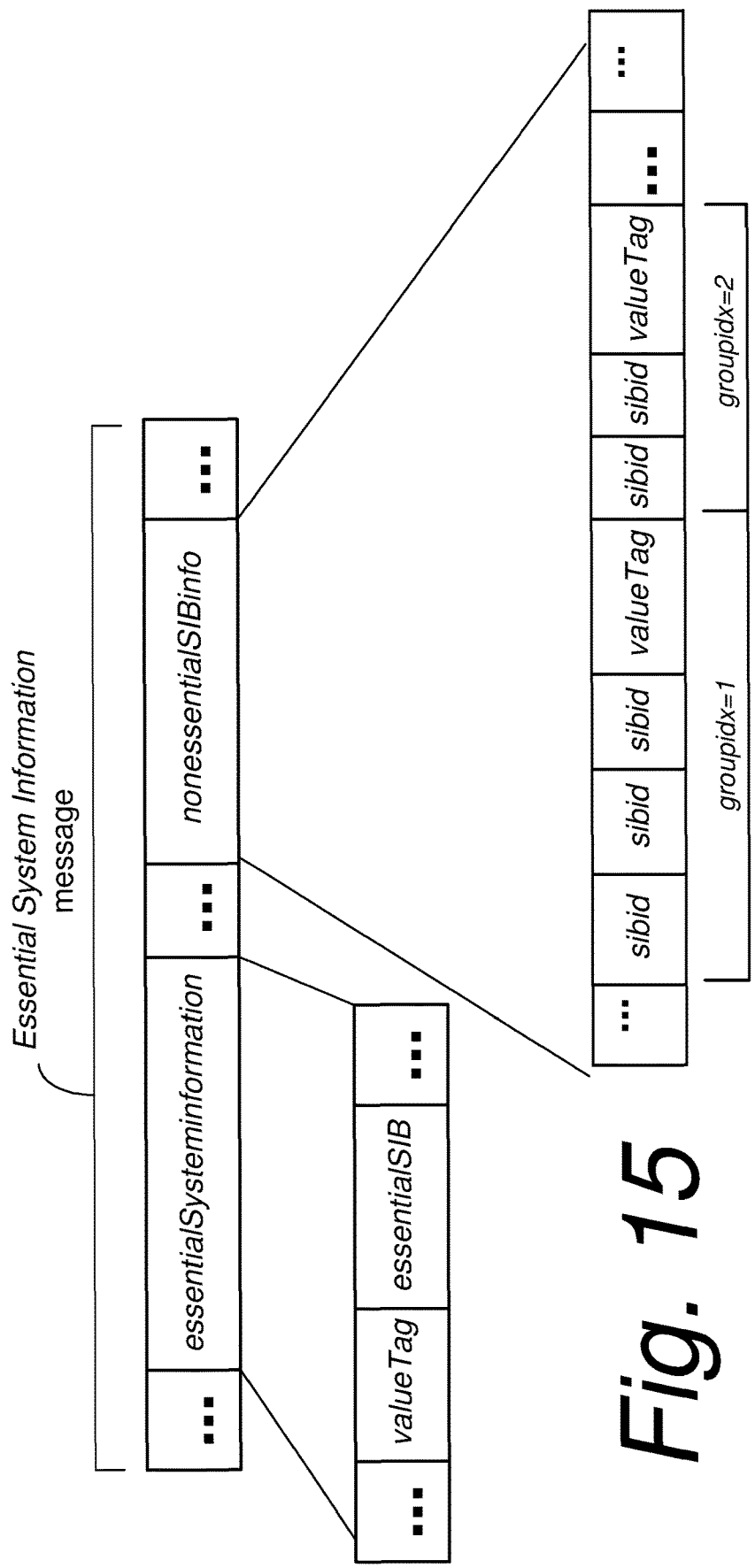
FIG. 15 is a diagrammatic view showing an example format of an Essential System Information message according to an example implementation of the system of FIG. 14, wherein multiple sibIds associated with one valueTag forms a non-essential SIB group.

FIG. 15 shows an exemplary format of the Essential System Information message, where multiple sibIds associated with one valueTag forms a non-essential SIB group. The valueTag in each non-essential SIB group of this message is updated when the content of at least one non-essential SIB belonging to this group changes. In one configuration, each non-essential SIB group may be associated with groupIdx, an index of the group in the order of occurrence in the nonEssentialSIBInfo.

Figure 16:
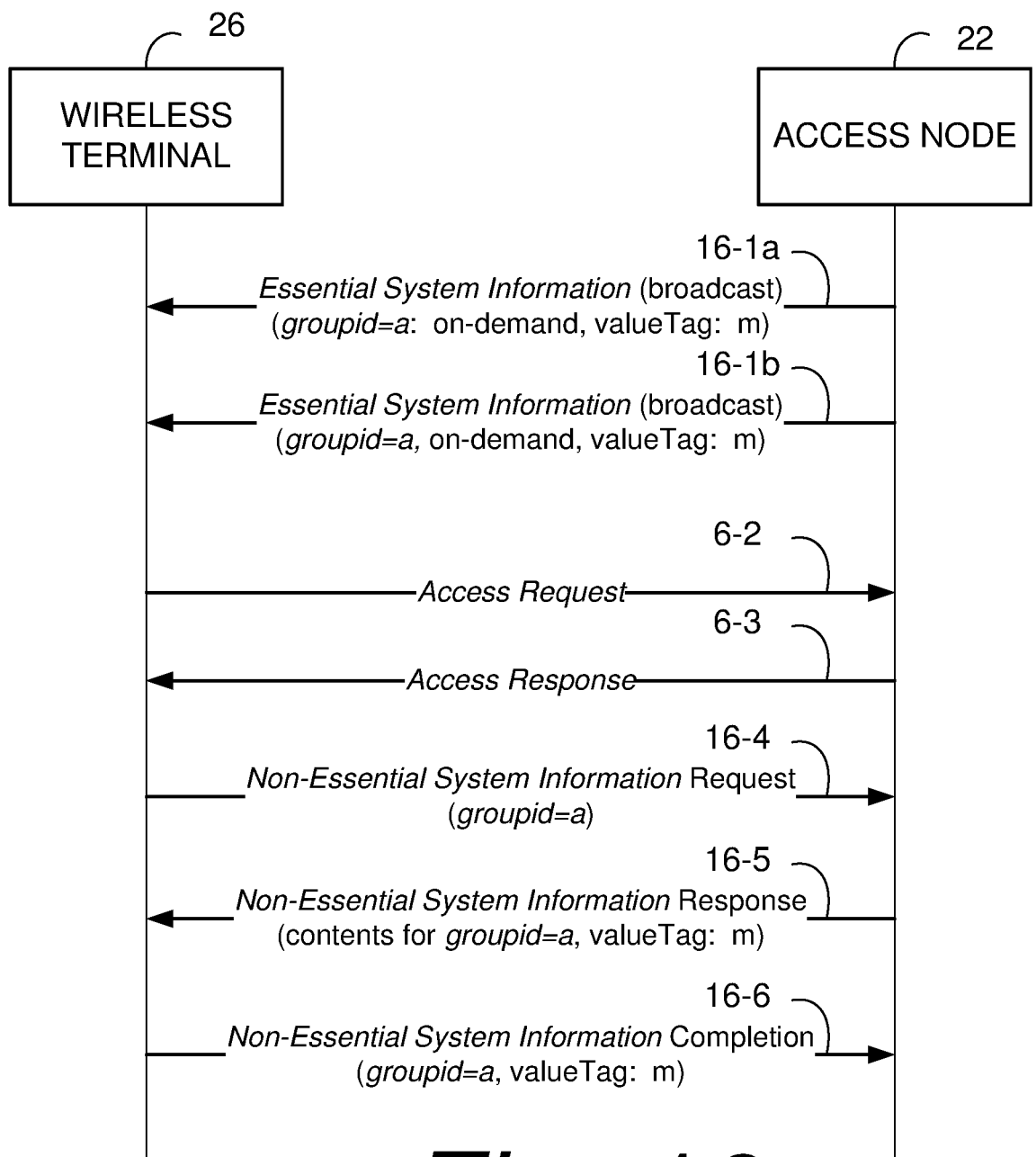
FIG. 16 is a diagrammatic view showing example message flow for the example communications system of FIG. 14.

FIG. 16 illustrates an example message flow for the embodiment and mode of FIG. 14. FIG. 14 particular shows Essential System Information messages 16-1a and 16-1b as advertising a non-essential SIB group with groupIdx=a and valueTag=m. The wireless terminal 26, when requesting the contents of the non-essential SIBs belonging to the group, sends to radio access node 22 the Non-essential System Information Request message 16-4 containing groupId=a. In response, the radio access node 22 sends Non-essential System Information Response message 16-4 including the contents of all the non-essential SIBs of the group defined by groupid=a.

Figure 17:
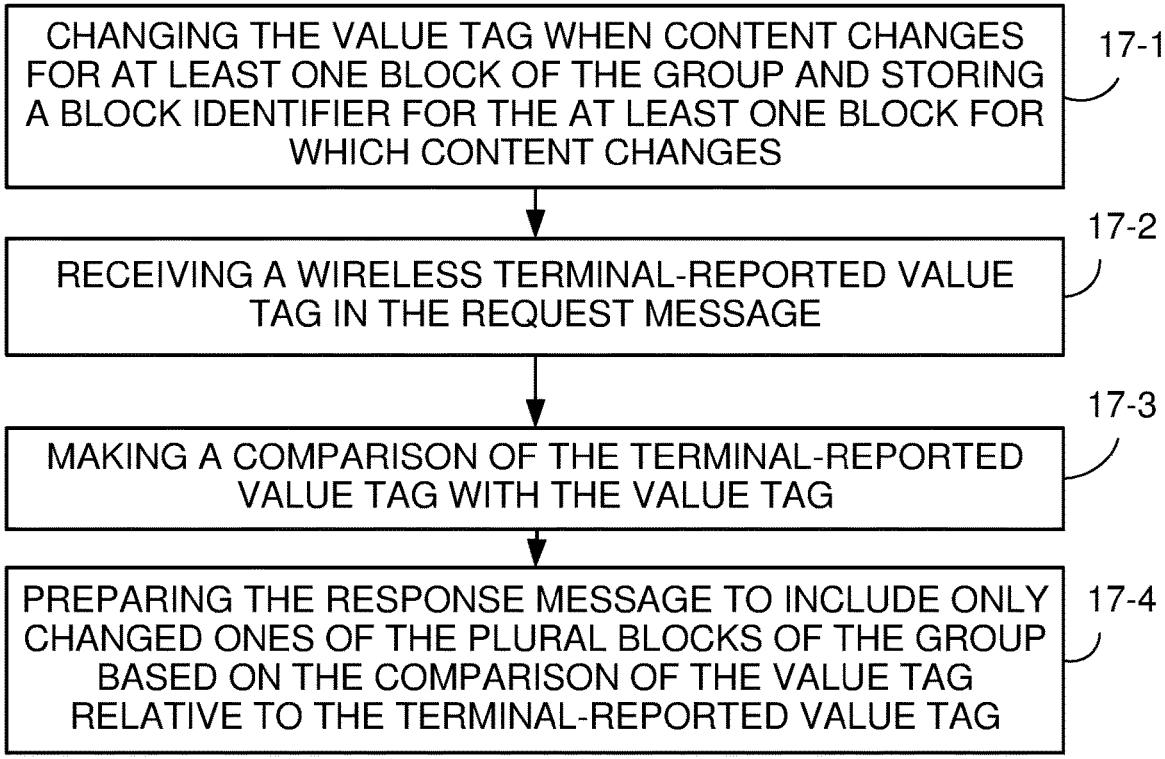
FIG. 17 is a flowchart showing example, representative, basic acts or steps performed by the radio access node of FIG. 14 in implementing certain acts of FIG. 16.

As explained above, the example embodiment and mode of FIG. 14 and FIG. 16 involves, e.g., generating the value tag to be associated with a group of plural second type system information blocks. Basic example acts performed by radio access node 22 in conjunction with the example embodiment and mode of FIG. 14 and FIG. 16 are shown in FIG. 17. Act 17-1 comprises changing the value tag when content changes for at least one block of the group and storing a block identifier for the at least one block for which content changes. Act 17-2 comprises receiving a wireless terminal-reported value tag in the request message. Act 17-3 comprises making a comparison of the terminal-reported value tag with the value tag. Act 17-4 comprises preparing the response message to include only changed ones of the plural blocks of the group based on the comparison of the value tag relative to the terminal-reported value tag.

Figure 18:
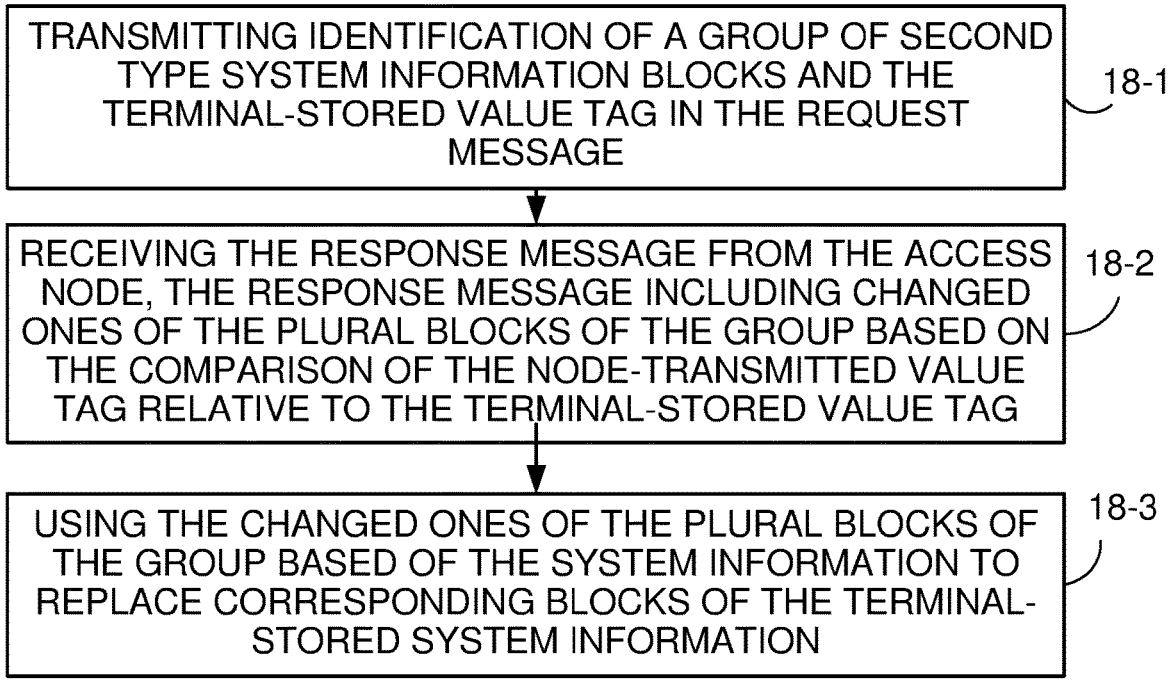
FIG. 18 is a flowchart showing example, representative, basic acts or steps performed by the wireless terminal of FIG. 14 in implementing certain acts of FIG. 16.

Basic example acts performed by wireless terminal 26 in conjunction with the example embodiment and mode of FIG. 14 and FIG. 16 are shown in FIG. 18. Act 18-1 comprises transmitting an identification of a group of second type system information blocks and the associated value tag in the request message (e.g., in message 16-4 of FIG. 16). Act 18-2 comprises receiving the response message (e.g., message 16-5 of FIG. 16) from the access node, the response message including changed ones of the plural blocks of the group based on the comparison of the node-transmitted value tag relative to the terminal-stored value tag. Act 18-3 comprises using the changed ones of the plural blocks of the group based of the system information to replace corresponding blocks of the terminal-stored system information.

Figure 19:
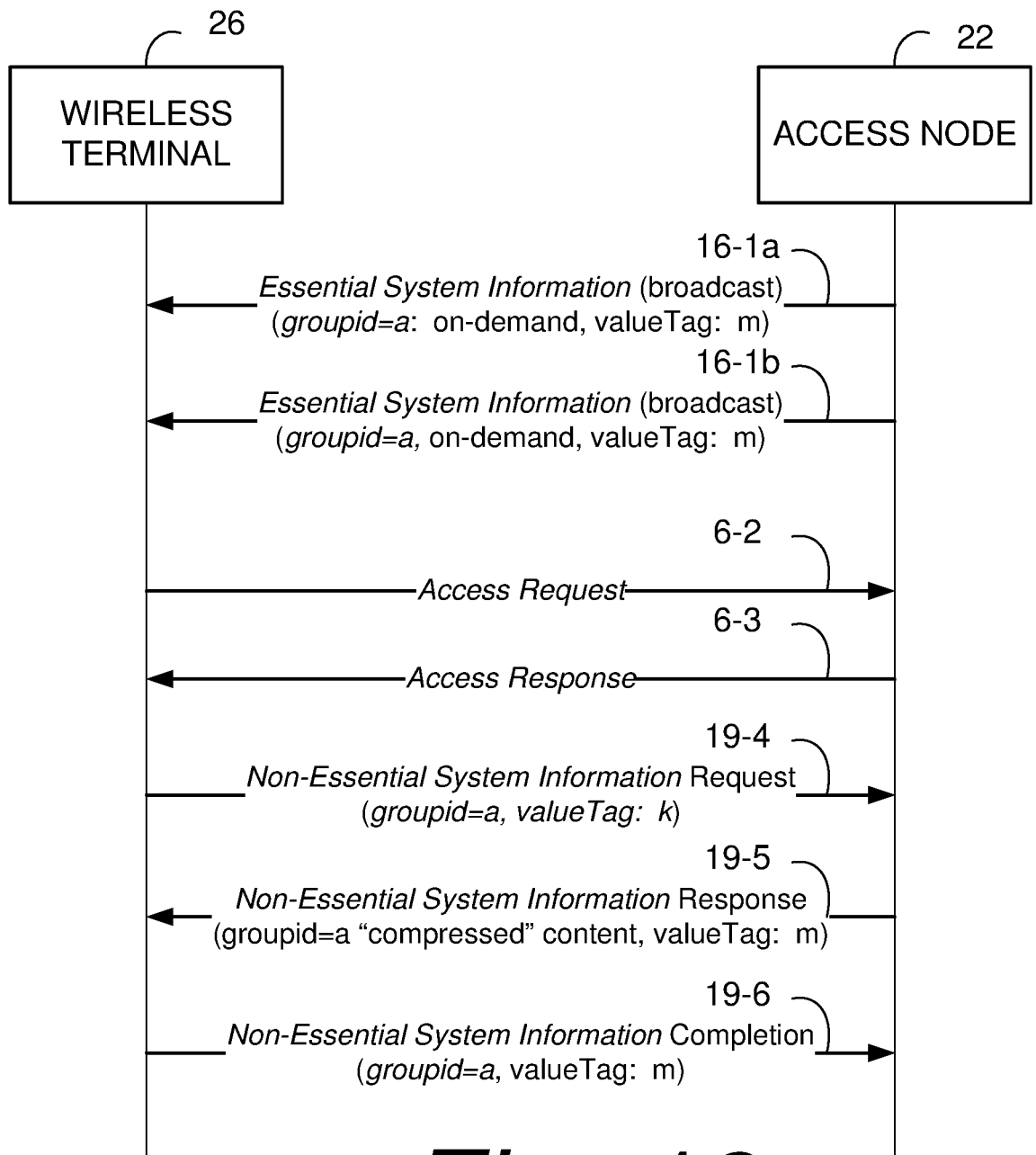
FIG. 19 is a diagrammatic view showing example message flow for another example embodiment and mode which combines features of the embodiment and mode of FIG. 10 and the embodiment and mode of FIG. 14.

Another example embodiment and mode, having message flow represented by FIG. 19, is based on the combination of the content compression method disclosed in the embodiment of FIG. 10 and the concept of non-essential SIB group described in the embodiment of FIG. 14. In the message flow of FIG. 19, the wireless terminal 26 sends Non-essential System Information Request message 19-4 with groupIdx=a, since the value tag that UE saves for this non-essential SIB group is not current. The Non-essential System Information Response message 19-5 that the radio access node 22 sends in response contains compressed content of the non-essential SIB group. In one implementation, the compressed content comprises the differences between the current non-essential SIBs (valueTag=m) and the previously broadcasted non-essential SIBs (valueTag=k) under the same non-essential SIB group.

Figure 20:
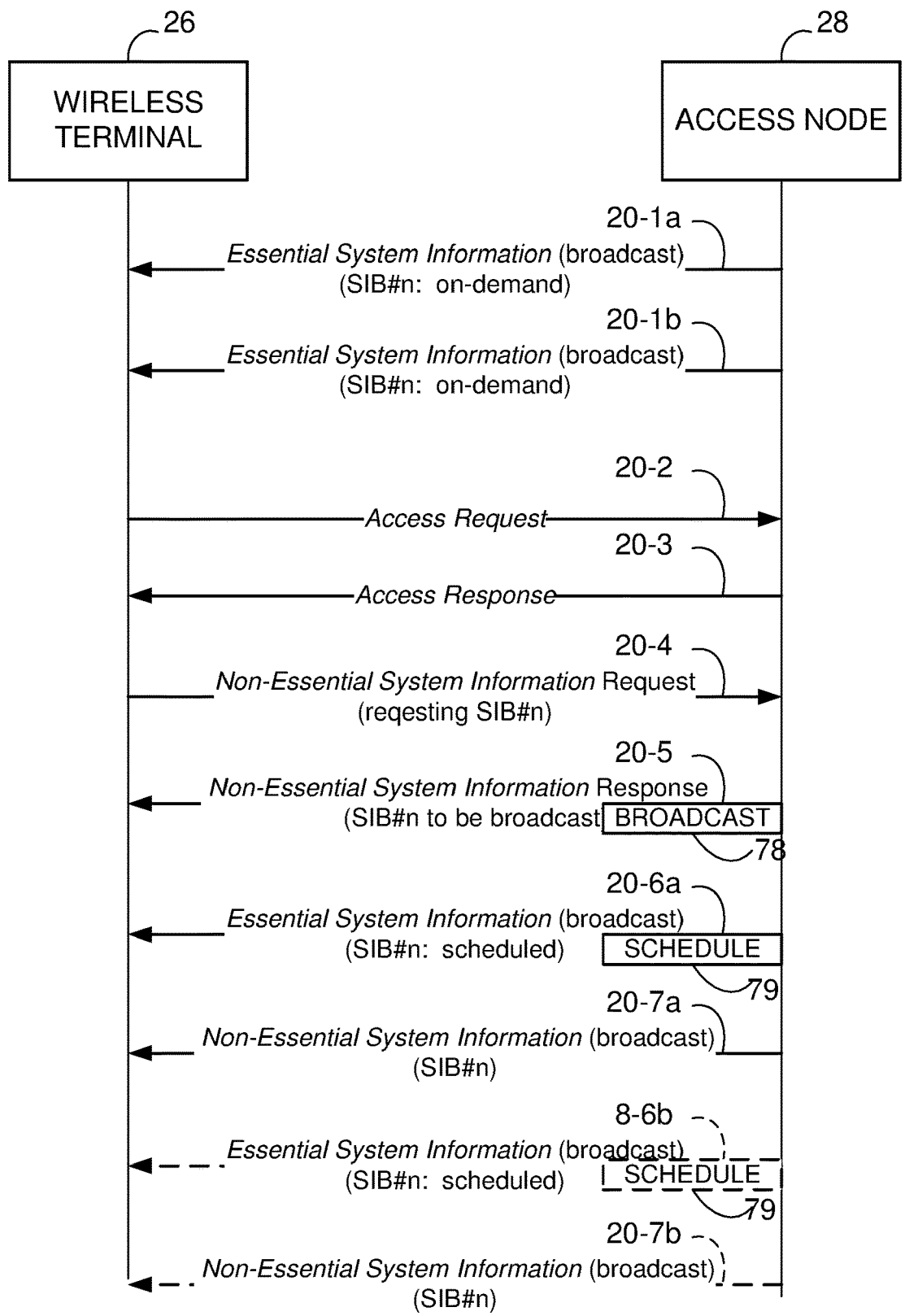
FIG. 20 is a diagrammatic views showing an example message flow for yet other example embodiments and modes.

FIG. 20 illustrates another signaling message flow for another example embodiment and mode. The initial messages of FIG. 20 are similar to those of some preceding embodiments and modes, but in FIG. 20 the Non-essential System Information Response message 20-5 includes an information element 78 indicating that the requested SIB #n will be broadcasted instead of unicasted. The radio access node 22, at a subsequent cycle of an Essential System Information message transmission (e.g., at message 20-6a), starts including at least one information element (such as information element 79) for the scheduling information of SIB #n transmissions. Based on this scheduling information, the radio access node 22 broadcasts the Non-essential System Information message 20-7a containing the requested SIB #n. As indicated by the messages depicted in broken lines in FIG. 20, the radio access node 22 may repeat these two steps multiple times for reliable delivery. By receiving at least one of these repetitions, the wireless terminal 26 should successfully obtain the SIB #n. The number of the repetitions may be determined by the radio access node 22, and information indicating the number may be broadcasted together with the essential system information. Alternatively, the number of the repetitions may be determined by the wireless terminal 26 and may be notified to the radio access node 22 through the Non-essential System Information Request message 20-4.

Figure 21:
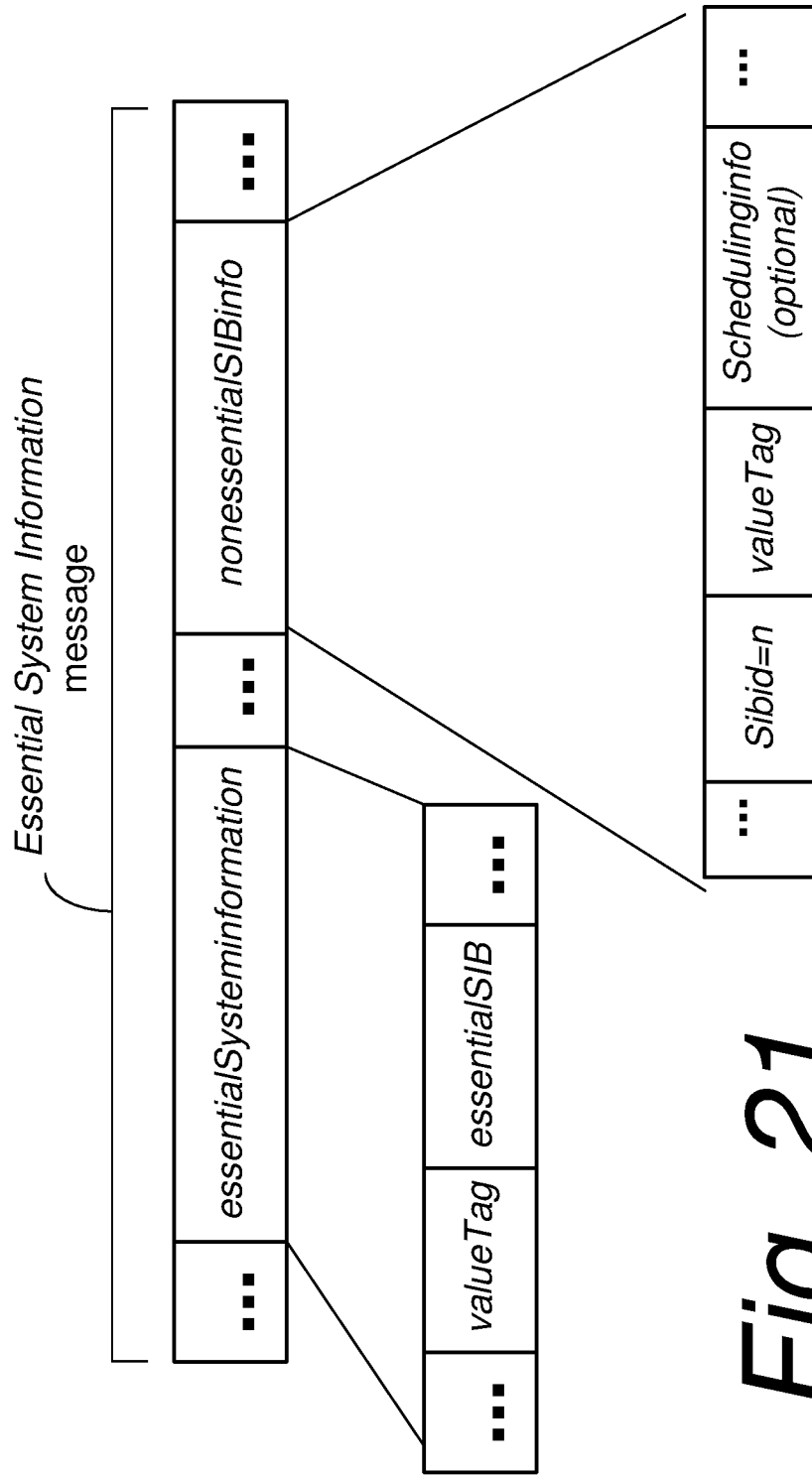
FIG. 21 is a diagrammatic view showing an example format of an Essential System Information message according to an example implementation of the system of FIG. 20.

In some implementations of the example embodiment and mode of FIG. 20 the access node 22 may include a value tag(s) in messages, such as in the Essential System Information message(s) 20-6 of FIG. 20. Likewise, in some example implementations the broadcasted Non-essential System Information message(s) 20-7 may comprise a value tag that represents the version of the non-essential SIB(s) delivered by the Non-essential System Information message(s). In this regard, FIG. 21 shows one exemplary format of the Essential System Information with the scheduling information, where the SchedulingInfo optional information element is used for indicating the broadcast schedules for Non-essential System Information message with the updated SIB #n content.

A benefit of the FIG. 20 embodiment and mode is that the requested SIB #n may also be received by other wireless terminals entering the same coverage area. Such wireless terminals may receive the Essential System Information message 20-6 and know that the SIB #n is scheduled to be transmitted. As a result, the number of transmissions for Non-essential System Information Request message 20-4 may be reduced. An additional benefit is that the transmissions of messages 20-2 and 20-3 may also be reduced.

Figure 22:
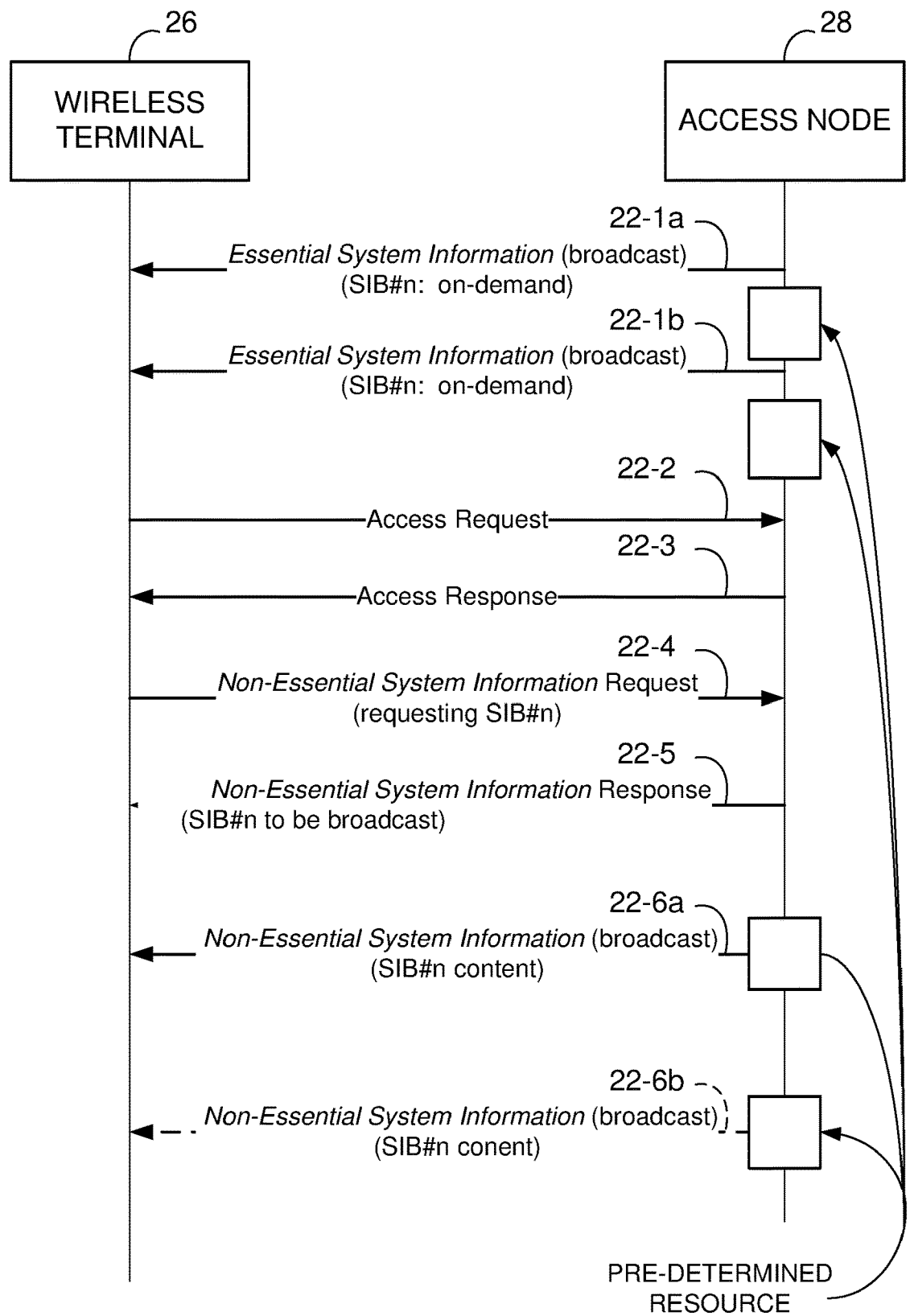
FIG. 22-FIG. 25 are diagrammatic views showing example message flows for still yet other example embodiments and modes.

FIG. 22 illustrates yet another signaling message flow for another example embodiment and mode. The initial messages of FIG. 22 are similar to those of some preceding embodiments and modes, but in FIG. 22 the broadcasts of SIB #n in the Non-essential System Information message(s) 22-6 occur on pre-determined resource allocations. For example, the pre-determined resource allocations may be defined by using a periodicity and/or an offset. The radio access node 22 may optionally repeat sending Non-essential System Information messages 22-6 at multiple occasions. The wireless terminal 26 that has sent a Non-essential System Information Request message 22-4, requesting the SIB #n, may receive Non-essential System Information on at least one pre-determined radio resource allocation, without receiving an Essential System Information message. The radio access node 22 may use these allocated resources for other purposes if it does not transmit SIB #n.

In the FIG. 22 embodiment and mode, any other wireless terminal entering the coverage first receives the Essential System Information message 22-1, then it may monitor pre-determined resources for several times before sending Non-essential System Information Request message 22-4, in order to suppress unnecessary transmissions of Non-essential System Information Request message. The number of monitoring trials may be pre-determined, or may be configured by the Essential System Information message.

In addition, in the FIG. 22 embodiment and mode the pre-determined resource allocations can be configurable by including the information of allocations in Essential System Information message 22-1. The pre-determined resource allocations of a given non-essential SIB may be jointly coded with whether the non-essential SIB is available at this radio access node by request. Alternatively, the pre-determined resource allocations may be tied to the SIB indices.

Figure 23:
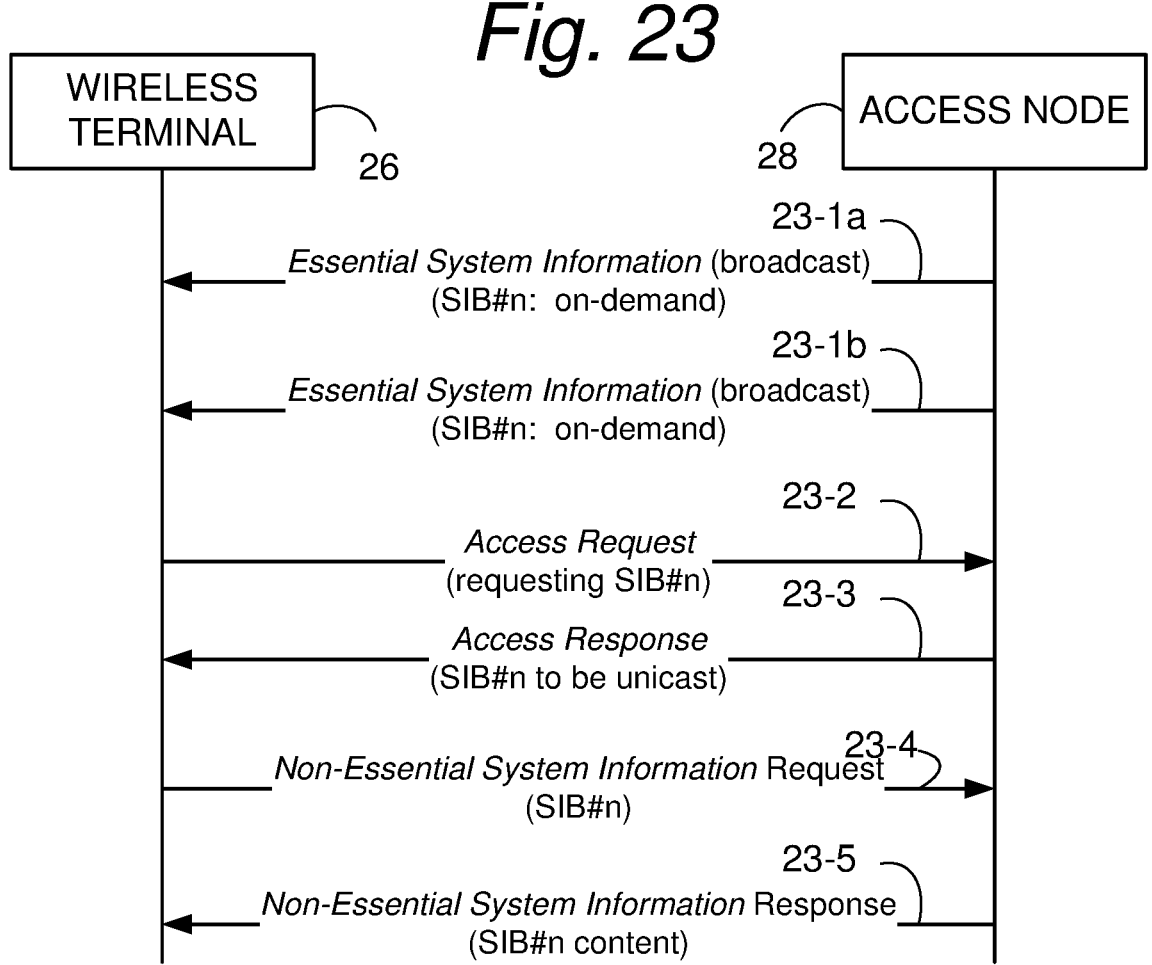
Figure 24:
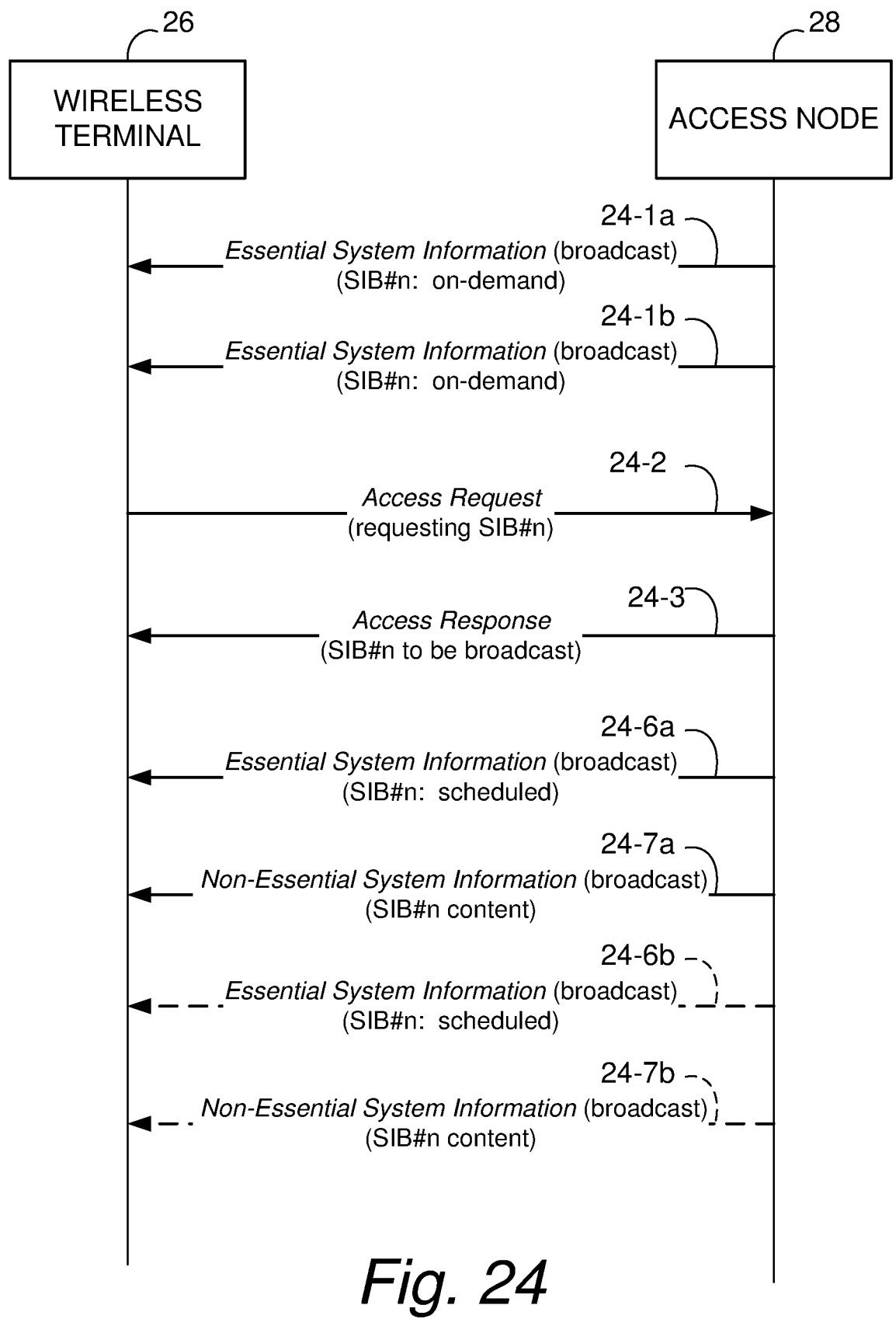
Figure 25:
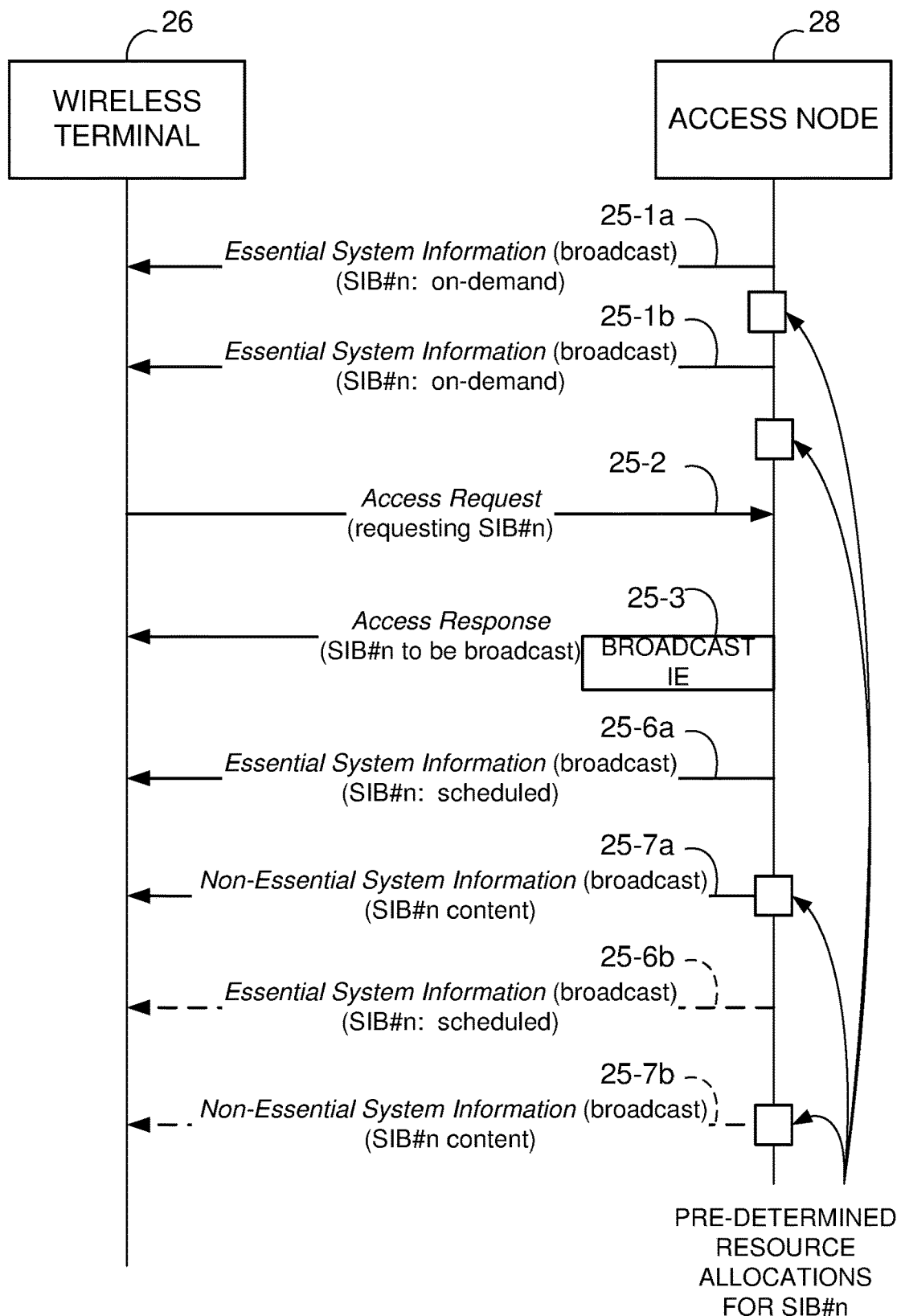

FIG. 23 illustrates yet another signaling message flow for another example embodiment and mode. In FIG. 23, the Access Request message(s) 23-2 now contain(s) a request for the SIB #n broadcast. The radio access node that receives the request may decide to deliver the SIB #n by unicast, or by broadcast. In case of unicast, it includes an information element of unicast indication for SIB #n in Access Response message 23-3, as shown in FIG. 23. Otherwise, the radio access node includes an information element of a broadcast indication for SIB #n in Access Response message 24-3, as shown in FIG. 24. An alternative approach to FIG. 24 is shown in FIG. 25, where Non-essential System Information message 25-5 is broadcasted on pre-determined resource allocations.

Further information regarding the technology disclosed herein, including but not limited to the example embodiments and modes of FIG. 20-FIG. 25, is provided in related US Provisional Application (serial no. 62/367,447), entitled "ON-DEMAND SYSTEM INFORMATION FOR WIRELESS TELECOMMUNICATIONS", filed on Jul. 27, 2016.

In certain example embodiments and modes described above, if the access node 22 updates the content of a non-essential SIB, a new value of the value tag for the SIB will be used, e.g., in the Essential System Information message. In one example implementation, the value tag may be incremented (e.g., incremented by one). The wireless terminals under the coverage of the access node 22 may (1) eventually receive the message with the new value tag, (2) find out that the previously received SIB becomes obsolete, and (3) decide to send a Non-essential System Information Request message to the access node 22.

Figure 26:
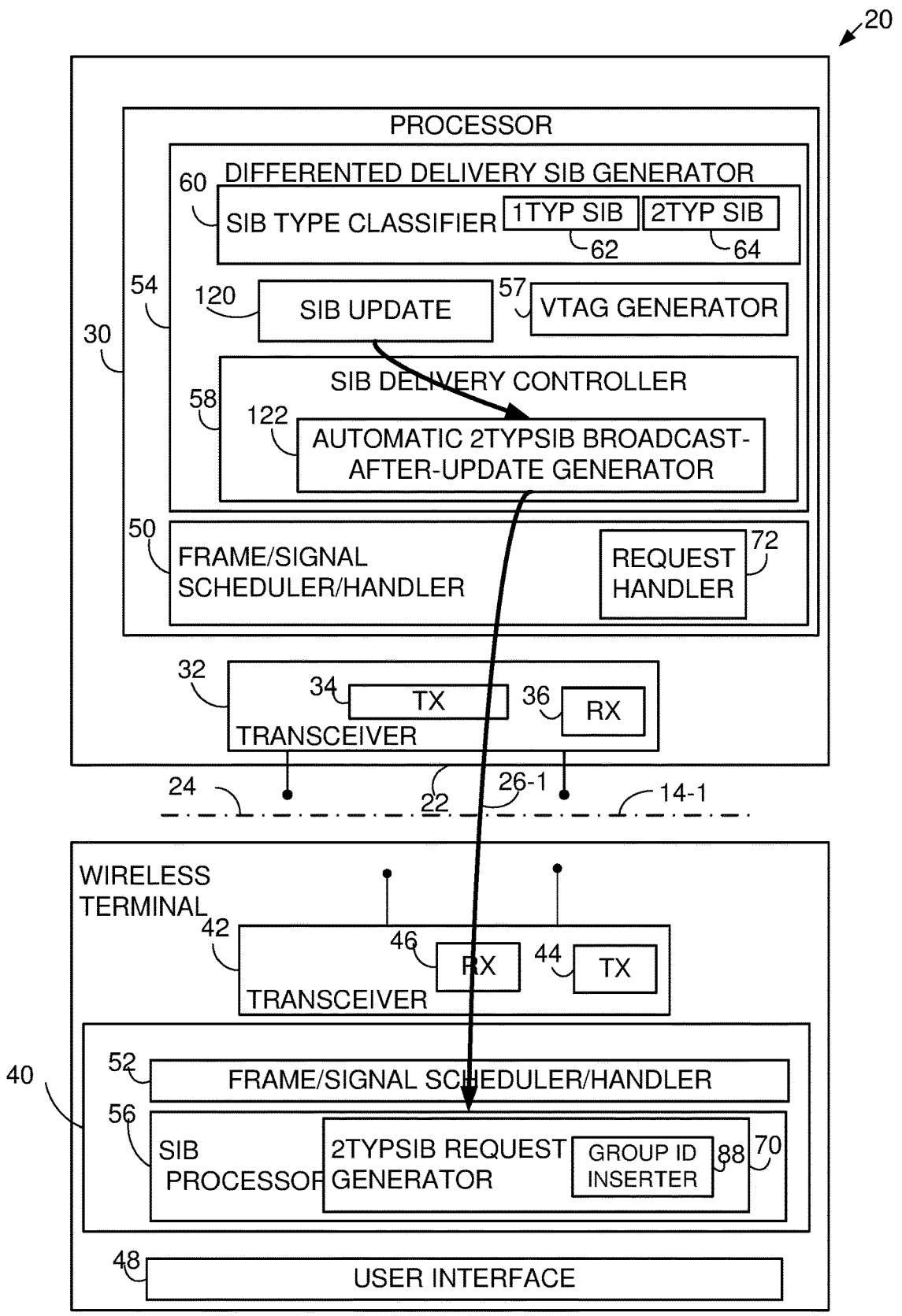
FIG. 26 is a schematic view showing an example communications system comprising a radio access node and a wireless terminal, and wherein the radio access node provides an automatic broadcast-after-update for system information.

FIG. 26 illustrates certain example embodiments and modes which seek to avoid congestion that may occur if many Non-essential System Information Request messages are transmitted from wireless terminals. In particular, the example embodiment and mode of FIG. 26 allows the access node 22 to broadcast the new content of the non-essential SIB for limited times after the SIB update. The broadcast-after-update technology of FIG. 26 may be utilized in conjunction/combination with any other of the example embodiments and modes described herein.

FIG. 26 shows node processor 30, and SIB generator 54 in particular, as comprising SIB update functionality 120. The SIB update functionality 120 either updates/changes the second type system information or detects an update or change in the second type system information. The SIB delivery controller 58 comprises automatic second type system information broadcast-after-update generator 122. Whenever there is an update or other change for the second type system information as performed or detected by the SIB update functionality 120, the automatic second type system information broadcast-after-update generator 122 generates broadcast messages 26-1 including the new/updated content of the second type system information. The broadcast messages 26-1 including the new content of the second type system information continue only for a limited time, or a predetermined number of automatic-after-update broadcast messages.

Figure 27:
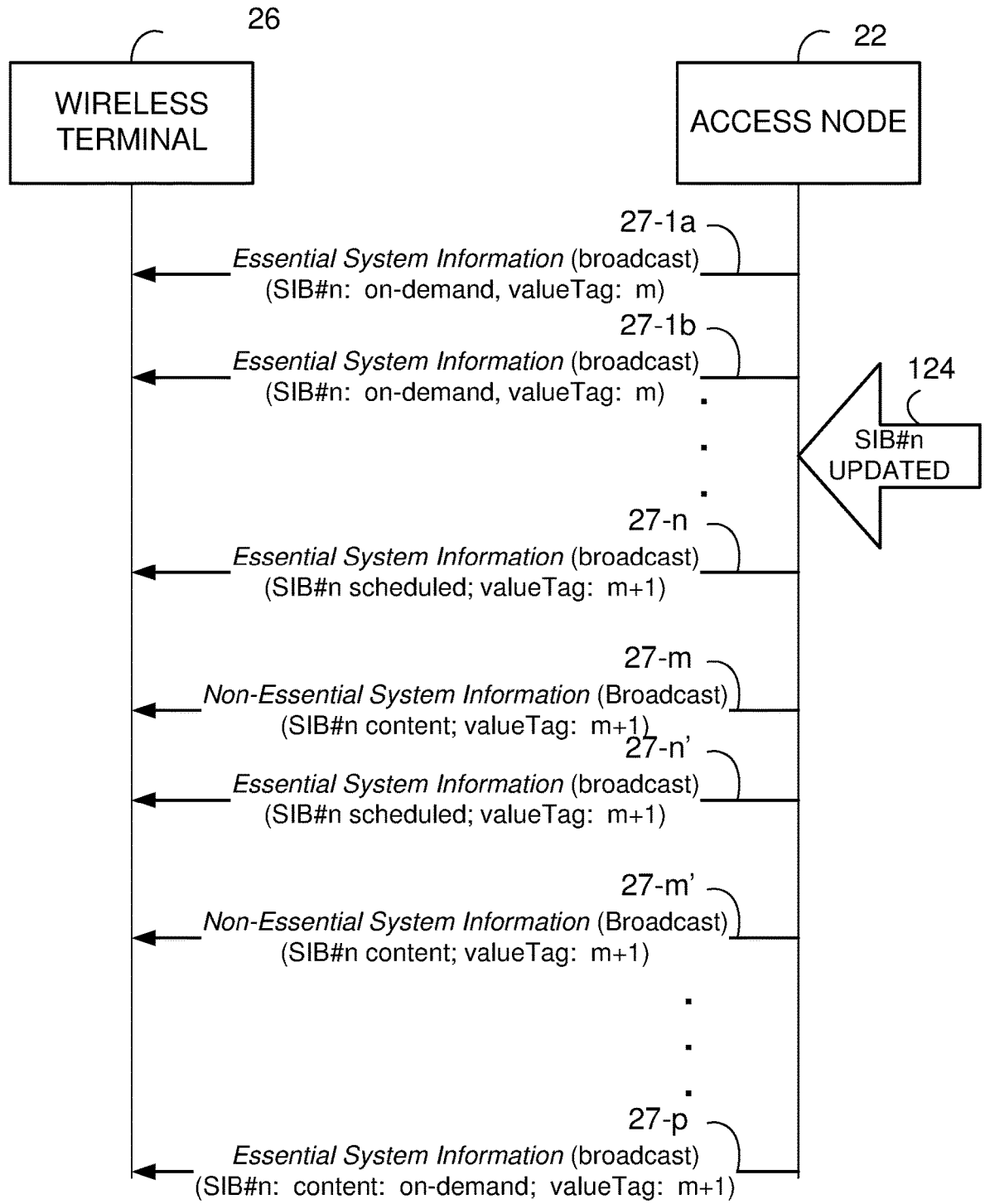
FIG. 27 is a diagrammatic view showing example message flow for the example communications system of FIG. 16.

FIG. 27 illustrates a message flow for an example scenario of the example embodiment and mode of FIG. 26. In the example scenario of FIG. 27, as shown by arrow 124 SIB #n gets updated (e.g., by SIB update functionality 120) and its value tag changes from m to m+1. From this moment the access node 22 starts including the new value tag m+1 for SIB #n in the Essential System Information message(s) 27-n. In addition, at least one transmission of the Essential System Information message(s) 27-n after the SIB #n update may include scheduling information to indicate one or plurality of broadcast schedules for the updated SIB #n content. Based on the scheduling information, the access node 22 broadcasts Non-essential System Information message(s) 27-m including the updated SIB #n content. As indicated by the primed message suffixes in FIG. 27, the access node 22 may optionally transmit Essential System Information message(s) with the scheduling information and the Non-essential System Information message(s) with the SIB #n content multiple times, e.g., for a predetermined time period after the SIB #n update, for example. As further shown in FIG. 27, after the automatic broadcast-after-update messages 27-n and 27-m, the access node 22 may also broadcast the fact that the SIB #n update is available on demand, as indicated by message 27-p.

In the example embodiment and mode of FIG. 26 and FIG. 27, the access node 22 may use the message format shown in FIG. 21 for the Essential System Information message with the scheduling information. The wireless terminals receiving this Essential System Information message may attempt to receive the scheduled Non-essential System Information message, instead of requesting on-demand delivery of the updated SIB #n. Once the scheduled broadcasts of the updated SIB #n content are completed, the wireless terminal may no longer use the optional information element.

Some communication systems may employ discontinuous reception (DRX), where the wireless terminals do not always monitor the periodic transmission of the Essential System Information message. In order to ensure that the wireless terminals under the coverage of the access node receive the automatic broadcast-after-update messages, the system in some implementations may use a separate signaling mechanism to trigger the reception of the Essential System Information message. One example is that the access node includes an indication in the Paging message for predetermined duration before transmitting the Essential System Information message 27-*n*.

Figure 28:
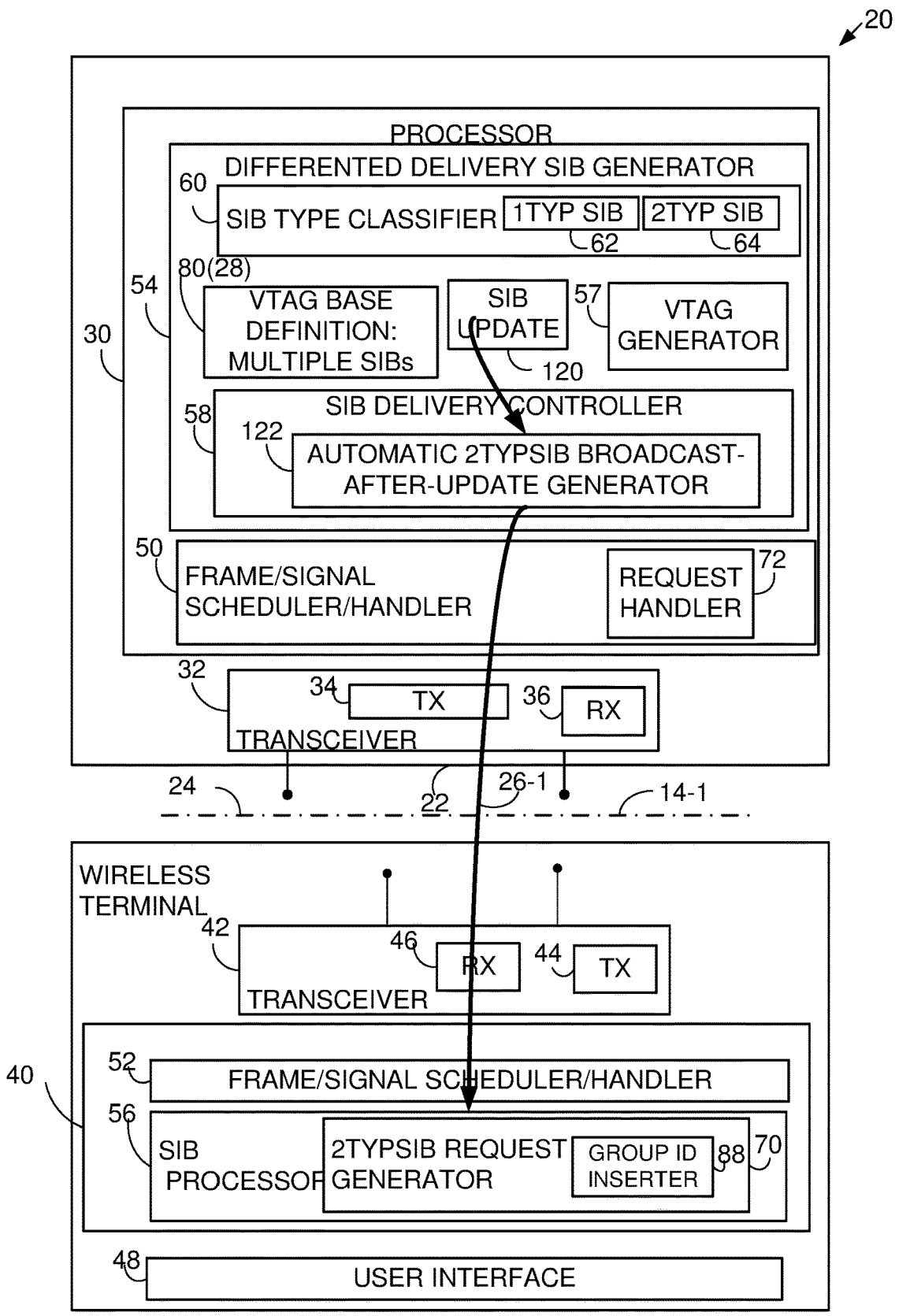
FIG. 28 is a schematic view showing an example communications system comprising a radio access node and a wireless terminal, and wherein the radio access node provides an automatic broadcast-after-update for system information for a group of second type system information blocks.

The example embodiment and mode of FIG. 28 is based at least in part on the example embodiment and mode of FIG. 26 and at least in part on the example embodiment and mode of FIG. 14 wherein the access node 22 may employ the concept of non-essential SIB groups. In the FIG. 28 example embodiment and mode, the Non-essential System Information message which is automatically broadcasted after the SIB content update includes the contents of multiple SIBs grouped with the same value tag.

FIG. 28 shows the node processor 30 and the SIB generator 54 in particular as comprising not only the SIB update functionality 120 and the automatic second type system information broadcast-after-update generator 122, but also a value tag base definition logic 80(28) which defines multiple SIB groups associated with the value tag.

Figure 29:
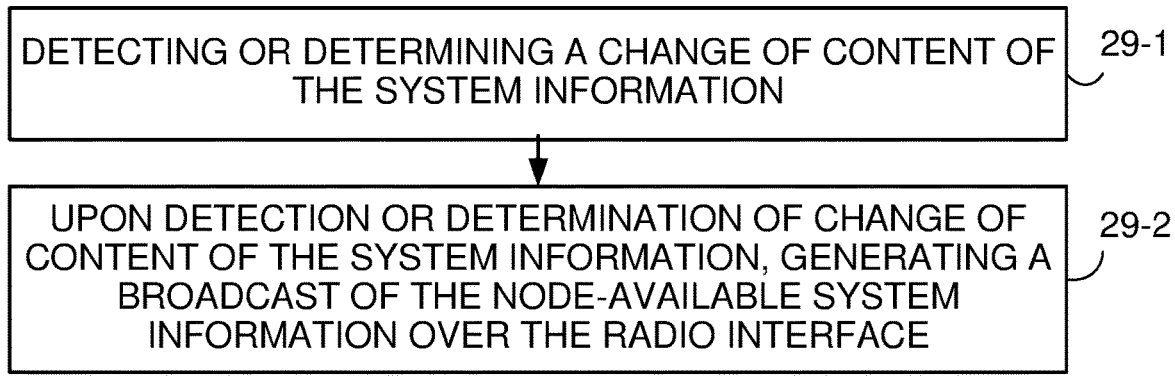
FIG. 29 is a flowchart showing example, representative, basic acts or steps performed by the radio access node of FIG. 28.

FIG. 29 shows example, representative, basic acts or steps performed by the radio access node 22 of FIG. 28. Act 29-1 comprises detecting or determining a change of content of the system information. Act 29-2 comprises, upon the detection or the determination of change of content of the system information, generating a broadcast of the updated system information over the radio interface. In the example embodiment and mode of FIG. 29, the change of content may be an update of the system information, and the changed or updated system information may in particular be second type system information. Moreover, the broadcast may be broadcast messages which are scheduled, with scheduling information for such broadcast being included in previous broadcast such as a node-available system information message. Such previous broadcast message may be, in at least some embodiments, can be an Essential System Information broadcast message. Moreover, in example implementation, the broadcast of the second type system information over the radio interface may occur only for a predetermined time, e.g., a predetermined number of such broadcasts.

Figure 30:
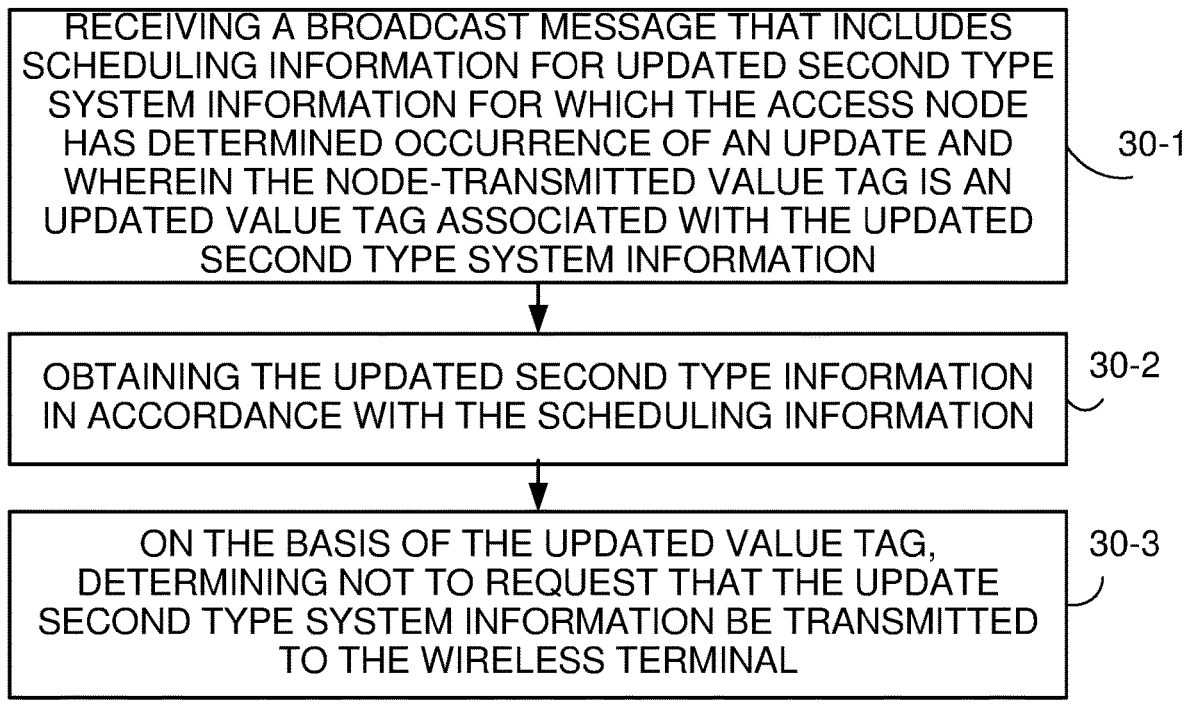
FIG. 30 is a flowchart showing example, representative, basic acts or steps performed by the wireless terminal of FIG. 28.

FIG. 30 shows example, representative, basic acts or steps performed by the wireless terminal 26 of FIG. 28. Act 30-1 comprises receiving a broadcast message that includes scheduling information for updated second type system information for which the access node has determined occurrence of an update and wherein the node-transmitted value tag is an updated value tag associated with the updated second type system information. Act 30-2 comprises obtaining the updated second type information in accordance with the scheduling information. Act 30-3 comprises, on the basis of the updated value tag, determining not to request that the update second type system information be transmitted to the wireless terminal.

Figure 31:
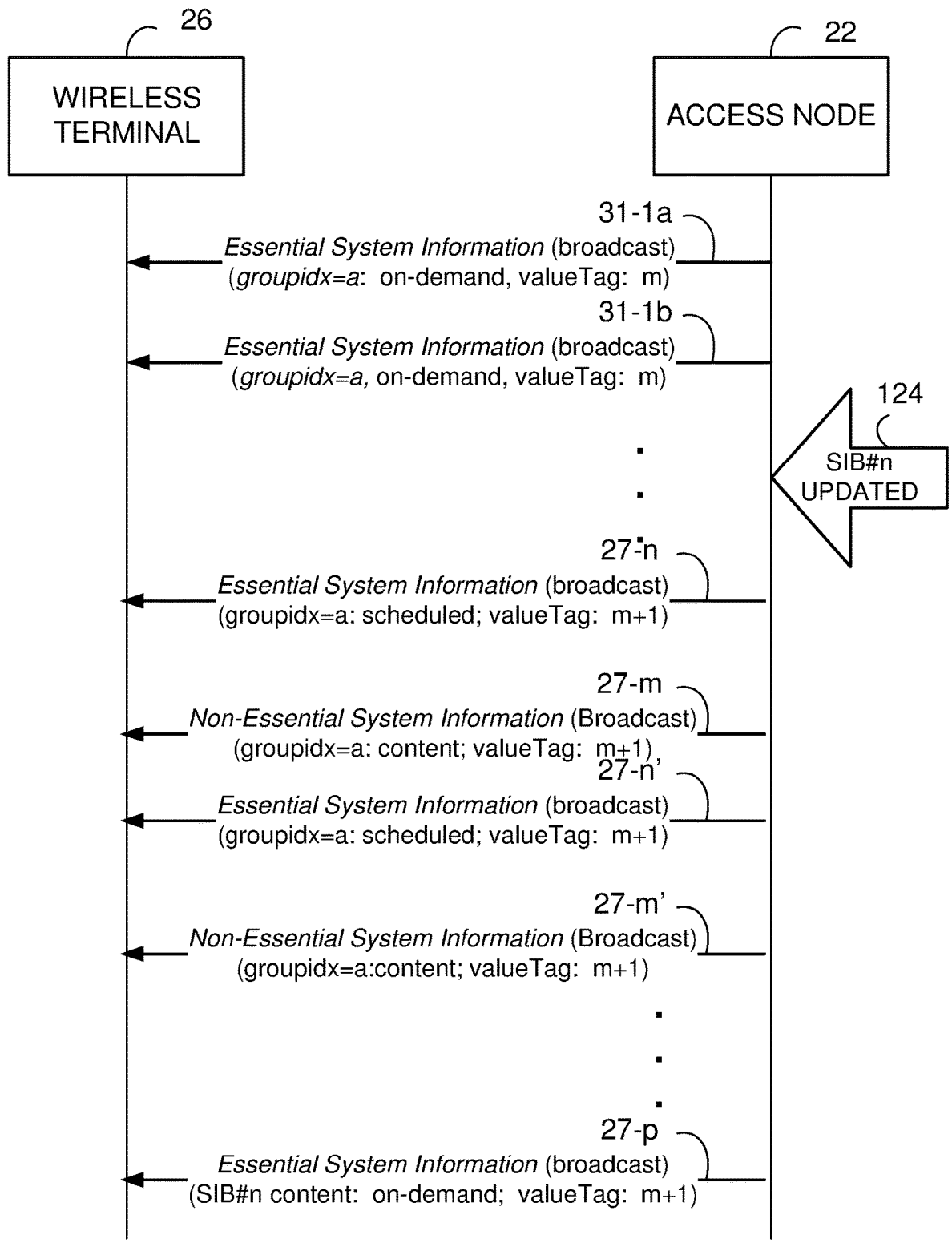
FIG. 31 is a diagrammatic view showing example message flow for the example communications system of FIG. 28.
Figure 32:
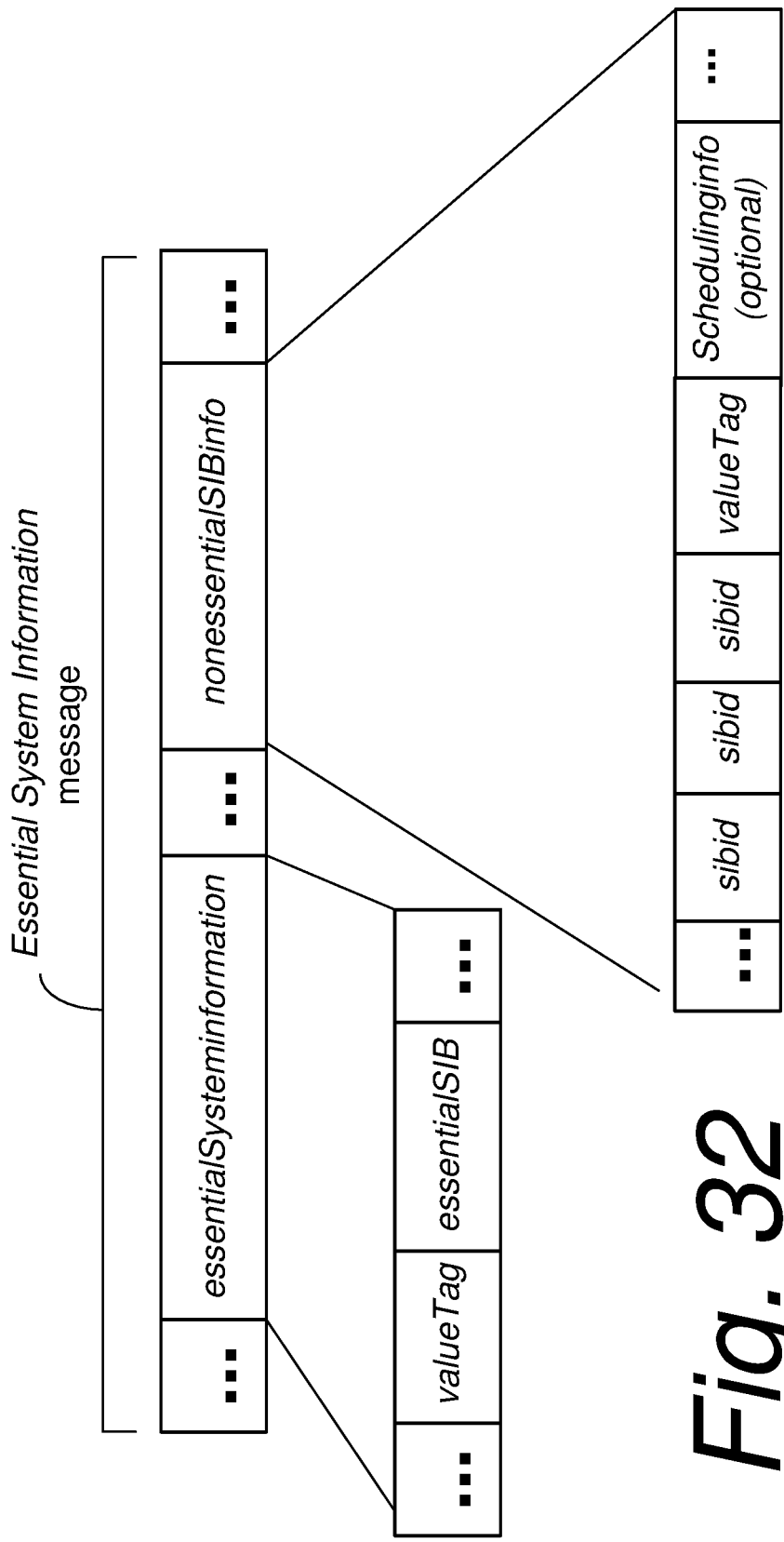
FIG. 32 is a diagrammatic view showing an example format of an Essential System Information message according to an example implementation of the system of FIG. 28.

FIG. 31 shows an example of message flow for the example embodiment and mode of FIG. 28; FIG. 32 shows an example message format of the Essential System Information message for example embodiment and mode of FIG. 27 and FIG. 28.

Figure 33:
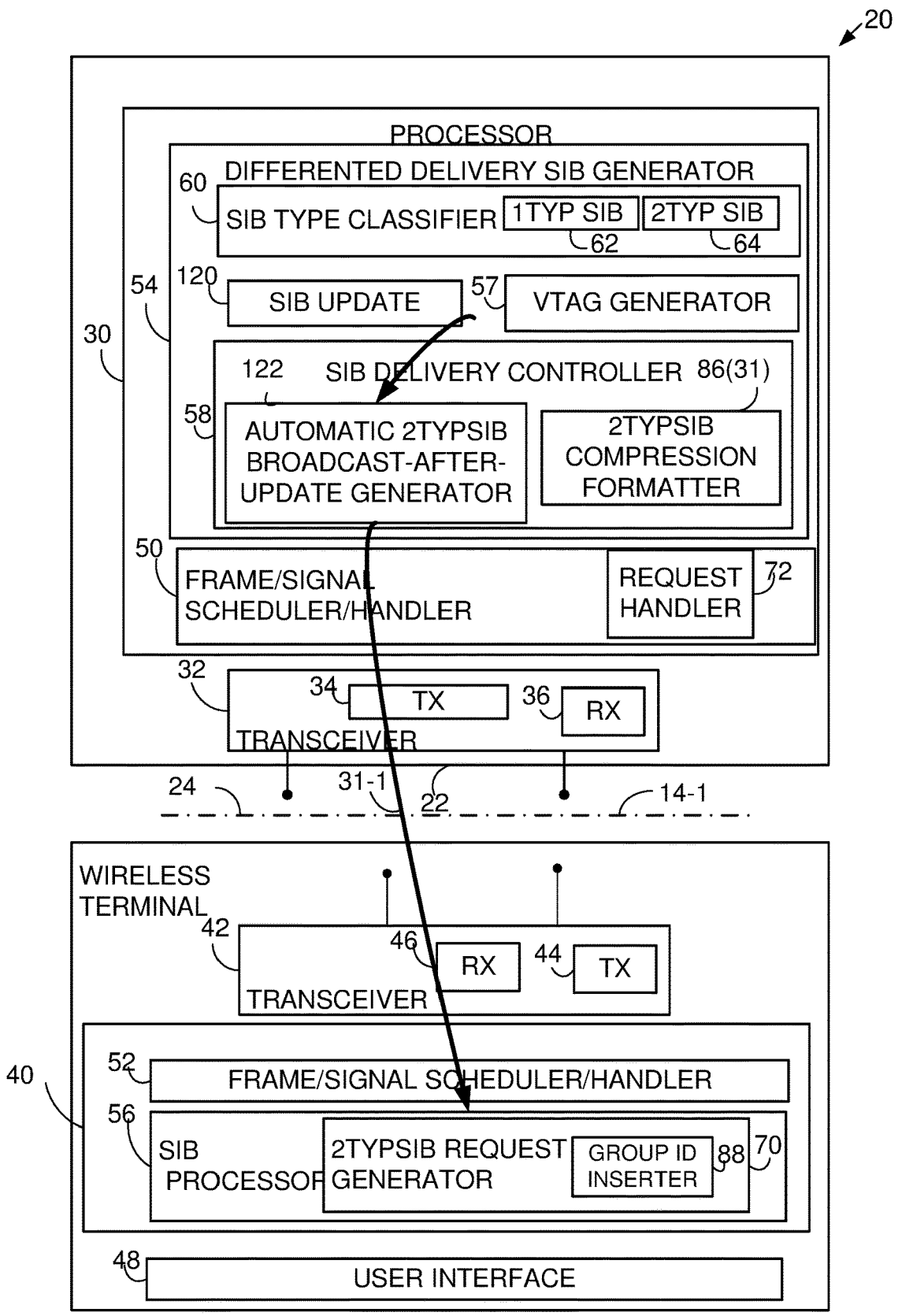
FIG. 33 is a schematic view showing an example communications system comprising a radio access node and a wireless terminal, and wherein the radio access node provides a compressed automatic broadcast-after-update message for second type system information blocks.

FIG. 33 illustrates certain example embodiments and modes which allow the access node 22 to broadcast a "compressed" image of updated non-essential system information in conjunction with the automatic broadcast-after-update feature. The node processor 30 of access node 22, and the SIB generator 54 in particular, comprise both the SIB update functionality 120 and automatic second type system information broadcast-after-update generator 122, as well as 2TYPSIB compression formatter 86(31). Upon actual update or detection of update of system information by functionality 120, the broadcast-after-update generator 122 generates a compressed SIB broadcast-after-update message 33-1, in which compression is achieved by virtue of 2TYPSIB compression formatter 86(31) preferably including in the SIB broadcast-after-update message 33-1 only those system information parameters of the SIB block which have changed.

Figure 34:
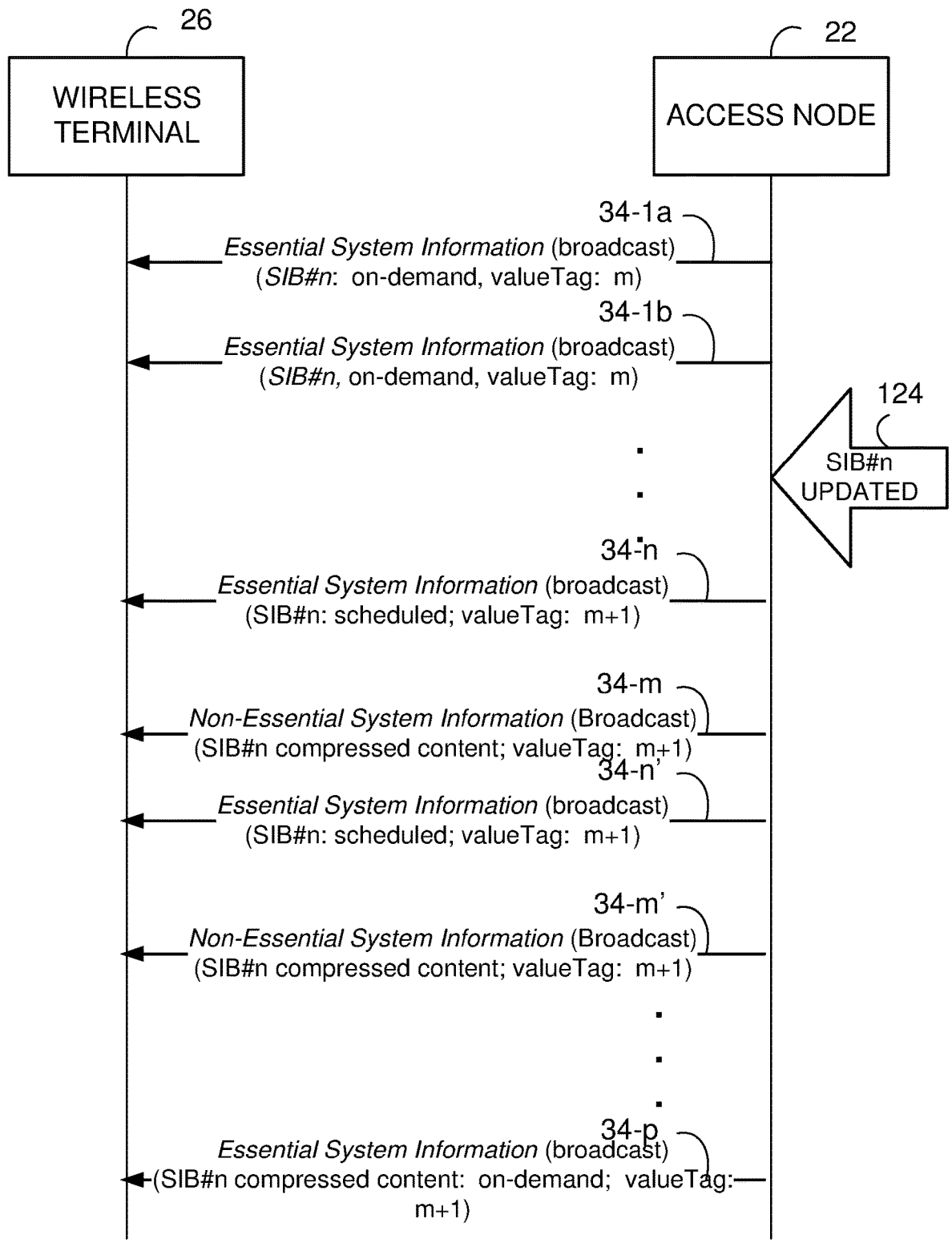
FIG. 34 is a diagrammatic view showing example message flow for the example communications system of FIG. 33.

FIG. 34 shows an exemplary message flow for the embodiment and mode of FIG. 33. In FIG. 32, the broadcasted Non-essential System Information message(s) 34-*n* now include(s) a compressed content of the updated SIB #n with valueTag=m+1. As described in a previous embodiment and mode, in one implementation the compressed content comprises the differences between the updated SIB #n (valueTag=m+1) and the previously transmitted (valueTag=m).

The wireless terminal 26 which receives the broadcasted Non-essential System Information message 34-*n* with the compressed SIB #n content with valueTag=m+1 checks if it has previously received SIB #n with valueTag=m and has saved the content in its memory. If so, the wireless terminal 26 simply applies the received compressed image to the saved content to construct the updated content. Otherwise, the wireless terminal 26 may initiate an on-demand delivery request of the updated SIB #n content using one or some of the methods already disclosed above.

Figure 35:
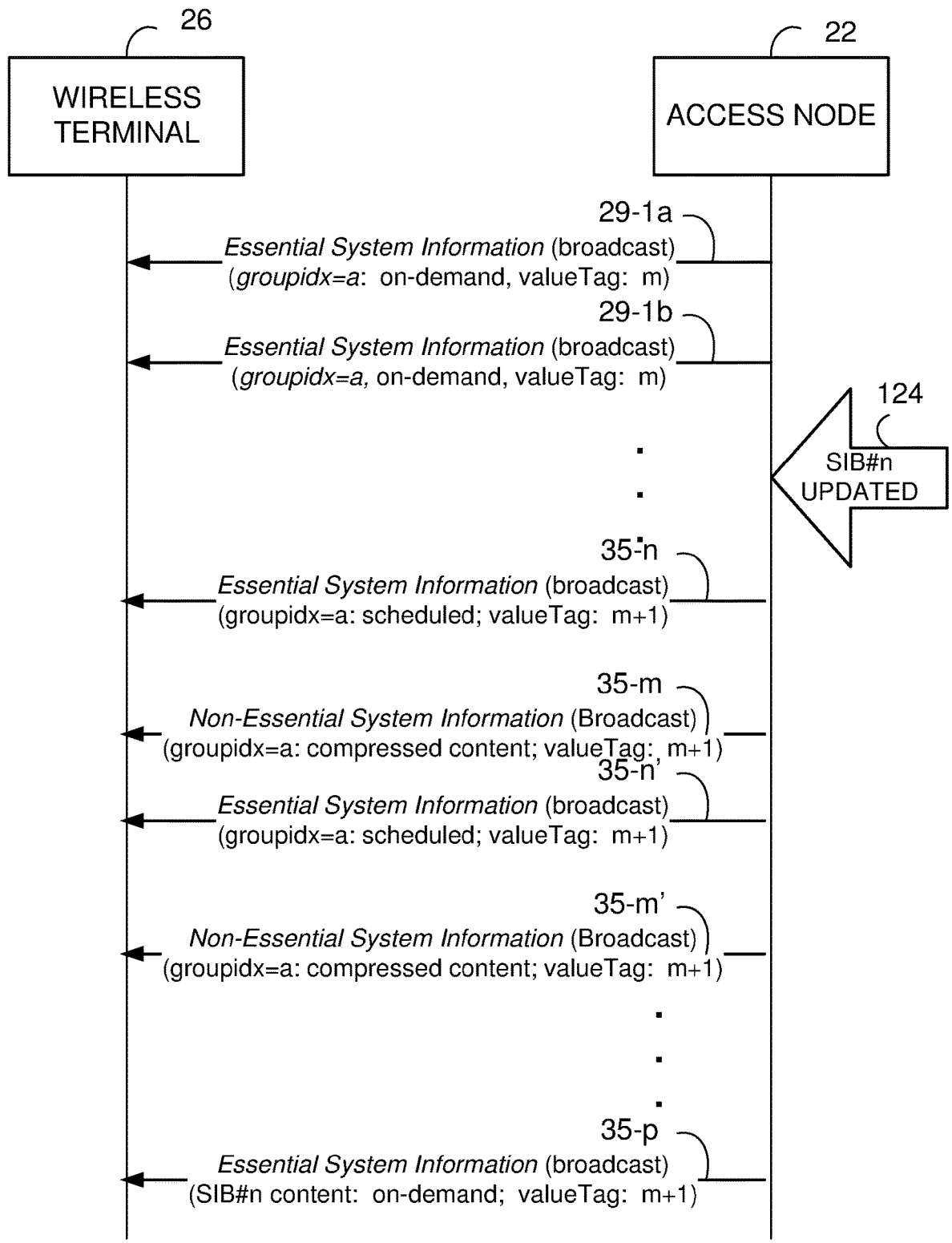
FIG. 35 is a diagrammatic view showing example message flow for an example communications system such as that of FIG. 33 which also uses compression.

FIG. 35 illustrates an example message flow for certain example embodiments and modes which applies the concept of non-essential SIB groups to the example compression embodiment and mode of FIG. 32 in conjunction with the automatic broadcast-after-update feature. In FIG. 35 the Essential System Information message 35-*n* advertises one or more groupIdx's, each of which is associated with a value tag valueTag, as disclosed in a previous example embodiment and mode. Similar to a previous example embodiment and mode, the broadcasted Non-essential System Information message 35-*m* may contain compressed content of the non-essential SIB group. In one implementation, the compressed content comprises the differences between the current non-essential SIBs (valueTag=m+1) and the previously broadcasted (valueTag=m) under the same non-essential SIB group.

Figure 36:
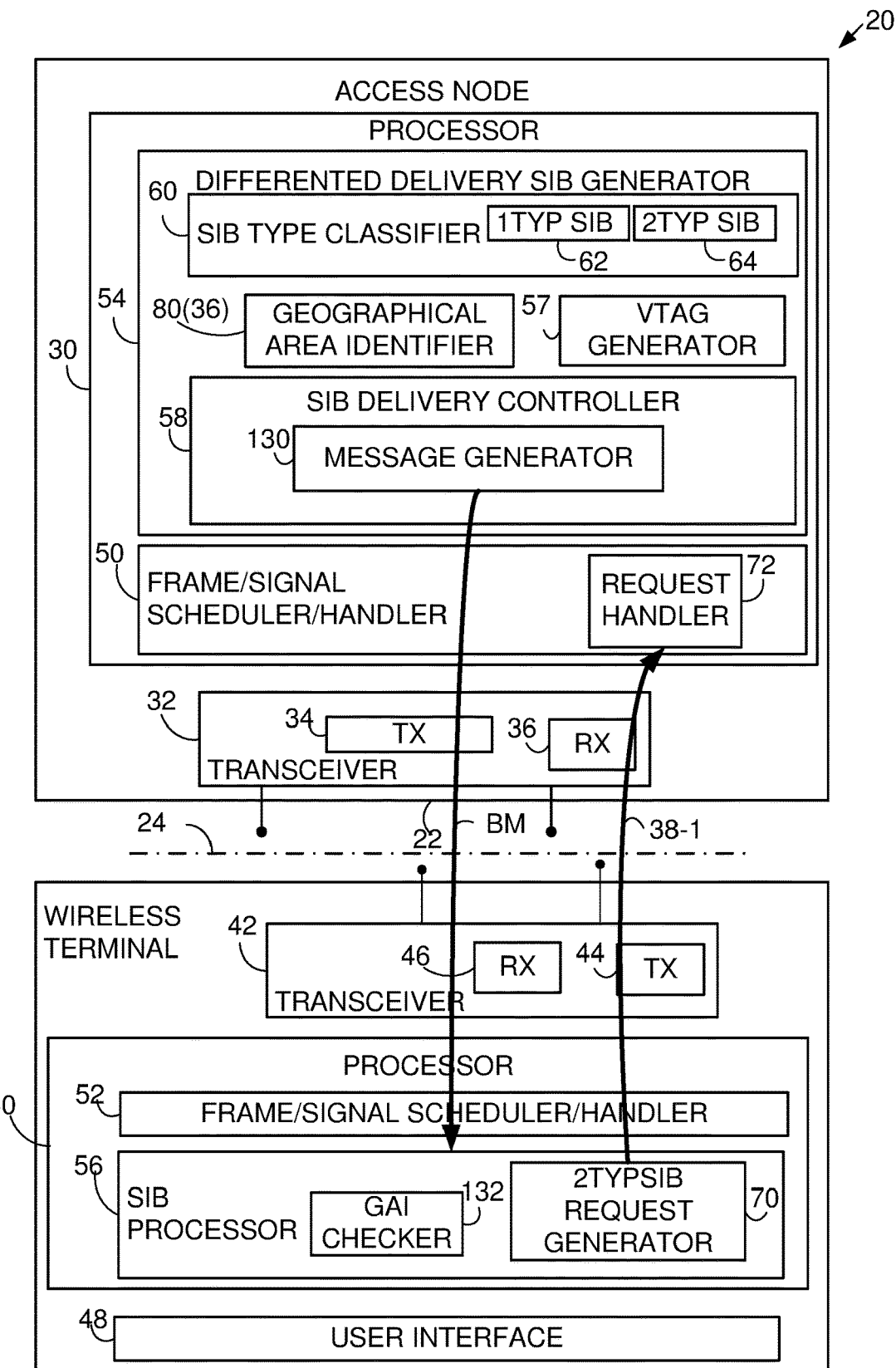
FIG. 36 is a schematic view showing an example communications system comprising a radio access node and a wireless terminal, and wherein the radio access node provides a geographical area identifier which specifies a geographical area for which the value tag is valid.

FIG. 36 illustrates certain example embodiments and modes in which a radio access node provides a geographical area identifier which specifies a geographical area for which the value tag is valid. In FIG. 36 the system information (SI) generator 54 includes value tag generator 57 and the value tag base definition takes the form of geographical area identifier (GAI) generator 80(36). The SIB delivery controller 58 of access node 22 includes message generator 130. In the wireless terminal 26 of FIG. 36 the SIB processor 56 includes geographical area identifier (GAI) checker 132.

The node processor 30 of FIG. 36, and the SIB delivery controller 58 in particular, schedules periodic transmission of a broadcast message (BM) to wireless terminal 26. The broadcast message BM of FIG. 36 comprises first type system information; identification of second type system information available from the access node; a value tag associated with the second type system information; and a geographical area identifier (GAI, or areaId). The geographical area identifier specifies a geographical area for which the value tag is valid. It will be recalled that the geographical area may be an area being served by the access node and a group comprising at least one other access node. The broadcast message BM may take the form of the node-available system information message NASIM 59, an example of which is the Essential System Information message as hereinbefore described. The value tag associated with the second type system information may be obtained from value tag generator 57. The geographical area identifier may be obtained from geographical area identifier generator 80(36). In one implementation, the geographical area identifier of a non-essential SIB or the geographical area identifier of a group of non-essential SIBs is pre-configured by a network management entity that coordinates multiple nodes. The node transmitter circuitry 34 transmits the broadcast message BM to the wireless terminal 26.

Figure 37:
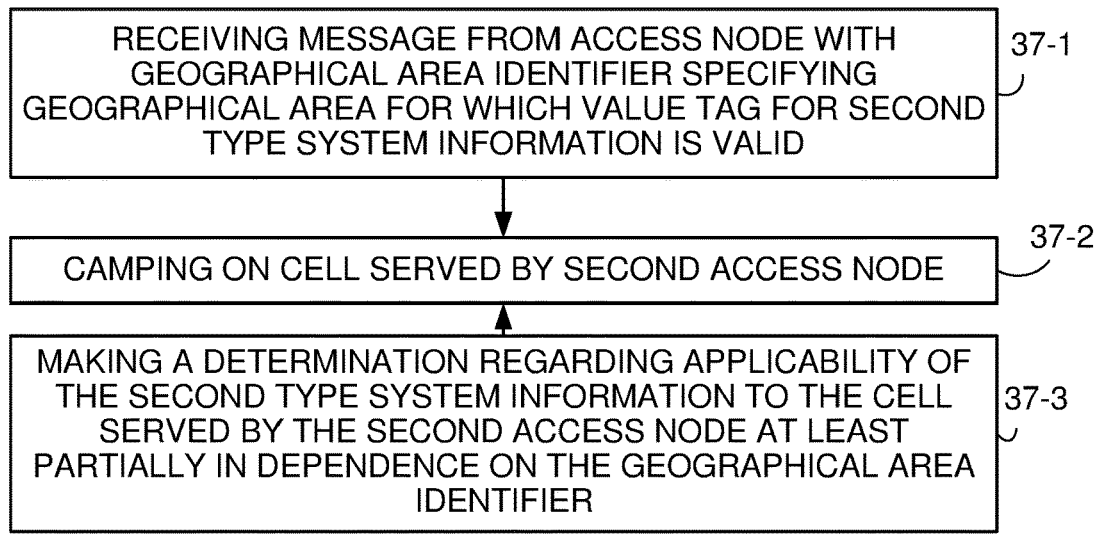
FIG. 37 is a flowchart showing example, representative, basic acts or steps performed by the wireless terminal of FIG. 36.
Figure 38:
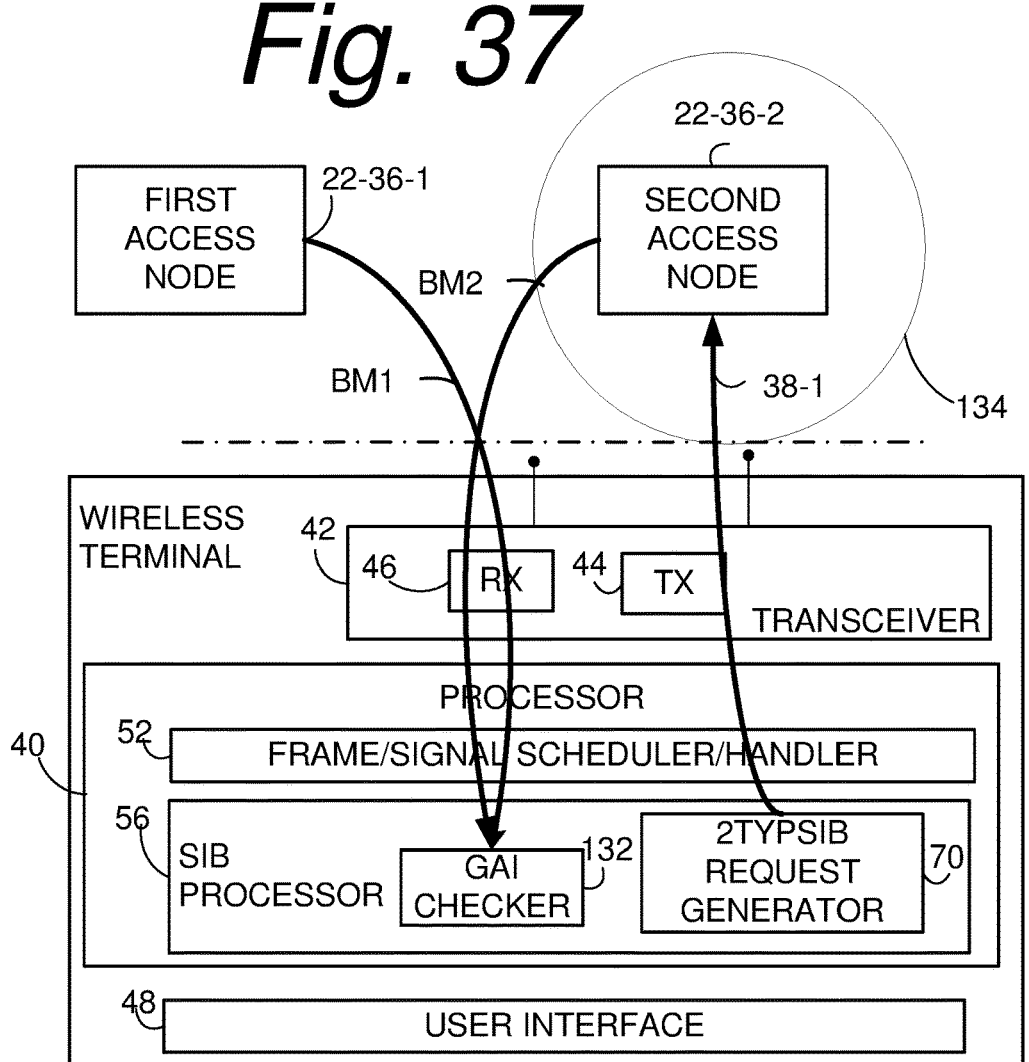
FIG. 38 is a diagrammatic view showing a context of a radio access network (RAN) in which the wireless terminal of FIG. 36 performs the acts of FIG. 37.

FIG. 37 shows example, representative acts or steps performed by the wireless terminal 26 of FIG. 36, in the context of a simplified depiction of radio access network (RAN) shown in FIG. 38. Act 37-1 comprises receiving a message, such as broadcast message BM, from a first access node (first access node 22-36-1). The message received from the first access node includes: first type system information; second type system information; a value tag associated with the second type system information; a geographical area identifier which specifies a geographical area for which the value tag is valid. Thus, as a result of act 37-1, the wireless terminal 26 of FIG. 36 obtains the content of the first type system information and the content of the second type system information as provided by the first access node 22-36-1.

Act 37-2 of comprises the wireless terminal 26 camping on a cell, such as cell 134 of FIG. 38, served by second access node 22-36-2. Act 37-3 comprises making a determination regarding applicability of the second type system information (obtained from the first access node 22-36-1) to the cell served by the second access node 22-36-2. The determination of act 37-3 is made at least partially in dependence on the geographical area identifier.

As understood from preceding embodiments and modes, the first type system information is periodically broadcasted by the transmitter and is required for initial access to the radio access network, but the second type system information is not required for initial access to the radio access network. Moreover, the node processor 30 may schedule transmission by the transmitter of content of the second type system information over the radio interface separately from the broadcast message which comprises the first type system information.

In the example embodiment and mode of FIG. 36 the terminal processor 40, and geographical area identifier checker 132 in particular, is configured to make the determination based at least partially on membership of the first access node and the second access node to a same geographical area. Membership in the same geographical area may be determined by a comparison of the geographical area identifier received from the first access node and a second geographical area identifier received from the second access node. FIG. 38 shows the first geographical area identifier being received in a first broadcast message BM1 from the first access node 22-36-1 and the second geographical area identifier being received in a second broadcast message BM2 from the first access node 22-36-2.

The terminal processor 40 is configured to use the second type system information received from the first access node 22-36-1 in the cell 134 served by the second access node 22-36-2 when the determination of act 37-3 indicates that the second type system information obtained from the first access node 22-36-1 is applicable to the cell 134 served by the second access node 22-36-2. On the other hand, when the determination of act 37-3 indicates that the second type system information obtained from the first access node is not applicable to the cell served by the second access node, as shown by arrow 38-1 in FIG. 36 and FIG. 38, the wireless terminal 26 requests, from the second access node 22-36-2, the second type system information for use in the cell 134 served by the second access node 22-36-2. The 2TYPSIB request generator 70 of wireless terminal 26 may make the request depicted by arrow 38-1. A 2TYPSIB request handler 72 of the second access node 22-36-2 may handle the request and subsequently supply the second type system information in accordance with any of the aforementioned example embodiments and modes.

As mentioned above, the broadcast message BM may include content of the first type system information; an identification of the second type system information available from the first access node; the value tag; and the geographical area identifier. The manner of inclusion of the geographical area identifier may be in any of several ways. As a first example, FIG. 39A shows an example format of a broadcast message BM-39A in which the geographical area identifier (shown in FIG. 39A as "areaId") is included in and obtained from a portion of the broadcast message BM-39A which pertains to the first type system information, e.g., an essentialSystemInformation information element of the broadcast message BM-39A.

As a second example, FIG. 39B shows an example format of a broadcast message BM-39B in which the geographical area identifier(s) (also shown in FIG. 39B as "areaId") is/are included in and obtained from a portion of the broadcast message BM-39B which pertains to the identification of the second type system information, e.g., an nonessentialSIB-Infor information element of the broadcast message BM-39B. FIG. 39B particularly shows that the geographical area identifier is included in and obtained individually for at least one second type system information. Plural System Information Blocks may have geographical area identifiers individually associated therewith. On the other hand, FIG. 39C shows that for broadcast message BM-39C the geographical area identifier may be included in and obtained in association with a group of plural second type system information. For example, a first geographical area identifier (first areaId) shown in FIG. 39C may pertain to a first group (groupidx=1) comprising the first three system information blocks (sibids) shown in FIG. 39C, and the second geographical area identifier (second areaId) shown in FIG. 39C may pertain to a second group (groupidx=2) comprising the second three system information blocks (sibids) shown in FIG. 39C. Each group may comprise any number of second type system information blocks, and the number of second type system information blocks in the groups may vary from group to group.

The broadcast message 39-D of FIG. 39D shows a further possible manner of including and obtaining the geographical area identifier(s). The broadcast message BM 39-D of FIG.

Figure 39E:
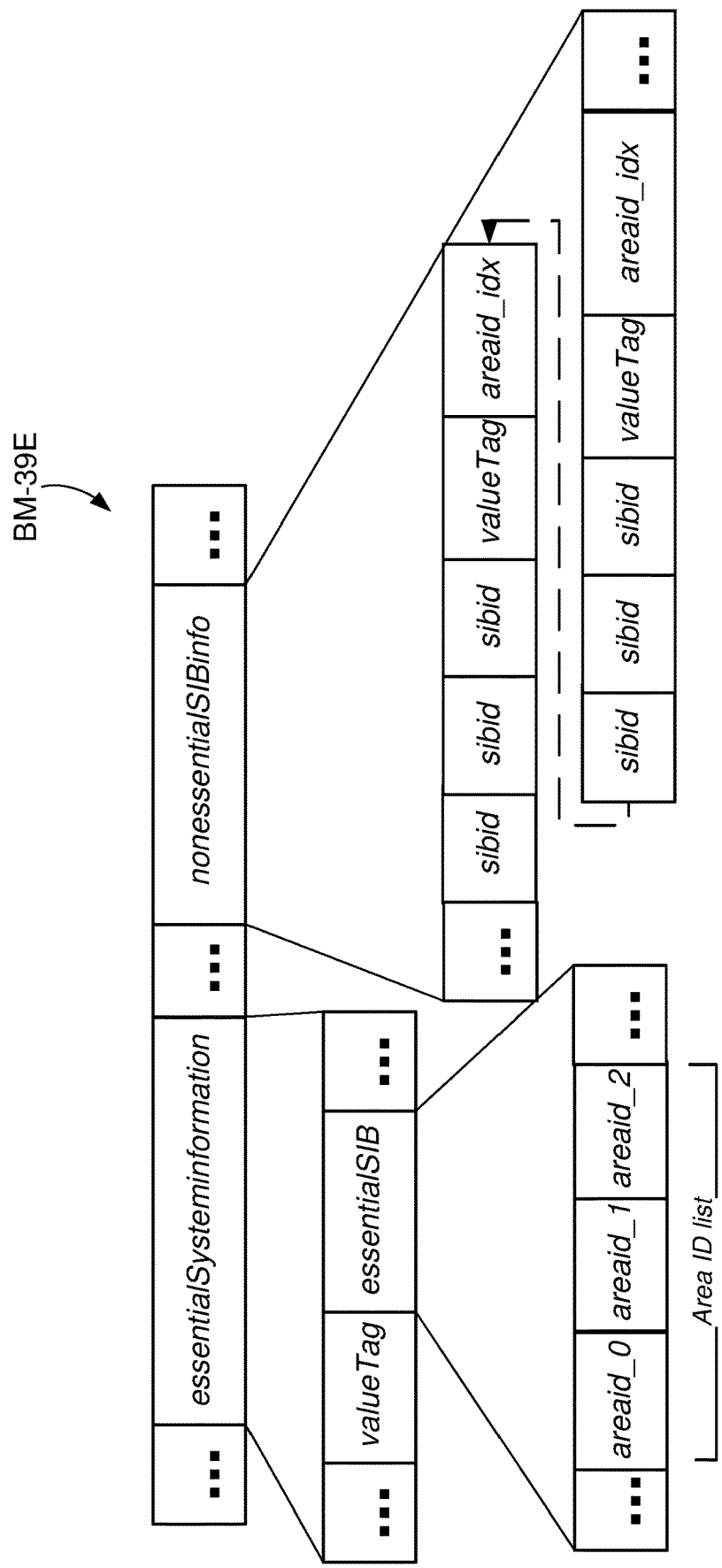

39 is formatted so that a list of geographical area identifiers is included in or obtained from a first portion of the broadcast message. In the example of FIG. 39D the first portion of the broadcast message happens to pertain to the first type system information, e.g., in the essentialSystemInformation information element of the broadcast message BM-39D. FIG. 39D shows the list (Area ID list) as comprising list members areaId_0, areaId_1, areaId_2, and so forth. In preparing the broadcast message BM-39D, the node processor 30 includes, in a second portion of the broadcast message BM-39D, a reference (e.g., areaId_idx) to a member of the list which is associated with at least one second type system information. In the example of FIG. 39D the second portion of the broadcast message BM-39D pertains to the identification of the second type system information. It should also be understood that, as a modification of FIG. 39D shown in FIG. 39E, the reference to the member of the list may be associated with a group of second type system information.

Recapping a portion of the foregoing, the FIG. 36 shows an example embodiment and mode of how the validity of the value tag may be determined. In FIG. 36, each access node (e.g., eNB) broadcasts a geographical area identifier (Area ID), e.g., an identification of the geographical area for non-essential SIB validity. The wireless terminal 26 considers that a non-essential SIB previously received is valid when it was received from an access node with the same geographical area as that for the current camped access node. In one configuration shown in FIG. 39A, the geographical area identifier (Area ID) may be an independent parameter included in the Essential System Information message. In another configuration, the geographical area identifier may be a subset or a combination of other broadcasted identities, such as Public Land Mobile Network (PLMN) Identity and Tracking Area Identity (TAI).

The example embodiment and mode of the broadcast message BM-39A of FIG. 39A assumes that all the non-essential SIBs in a given access node are associated with a single validity area with a common areaId. In order to enable flexible configurations, the example embodiments and modes of FIG. 39B-FIG. 39E show that an individual non-essential SIB, or a group of non-essential SIBs, may have its own areaId. FIG. 39B illustrates one exemplary implementation of the Essential System Information message, where each presence of sibId/valueTag pair is followed by the associated areaId. FIG. 39C illustrates one exemplary implementation wherein the groupIdx is used. In FIG. 39D and FIG. 39E, the essential SIB now contains a list of areaId's and each sibId/valueTag pair has an index (areaId_idx) that refers to one element of said areaId list. For example, areaId_idx=0 refers to the areaId_0 element in the list.

Some of the above embodiments and modes assume that the area ID and the value tag uniquely specify the version of content(s) of the corresponding SIB/SIB group. However, this may not be the case, depending on network configurations and the available value ranges of areaId and/or valueTag. For example, a set of access nodes in a geographical area may re-use the same areaId that is used by another set of access nodes in a different geographical area. As a result, there is a chance that areaId and valueTag of a certain SIB/SIB group for one of those areas accidentally become the same as those of the same SIB/SIB group for the other area, even though the content is different. If such areas are not sufficiently apart in distance, the wireless terminal that received and saved non-essential SIBs in one of those areas may consider the SIBs still valid in the other area. To avoid this kind of collision, further example embodiments and modes described below provide a content validation mechanism, wherein the wireless terminal and the currently camped-on access nodes communicate to check if the SIB/SIB group content(s) that the wireless terminal previously received is still valid.

Figure 40:
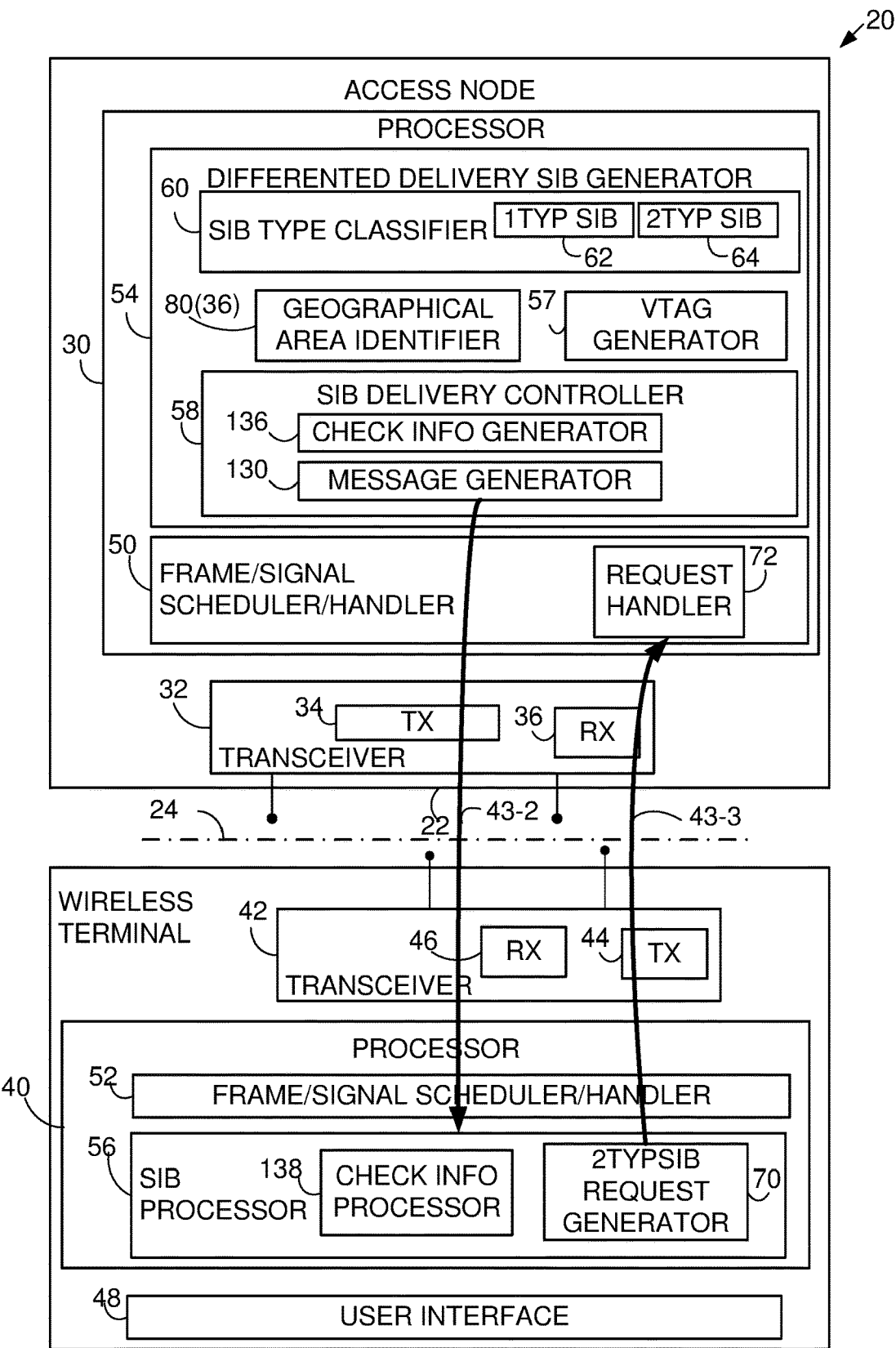
FIG. 40 is a schematic view showing an example communications system comprising a radio access node and a wireless terminal, and wherein the radio access node provides check information based on content of system information available at the access node.

FIG. 40 shows an example embodiment and mode of an example communications system wherein the radio access node generates check information based on content of system information available at the access node, and transmits the check information over a radio interface. In this regard, FIG. 40 shows access node 22, and node processor 30 in particular, as comprising check information generator 136. FIG. 40 further shows wireless terminal 26 as comprising check information processor 138.

Figure 41:
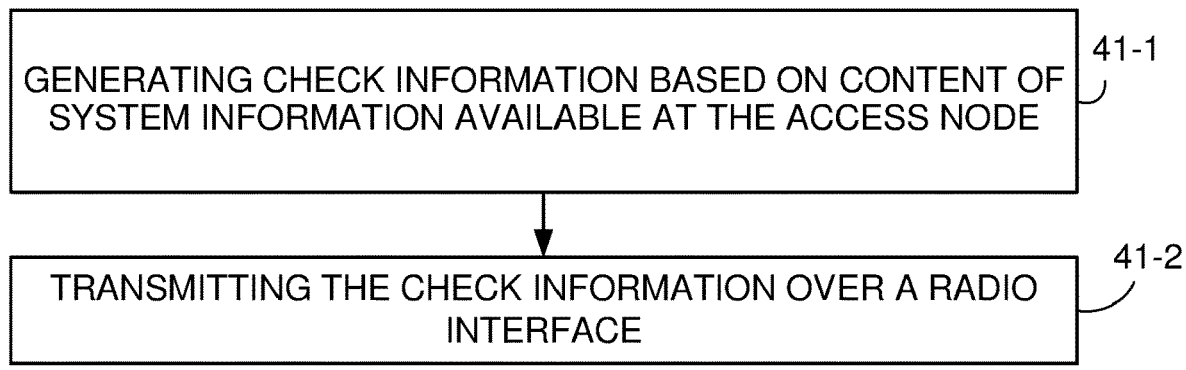
FIG. 41 is a flowchart showing example, representative, basic acts or steps performed by the access node of FIG. 40.

In different example embodiments and modes the check information, which is based on content of system information available at the access node, may be obtained from the access node in different ways. For example, in some example embodiments and modes the check information which is based on content of system information available at the access node may be transmitted in a unicast message to a particular wireless terminal. In other example embodiments and modes the check information which is based on content of system information available at the access node may be included in a broadcast message from the access node. In this former example, the check information may be based on content of second type system information available from the access node, and the broadcast message may include first type system information, an identification of the second type system information available from the access node, and the check information which is based on content of second type system information system information available from the access node FIG. 41 shows example acts or steps executed by the access node 22 of FIG. 40 in conjunction with check information performed over system information technology. Act 41-1 comprises access node 22 generating check information based on content of system information available at the access node. The check information generated as act 41-1 may be, for example, a checksum, cyclical redundancy check, or other check quantity computed or determined over all of the second type system information blocks available at the access node 22. Act 41-2 comprises access node 22 transmitting the check information over a radio interface, as depicted by arrow 140 in FIG. 40.

Figure 42:
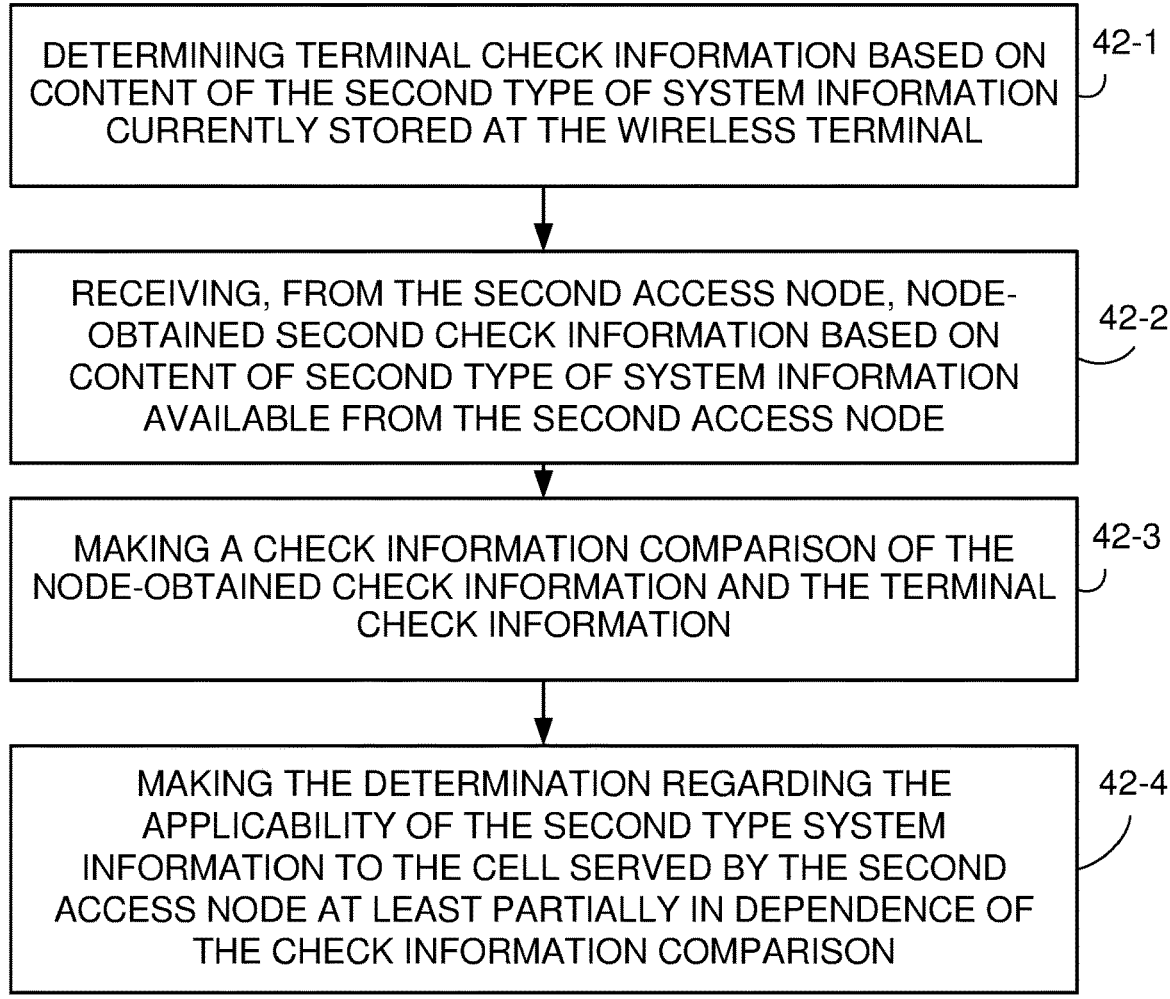
FIG. 42 is a flowchart showing example, representative, basic acts or steps performed by the wireless terminal of FIG. 40.
Figure 43:
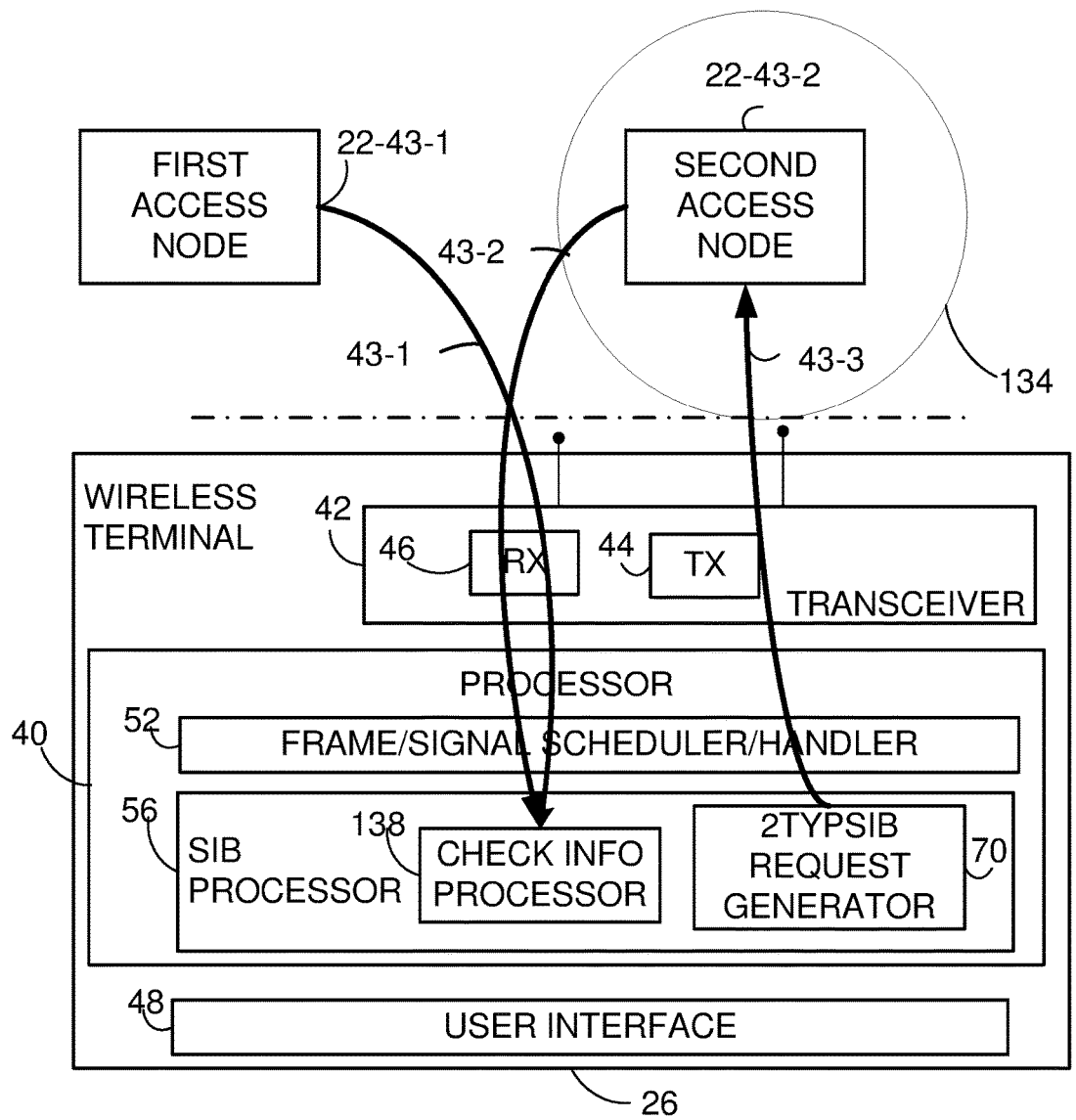
FIG. 43 is a diagrammatic view showing a context of a radio access network (RAN) in which the access node of FIG. 40 perform the acts of FIG. 41 and the wireless terminal of FIG. 40 performs the acts of FIG. 42.

FIG. 42 shows example acts or steps executed by wireless terminal 26 of FIG. 40 in conjunction receipt of check information performed over system information technology. The acts of FIG. 42 may be performed in the context of the radio access network (RAN) of FIG. 43, which shows first access node 22-43-1 and second access node 22-43-2. Act 42-1 comprises determining terminal check information based on content of the second type of system information currently stored at the wireless terminal. Such second type of system information may have been previously obtained, for example, from the first access node 22-43-1, as indicated by arrow 43-1 in FIG. 43. The terminal check information determined as act 42-1 may be, for example, a checksum, cyclical redundancy check, or other check quantity computed or determined over all of the second type system information blocks stored by wireless terminal 26. Of course, the way in which the check information is generated or determined (e.g., whether checksum, CRC, etc.) is coordinated between the access node 22 and wireless terminal 26. Act 42-2 comprises receiving, from the second access node, node-obtained second check information based on content of second type of system information available from the second access node 22-43-2, as indicated by arrow 43-2 in FIG. 40 and FIG. 43. Act 42-3 comprises the check information processor 138 making a check information comparison of the node-obtained check information and the terminal check information. Act 42-4 comprises making the determination regarding the applicability of the second type system information to the cell served by the second access node (e.g., the determination of act 41-2) at least partially in dependence of the check information comparison, at least partially in dependence on the outcome of act 42-3.

The determination of act 42-4 may be that the node check information and the terminal check information favorably compare (e.g., are the same), in which case the wireless terminal 26 may use the terminal-stored second type system information in the cell served by the access node 22 and need not request the second type system information from the access node 22. But if the determination of act 42-4 is not favorable, the wireless terminal 26 will need to send a request message to the access node 22, as indicated by arrow 43-3 in FIG. 40 and FIG. 43.

In the foregoing the receiver 46 of wireless terminal 26 of FIG. 40 may receive the node-obtained second check information from a broadcast message. In such case the broadcast message may comprising the first type system information and an identification of second type system information available at the second access node.

Figure 44:
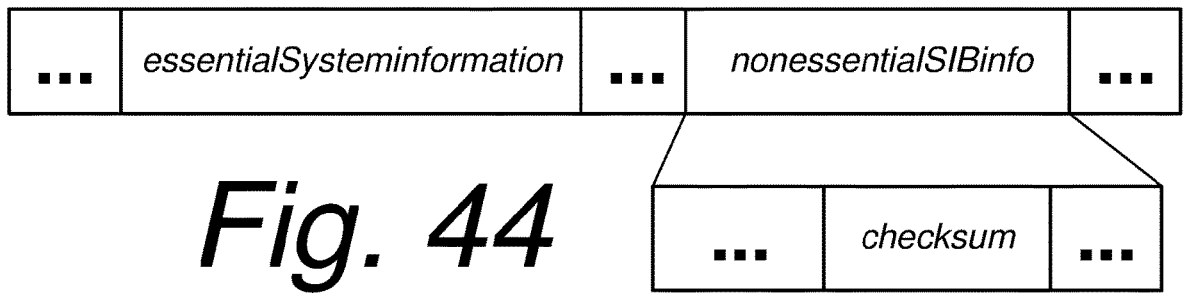
FIG. 44 is a diagrammatic views showing example format of inclusion of system information check information in a message transmitted by the access node of FIG. 40.

Thus as further illustrated in FIG. 44, in one configuration, the nonEssentialSIBInfo information element in the Essential System Information message may contain a field checksum. The checksum value is derived from the contents of all the non-essential SIBs available by the access node that broadcasts the message. Upon receipt of this message the wireless terminal may first check the validity of saved non-essential SIB contents (if any) using the area IDs and the value tags. If some of the area IDs or value tags do not match, the UE may request on-demand delivery of corresponding SIBs/SIB groups. If all match, the wireless terminal may then calculate the checksum of the saved contents (in the manner depicted by act 42-1), obtain a checksum (e.g., check information) from the access node (in the manner depicted by act 42-2), and then compare (as depicted by act 42-3) the checksum calculated for the saved contents (calculated at act 42-1) with the checksum broadcasted in the message. If the checksum matches, the UE may consider that all the saved non-essential SIBs are valid. Otherwise, the wireless terminal may initiate requesting on-demand delivery of some or all of the non-essential SIBs.

Figure 45:
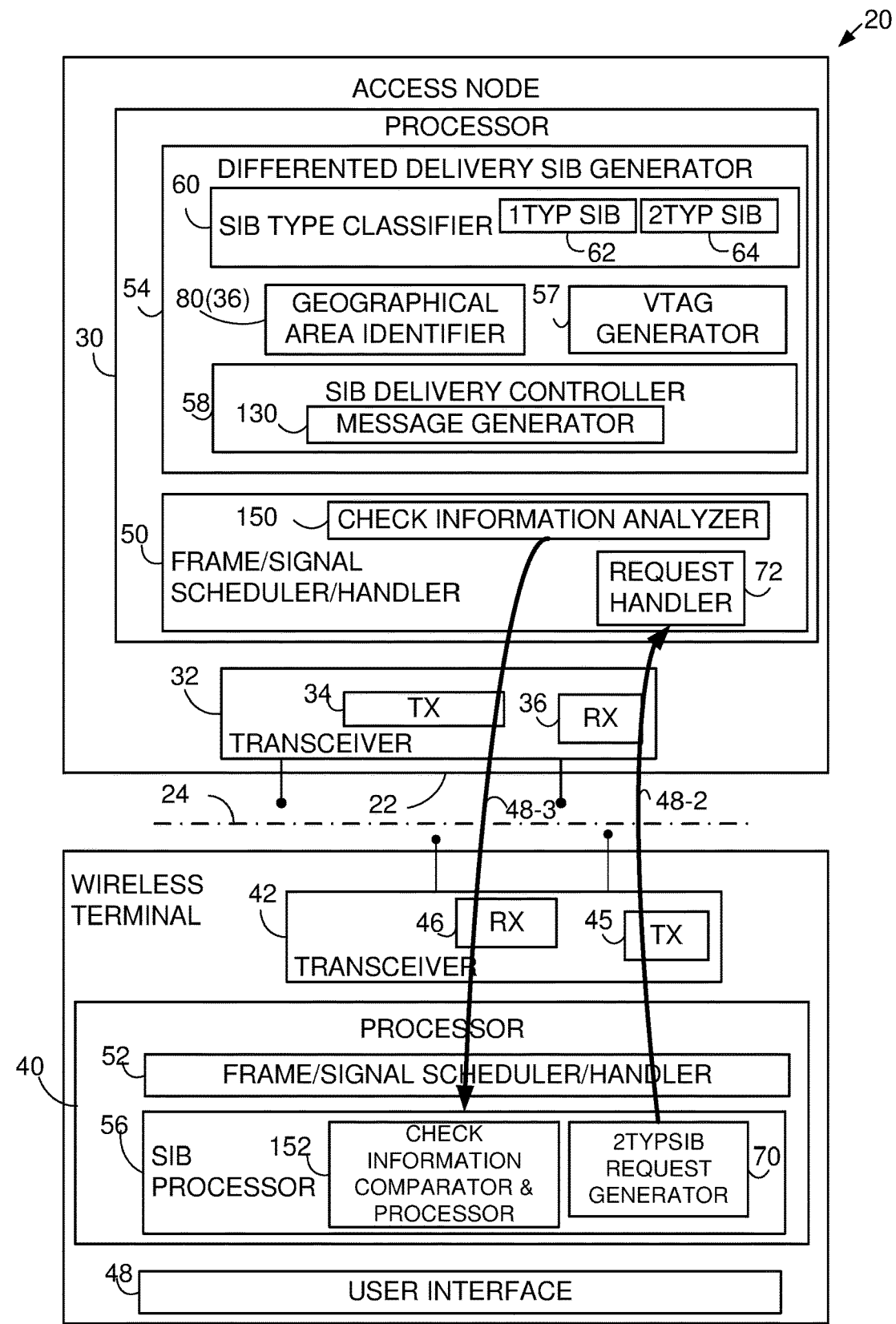
FIG. 45 is a schematic view showing an example communications system comprising a radio access node and a wireless terminal, and wherein the wireless terminal uses check information to confirm updated system information received from the access node.

FIG. 45 shows an example embodiment and mode of an example communications system wherein a wireless terminal obtains updated system information from an access node and performs check information comparison of node-obtained check information and updated terminal check information. In this regard, FIG. 45 shows access node 22, and node processor 30 in particular, as comprising check information analyzer 150. FIG. 45 further shows wireless terminal 26 as comprising check information comparator and processor 152.

Figure 46:
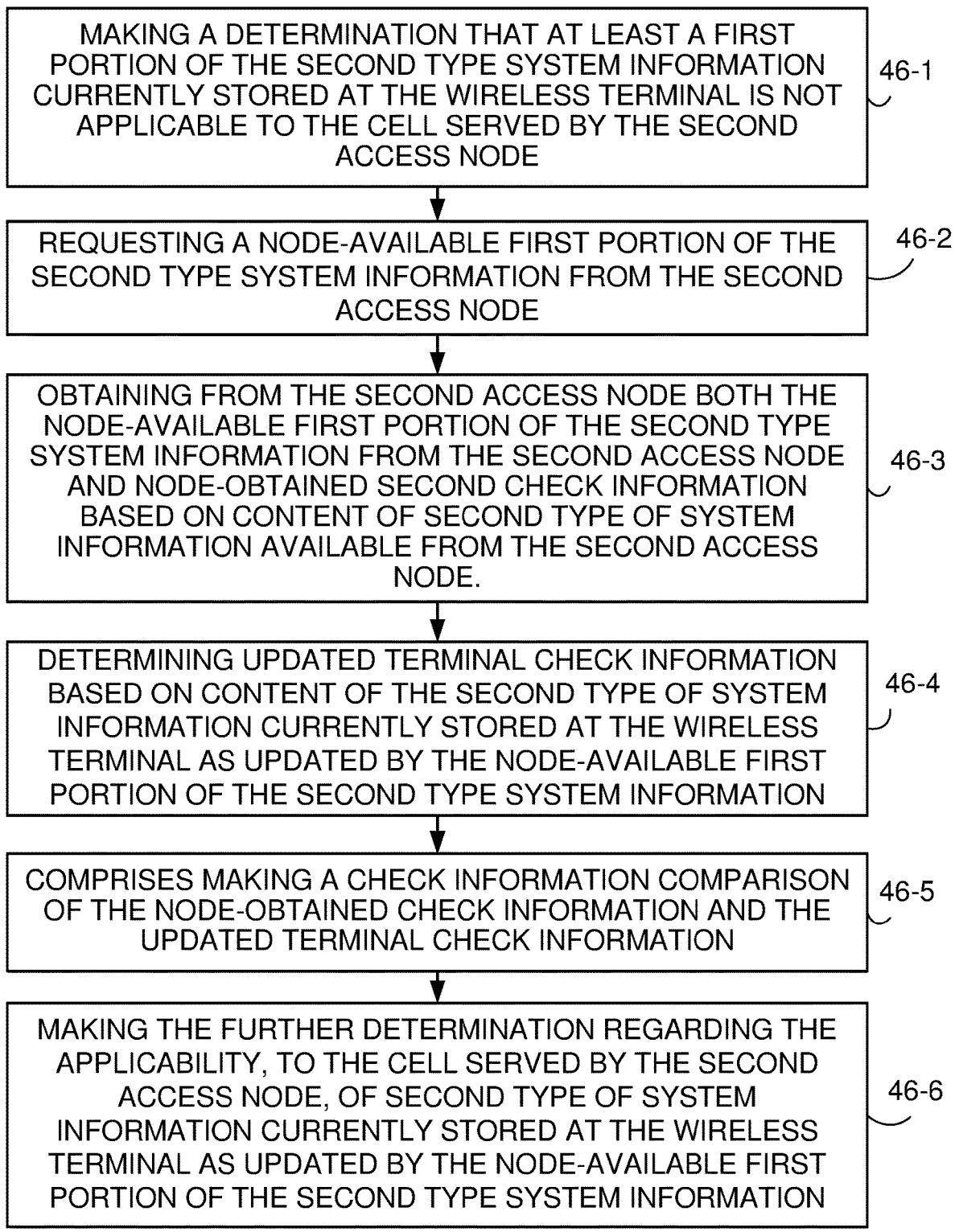
FIG. 46 is a flowchart showing example, representative, basic acts or steps performed by the wireless terminal of FIG. 45.
Figure 48:
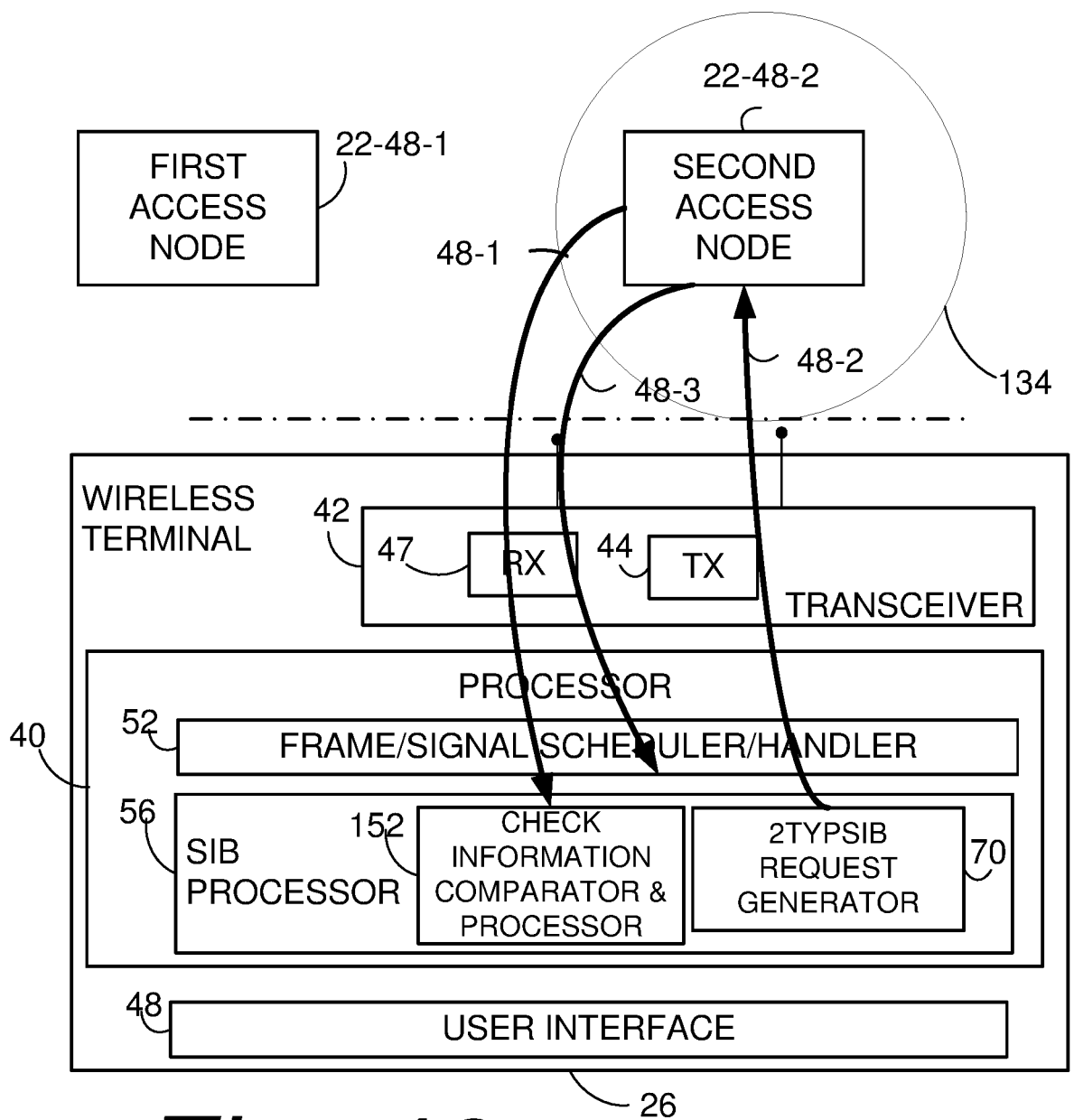
FIG. 48 is a diagrammatic view showing a context of a radio access network (RAN) in which the access node of FIG. 45 perform the acts of FIG. 46 and the wireless terminal of FIG. 45 performs the acts of FIG. 46.

FIG. 46 shows example, representative, basic acts or steps performed by the wireless terminal 26 of FIG. 45. The acts of FIG. 46 may be understood in the context of the radio access network (RAN) shown in FIG. 48, which shows first access node 22-48-1 and second access node 22-48-2. Act 46-1 comprises wireless terminal 26 making a determination that at least a first portion of the second type system information currently stored at the wireless terminal is not applicable to the cell served by the second access node. The determination of act 46-1 may result, for example, by the terminal-stored value tag or terminal-stored geographical area identifier associated with a certain second type system information block not matching the value tag or the geographical area identifier obtained from the second access node and associated with that certain second type system information block. Arrow 48-1 shows the wireless terminal 26 obtaining the value tag or the geographical area identifier from the second access node. Act 46-2 comprises the wireless terminal requesting, from the second access node 22-48-2, a node-available first portion of the second type system information available from the second access node, as depicted by arrow 48-2 in FIG. 48. Act 46-3 comprises obtaining, from the second access node, both the node-available first portion of the second type system information available from the second access node and node-obtained second check information based on content of the second type of system information available from the second access node, as depicted by arrow 48-3 in FIG. 45 and FIG. 48. Obtaining the node-available first portion of the second type system information from the second access node may be accomplished through various types of request messages as previously described in conjunction with other example embodiments and modes. Act 46-4 comprises wireless terminal 26 determining updated terminal check information based on content of the second type of system information currently stored at the wireless terminal as updated by the node-available first portion of the second type system information. In other words, as act 46-4 the updated terminal check information is computed over the second type system information blocks that were believed by the terminal to be current and a second type system information block that was obtained from the node in act 46-3. Act 46-5 comprises wireless terminal 26 making a check information comparison of the node-obtained check information (obtained at act 46-3) and the updated terminal check information (determined at act 46-5). Act 46-6 comprises making the further determination regarding the applicability, to the cell served by the second access node, of second type of system information currently stored at the wireless terminal as updated by the node-available first portion of the second type system information. In essence, if the comparison of act 46-5 is favorable, as act 46-6 the wireless terminal 26 uses the second type system information as updated in the cell served by the second access node 22.

Figure 47:
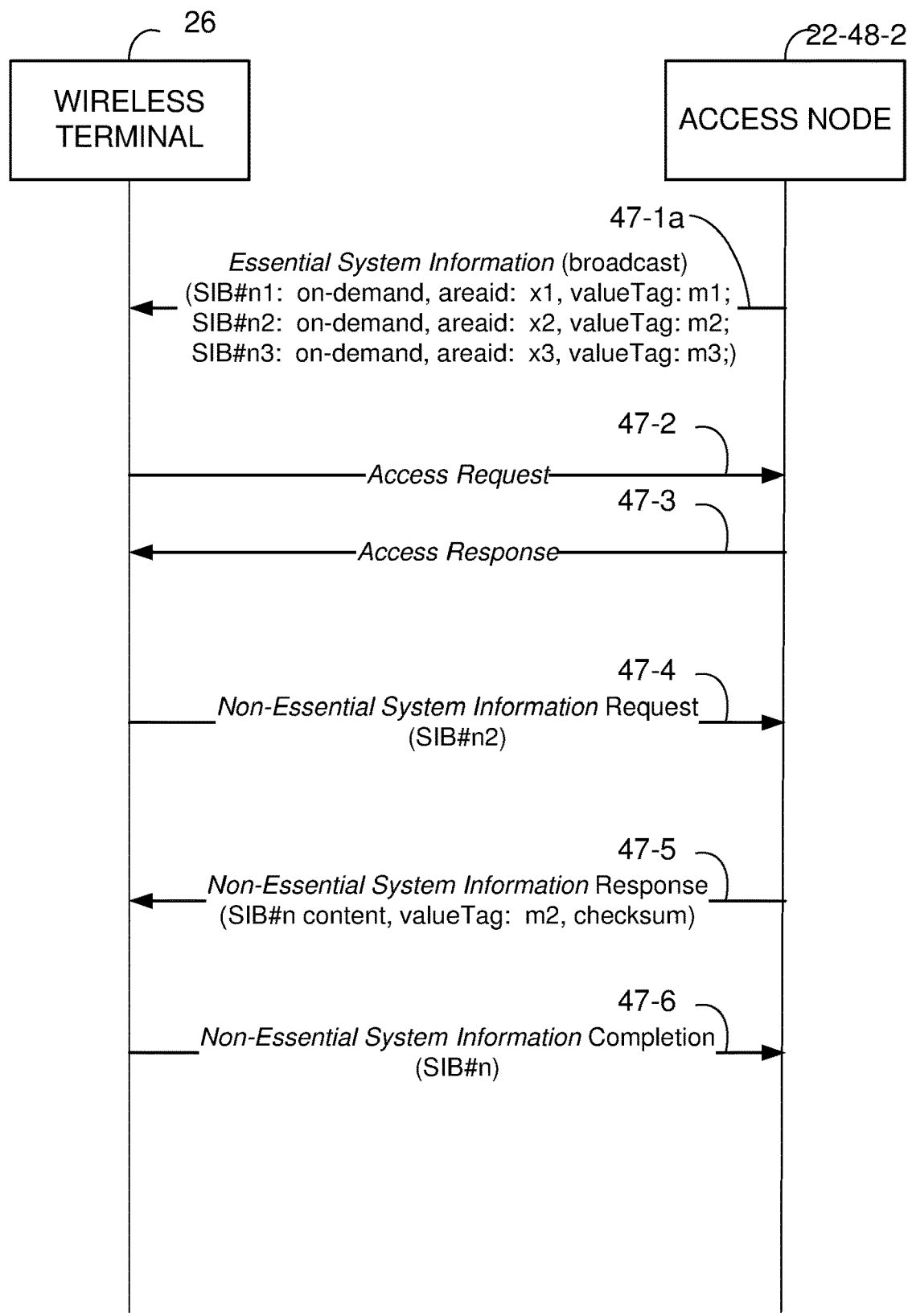
FIG. 47 is a flowchart showing example, representative, basic acts or steps performed by the access node of FIG. 45.

FIG. 47 shows overall example, representative, basic acts or steps performed by access node 22 and wireless terminal 26 of FIG. 45 in a specific scenario. The acts of FIG. 47 may also be understood in the context of the radio access network (RAN) shown in FIG. 48, which shows first access node 22-48-1 and second access node 22-48-2.

Act 47-1 comprises the access node sending a Essential System Information message that includes, for each of three second type system information blocks, respective geographical area identifiers x1, x2, and x3 and respective valueTags m1, m2, and m3. Act 47-2 comprises the wireless terminal making an access request. Act 47-3 comprises the access node sending an access response message to the wireless terminal. Act 47-4 comprise the wireless terminal sending a Non-Essential System Information Request message to the access node (as depicted by arrow 48-2). Act 47-4 may occur as a result of the wireless terminal having determined (as act 46-1) that a portion of the second type system information currently stored at the wireless terminal is not applicable to the cell served by the second access node. In the example shown in FIG. 47, the wireless terminal has determined that the second type system information block SIB #n2 is not applicable. Act 47-5 comprises the access node sending a Non-Essential System Information Response message to the access node, as also depicted by arrow 48-3. The Non-Essential System Information Response message includes the content of the sought second type system information block SIB #n2, the valueTag for the sought block SIB #n2, and a checksum computed over all the second type system information available at the second access node. Upon receipt of the Non-Essential System Information Response message of act 47-5, the wireless terminal returns a Non-Essential System Information Completion message.

Thus FIG. 47 shows that (as act 47-5) the access node includes the checksum value for all the contents of the available non-essential SIBs in a downlink unicast message. In the example of FIG. 47, SIB #n1, SIB #n2 and SIB #n3 are the non-essential SIBs which are available by request. The wireless terminal 26 detects that the saved SIB #n2 is not current (areaId or valueTag mismatch). The wireless terminal then follows procedures such as those disclosed above to request the on-demand delivery of SIB #n2 (as shown by act 47-4). The Non-essential System Information Response message of act 47-5 may include the checksum value calculated for the contents of SIB #n1, SIB #n2 and SIB #n3, along with the content of the requested SIB #n2. After receiving the Non-essential System Information Response message, the wireless terminal may calculate the checksum using the saved SIB #n1 and SIB #n3 and the received SIB #n2, and then compare with the received checksum. If it does not match, the UE may additionally request SIB #n1 and SIB #n3

Figure 49:
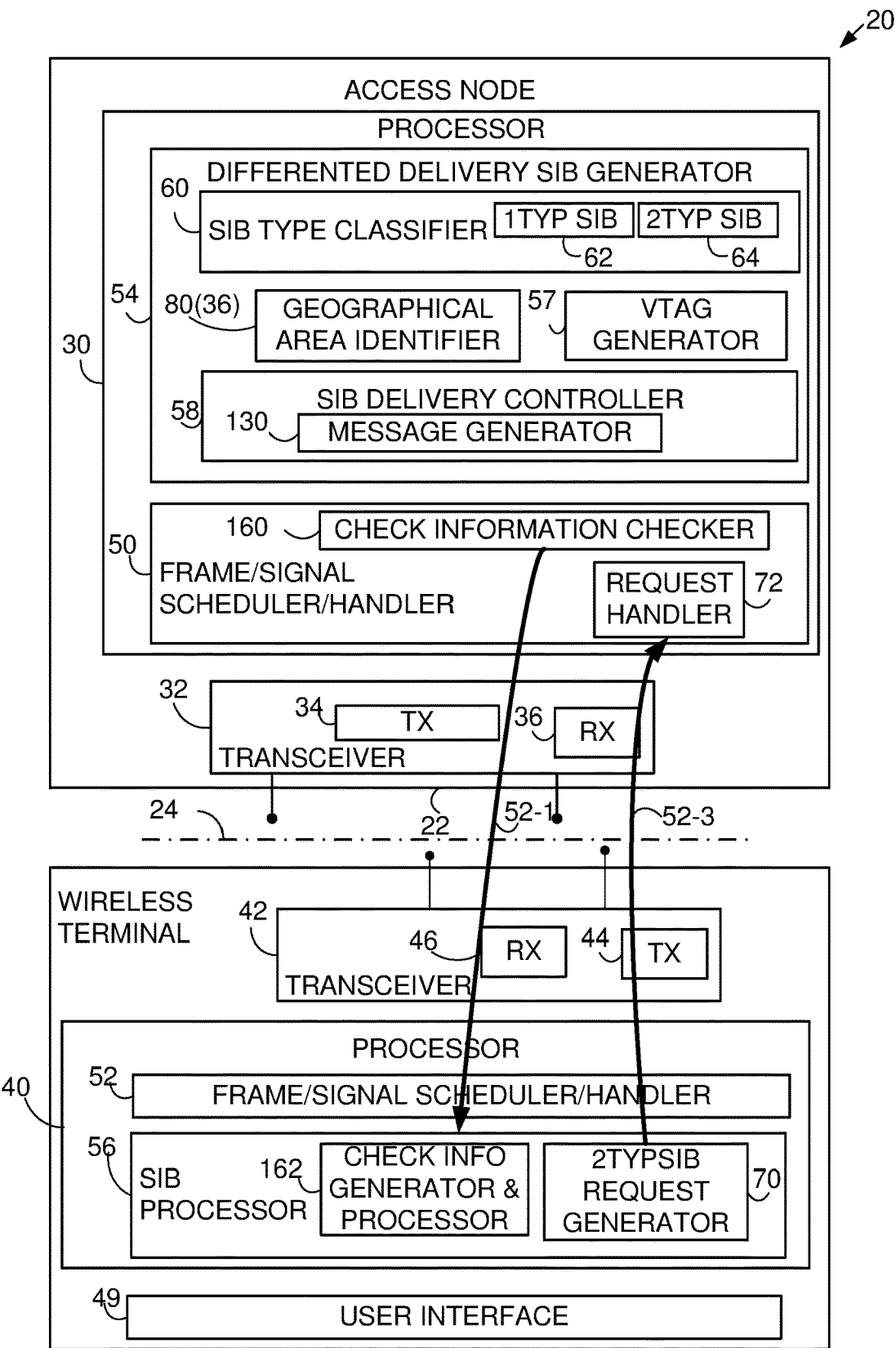
FIG. 49 is a schematic view showing an example communications system comprising a radio access node and a wireless terminal, and wherein the radio access node receives check information based on content of system information stored at the wireless terminal.

FIG. 49 shows an example embodiment and mode of an example communications system wherein the radio access node receives check information based on content of system information stored at the wireless terminal, and either rejects or accepts a connection request in accordance with the received check information. In this regard, FIG. 49 shows access node 22, and node processor 30 in particular, as comprising check information checker 160. FIG. 49 further shows wireless terminal 26 as comprising terminal check information generator and processor 162.

Figure 50:
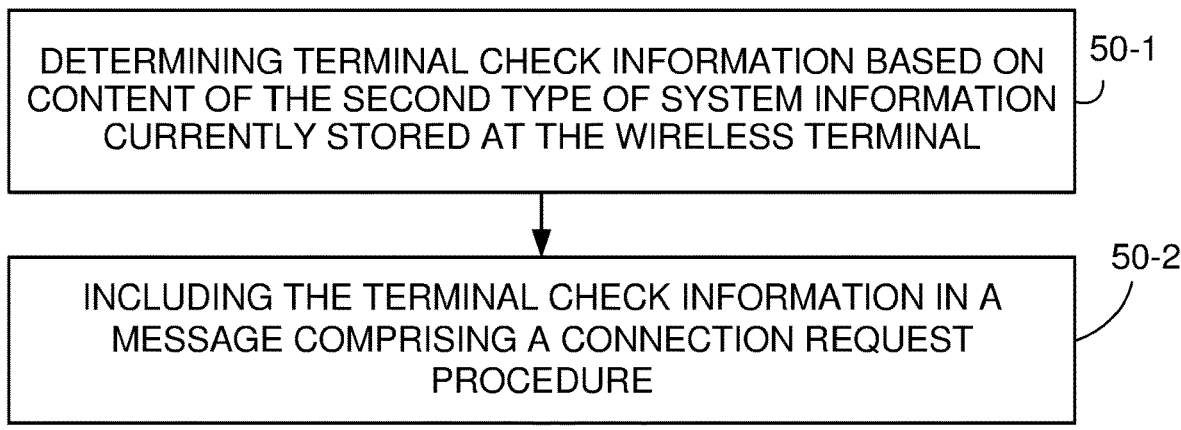
FIG. 50 is a flowchart showing example, representative, basic acts or steps performed by the wireless terminal of FIG. 49.
Figure 52:
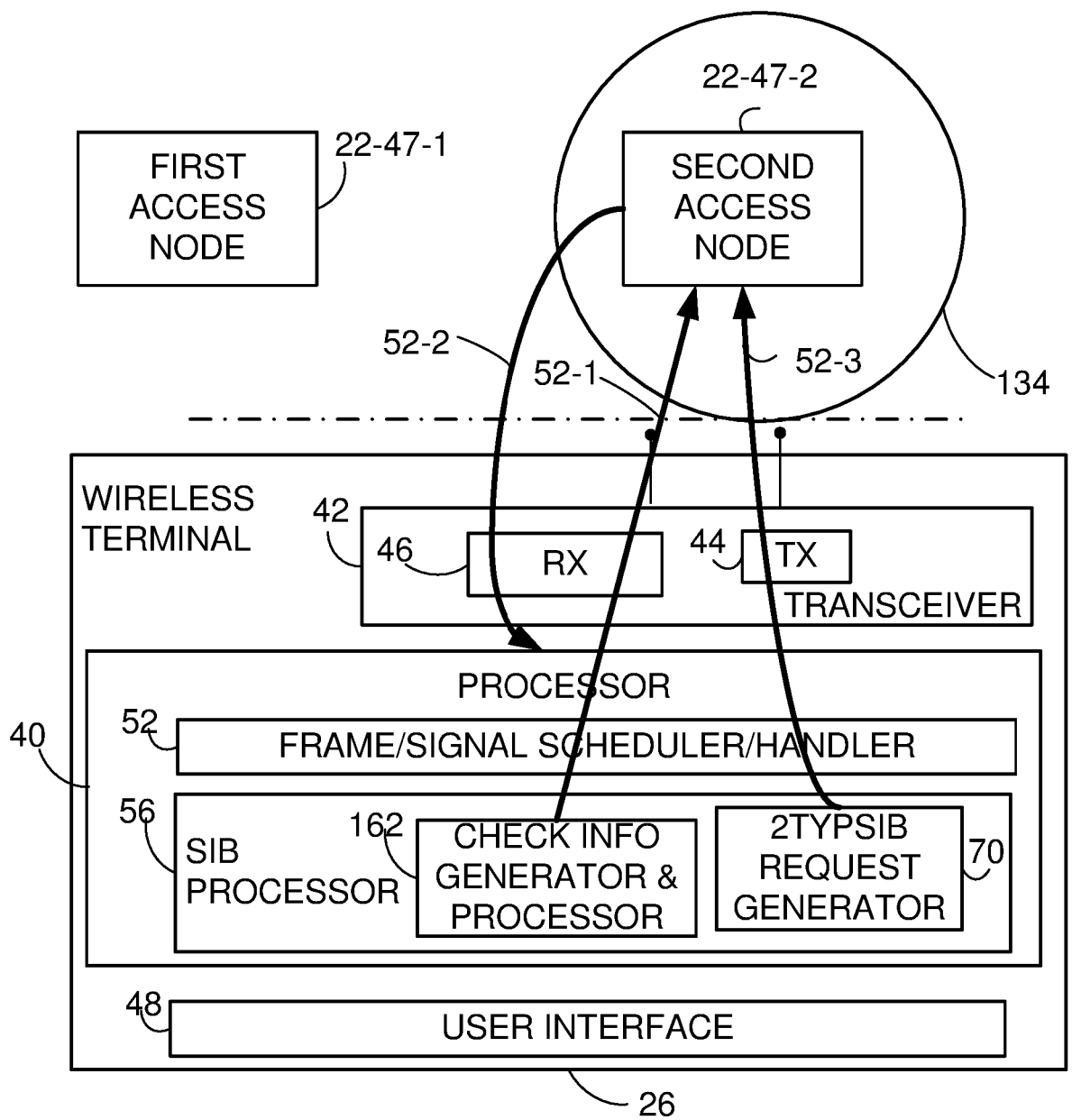
FIG. 52 is a diagrammatic view showing a context of a radio access network (RAN) in which the access node of FIG. 49 perform the acts of FIG. 51 and the wireless terminal of FIG. 49 performs the acts of FIG. 50.

FIG. 50 shows example, representative, basic acts or steps performed by the wireless terminal 26 of FIG. 49. The acts of FIG. 50 are performed upon wireless terminal 26 making a determination that (the wireless terminal 26 believes that) the second type system information is applicable to the cell served by the second access node. Act 50-1 comprises the wireless terminal 26 determining terminal check information based on content of the second type of system information currently stored at the wireless terminal. Act 50-2 comprises the wireless terminal 26 including the terminal check information in a message comprising a connection request procedure. Such message of the connection request procedure is depicted by arrow 52-1 in FIG. 49 and FIG. 52. The access node 22, and check information checker 160 in particular, determines whether the access node 22 agrees that the check information received from the terminal is accurate for the second type system information available from the second access node 22. If the access node 22 is in agreement, the access node 22 accepts the connection request. But if the access node 22 in not in agreement, the connection request is rejected. Upon receiving a rejection in the connection request procedure, the wireless terminal may request the second type system information from the second access node, as depicted by arrow 52-3 in FIG. 49 and FIG. 52.

Figure 51:
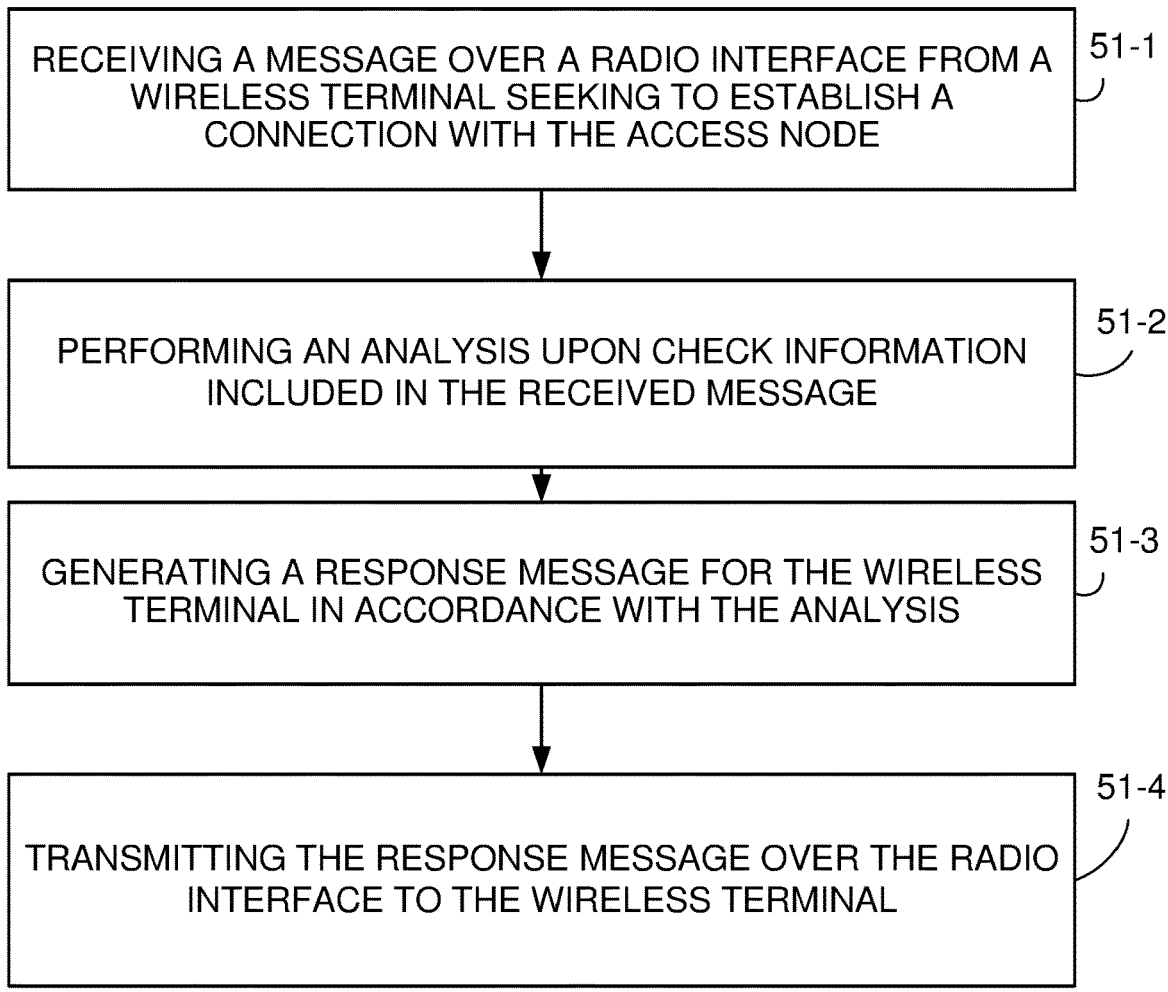
FIG. 51 is a flowchart showing example, representative, basic acts or steps performed by the access node of FIG. 49.

FIG. 51 is a flowchart showing example, representative, basic acts or steps performed by the access node of FIG. 49. Act 51-1 comprises receiving a message over a radio interface from a wireless terminal seeking to establish a connection with the access node. Such message may be depicted by arrow 52-1 of FIG. 49 and FIG. 52. Act 51-2 comprises performing an analysis upon check information included in the received message. The check information is based on content of system information believed current by the wireless terminal, and the analysis comprises a comparison of the check information included in the received message with check information derived by the access node with respect to content of the system information deemed current by the access node. Act 51-3 comprises generating a response message for the wireless terminal in accordance with the analysis. Act 51-4 comprises transmitting the response message over the radio interface to the wireless terminal. The response message is depicted by arrow 52-2 of FIG. 52.

It should be appreciated that while the check information of the example embodiments and modes of FIG. 40-FIG. 44, FIG. 45-FIG. 48, and FIG. 49-FIG. 52 have been illustrated as being utilized in conjunction reference to or based on other parameters such as geographical area identifier and value tag, the check information which is based on content of system information available at the access node may also be utilized without reference to such parameters and/or may be based on other quantities or parameters that pertain to system information. Moreover, while illustrated herein at least in some example implementations as being based on content of second type system information, the check information may not be limited to second type system information but may apply to other types of system information as well. Yet further, the example embodiments and modes of FIG. 40-FIG. 44, FIG. 45-FIG. 48, and FIG. 49-FIG. 52, and other example embodiments and modes described herein, may be utilized individually or in conjunction with one another, e.g., one or more features of one or more embodiments and modes may be combined. That is, the access node 22 or the wireless terminal 26 may be configured to operate in accordance with more than one such example embodiment and mode.

Figure 53:
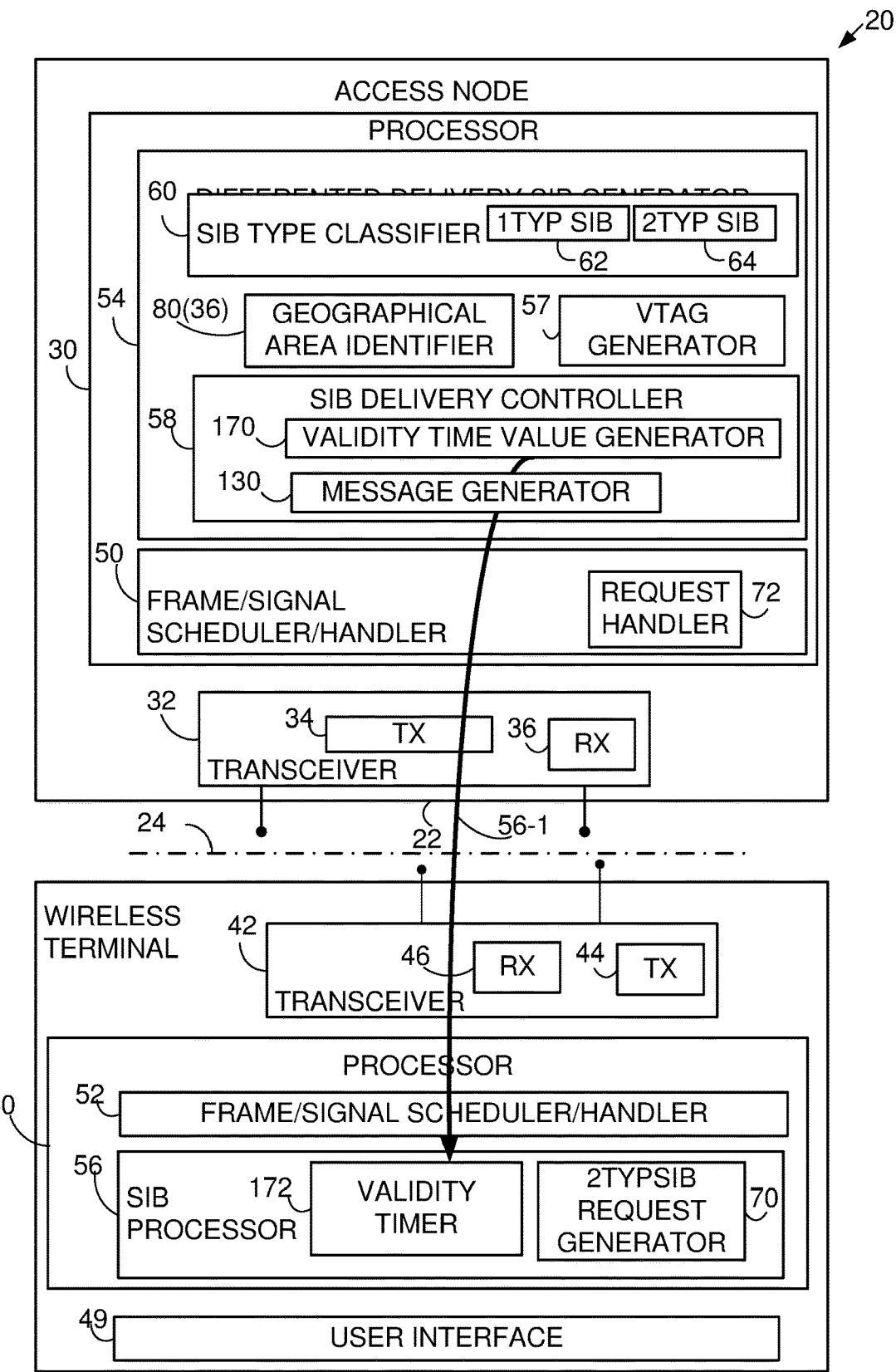
Figure 56:
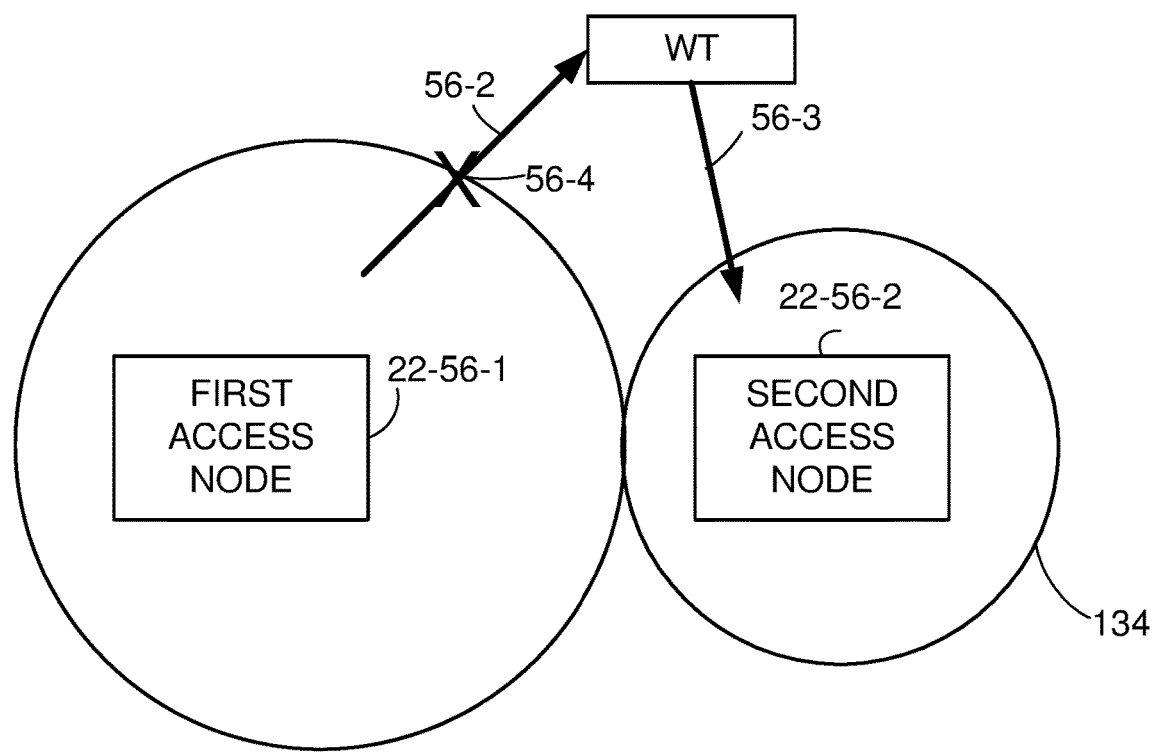
FIG. 56 is a diagrammatic view showing a context of a radio access network (RAN) in which the access node of FIG. 53 perform the acts of FIG. 55 and the wireless terminal of FIG. 53 performs the acts of FIG. 54.

FIG. 53 shows an example embodiment and mode of an example communications system wherein the radio access node 22 sends a validity time value which specifies a time period during which the second type system information system information obtained from the first access node 22 remains valid in the geographical area served by the access node 22. FIG. 53 shows access node 22, and system information (SI) generator 54 in particular, as comprising validity time value generator 170. The node processor 30 of access node 22 thus include system information in a message for transmission over a radio interface to a wireless terminal and the validity timer value. FIG. 53 also shows wireless terminal 26 as comprising validity timer 172, which enables SIB processor 56 of wireless terminal 26 to make the determination regarding applicability of the second type system information to the cell served by the access node 22 at least partially in dependence on the geographical area identifier and the validity timer value. The use of the validity timer value is particularly beneficial in a scenario, such as that shown in FIG. 56, in which the wireless terminal 26 exits the cell served by a first access node and then re-enter the geographical area (e.g., the cell served by the first access node or another access node in the same geographical area) before the validity timer expires. In FIG. 56, arrow 56-2 shows the wireless terminal 26 leaving or existing the cell served by the first access node 22-56-1, and arrow 56-3 shows the wireless terminal 26 subsequently re-entering the geographical area (e.g., entering a cell served by access node 22-56-2, which happens to be a member of the same geographical area. The wireless terminal 26 could also re-enter the geographical area by entering the cell served by the first access node 22-56-1).

Figure 54:
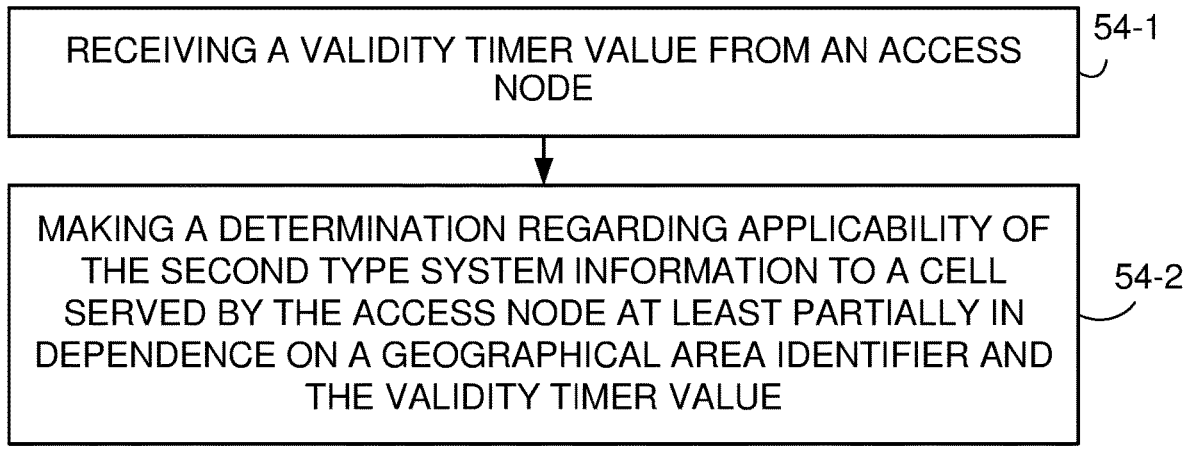
FIG. 54 is a flowchart showing example, representative, basic acts or steps performed by the wireless terminal of FIG. 53.

FIG. 54 shows example, representative, basic acts or steps performed by the wireless terminal 26 of FIG. 53. The acts of FIG. 54 are illustrated in an example scenario of a simplified context of a radio access network (RAN) as shown in FIG. 56, which illustrates a first access node 22-56-1 and a second access node 22-56-2. Act 54-1 comprises the wireless terminal 26 receiving a validity timer value from an access node. In the example scenario shown in FIG. 56, the validity timer is received from access node 22-56-1. As understood from other example embodiments and modes, the wireless terminal 26 also receives from the access node 22-56-1 other information including: first type system information; second type system information; a value tag associated with the second type system information; a geographical area identifier which specifies a geographical area for which the value tag is valid. The geographical area is an area served by the access node and a group comprising at least one other access node. The validity timer value specifies a time period during which the second type system information system information obtained from the first access node remains valid in the geographical area. The validity timer value is stored in validity timer 172 of SIB processor 56. Act 54-2 comprises wireless terminal 26 (e.g., terminal processor 40) making a determination regarding applicability of the second type system information to a cell served by the access node. The determination is made at least partially in dependence on the geographical area identifier and the validity timer value.

Figure 55:
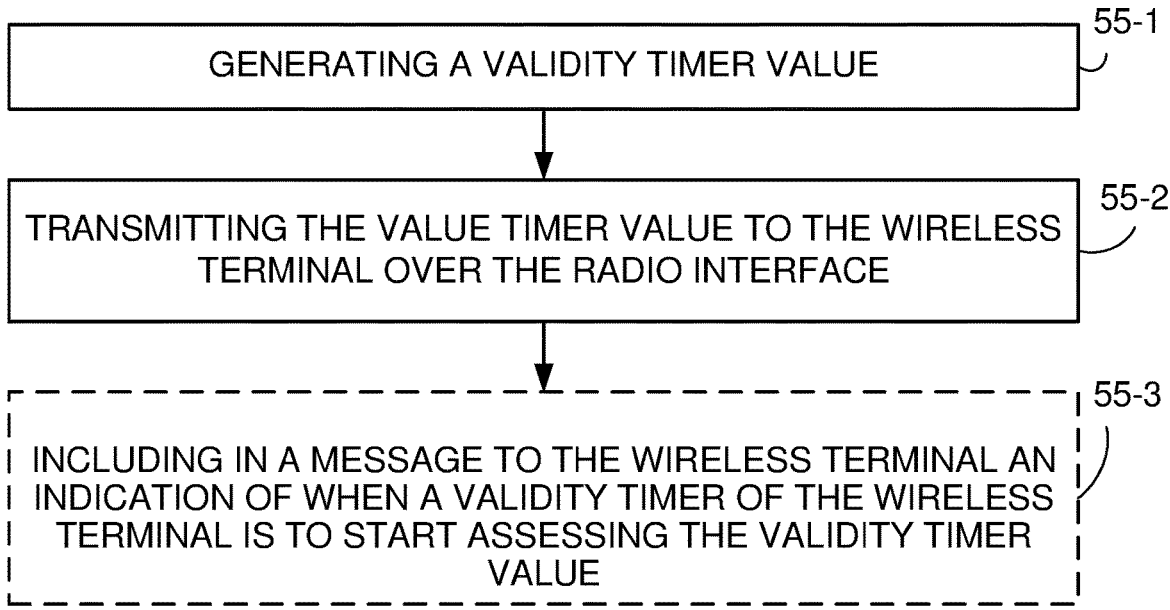
FIG. 55 is a flowchart showing example, representative, basic acts or steps performed by the access node of FIG. 53.

FIG. 55 shows example representative acts or steps performed by the access node 22 of the example embodiment and mode of FIG. 53, in the simplified context of the radio access network (RAN) of FIG. 56. Act 55-1 comprises the access node 22, and validity time value generator 170 in particular, generating a validity timer value which specifies a time period during which content of system information facilitating use of communication services provided by the access node remains valid in a geographical area served by the access node and a group comprising at least one other access node. Preferably but not exclusively the validity timer value specifies a time period during which content of non-essential system information (e.g., the second type system information) remains valid in the geographical area, the non-essential system information not being required for initial access to the radio access network. Act 55-2 comprises the access node 22 transmitting the value timer value to the wireless terminal over the radio interface. In FIG. 53 arrow 56-1 depicts transmission of the value timer value from access node 22-56-1 to the wireless terminal 26.

The access node 22 may optionally also perform act 55-3. Act 55-3 comprises the access node 22 including in a message to the wireless terminal an indication of when a validity timer of the wireless terminal is to start assessing the validity timer value. The message in which the indication of when a validity timer of the wireless terminal is to start assessing the validity timer value may be the same message in which the validity timer value is sent to the wireless terminal 26, or a different message.

In a first example implementation, the indication is configured to indicate that the validity timer of the wireless terminal is to start assessing the validity timer value upon receipt of the content of the non-essential system information. Thus in the first example implementation, the wireless terminal 26 starts the validity timer upon receipt of the second type system information from the first access node 22-56-1, and permits use of the second type system information should the wireless terminal exit and then re-enter the geographical area before the validity timer expires.

In a second example implementation, the indication is configured to indicate that the validity timer of the wireless terminal is to start assessing the validity timer value when the wireless terminal leaves the geographical area. Thus in the second example implementation, the wireless terminal 26 starts the validity timer upon the wireless terminal 26 leaving the geographical area (at the time at which the wireless terminal 26 is at the location 56-4 shown in FIG. 56).

Thus, the example embodiment and modes represented by FIG. 53 provide a detailed method for dealing with the validity period of received non-essential SIBs. It was disclosed in previous embodiments that a received non-essential SIB (or a group of non-essential SIBs) may be valid within a pre-determined or network-configured time period. In the first example implementation described above, a validity timer associated with a specific non-essential SIB (or a specific group of SIBs) may (re-)start immediately upon receipt of the SIB/SIB group. Alternatively, in the second example implementation, the wireless terminal 26 may defer starting the timer until it leaves the geographical area (as depicted by arrow 56-2 in FIG. 56) for the corresponding SIB/SIB group. In this second example implementation, after starting the timer the wireless terminal 26 may eventually reuse the content of SIB/SIB group if the wireless terminal 26 goes back to the original area (as depicted by arrow 56-3 in FIG. 3) and if the timer has not expired. The wireless terminal 26 may discard the content when the validity timer expires.

The timer value and/or which of these configurations to choose may be obtained in several ways. As a timer-parameter implementation, the timer value and/or an indication of which of these configurations to choose may be provided by access node 22. As a second timer-parameter implementation, the timer value and/or an indication of which of these configurations to choose may be pre-configured at the wireless terminal 26. Either of these example implementations may reduce the chance of area ID/value tag collision. Further, the second example implementation may suppress unnecessary on-demand delivery requests from a wireless terminal staying in one area.

Figure 57:
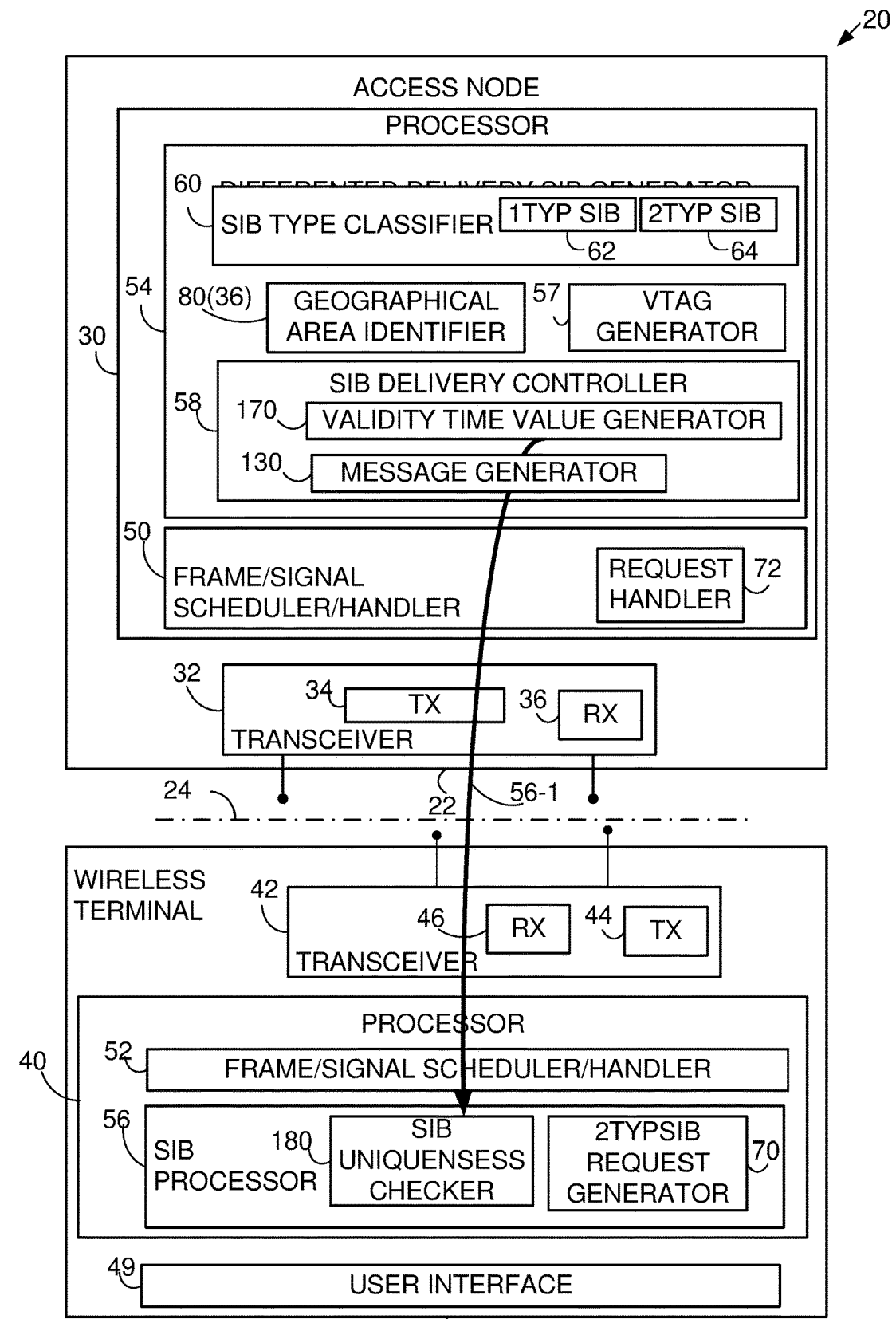
FIG. 57 is a schematic view showing an example communications system comprising a radio access node and a wireless terminal, and wherein a wireless terminal determines that, if a geographical area identifier is not received along with system information from a particular access node, the system information received from that access node is unique for that access.

FIG. 57 shows an example embodiment and mode of an example communications system wherein a wireless terminal determines that, if a geographical area identifier is not received along with system information from a particular access node, the system information received from that access node is unique for that access node and thus cannot be presumed to be usable in cells served by other access nodes. To that end FIG. 57 shows wireless terminal 26 as comprising SIB uniqueness checker 180.

Figure 58:
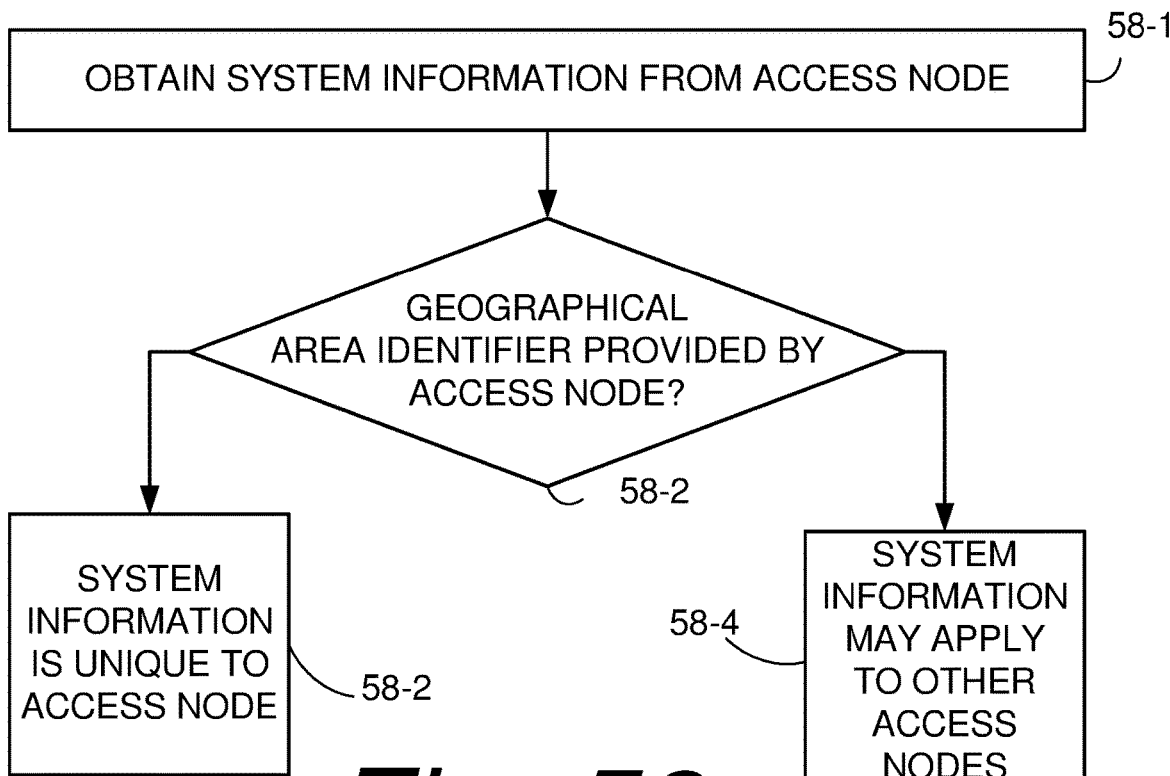
FIG. 58 is a flowchart showing example, representative, basic acts or steps performed by the wireless terminal of FIG. 57.
Figure 59:
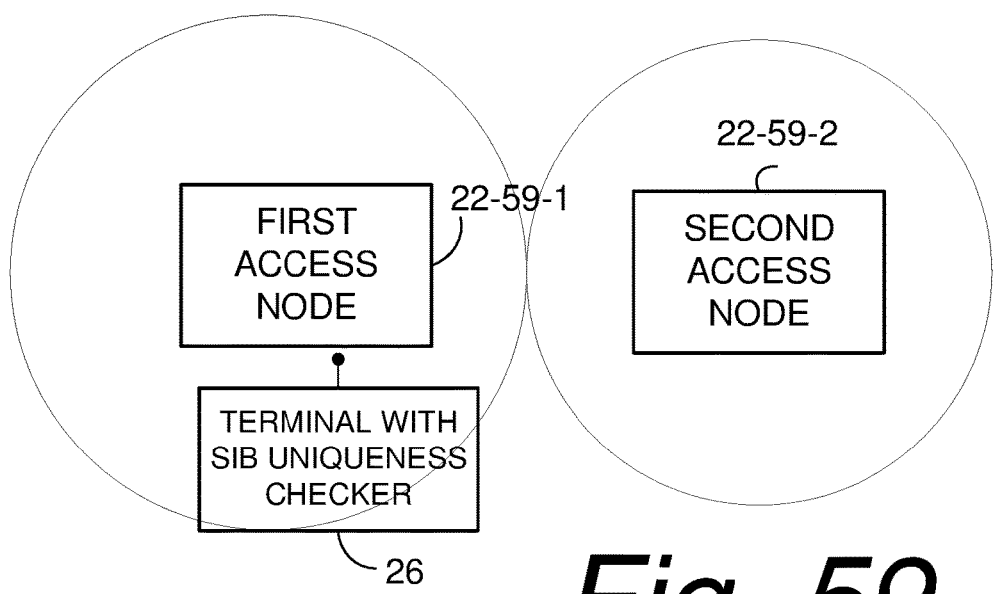
FIG. 59 is a diagrammatic view showing a context of a radio access network (RAN) in which the wireless terminal of FIG. 57 performs the acts of FIG. 58.

FIG. 58 shows example, representative, basic acts or steps performed by the wireless terminal 26 of FIG. 57. The acts of FIG. 58 are illustrated in an example scenario of a simplified context of a radio access network (RAN) as shown in FIG. 59, which illustrates a first access node 22-59-1 and a second access node 22-96-2. Act 58-1 comprises the wireless terminal 26 obtaining system information from a first access node 22-59-1. The system information obtained in act 58-1 may comprise first type system information; second type system information; a value tag associated with the second type system information; and (if provided by the access node 22) a geographical area identifier which specifies a geographical area for which the value tag is valid. As understood with reference to other example embodiments and modes, the geographical area being served by the access node and a group comprising at least one other access node. Act 58-2 comprises the wireless terminal 26 a determination regarding provision by the first access node 22-59-1 of the geographical area identifier, i.e., checking whether the access node 22-59-1 provided a geographical area identifier. If the result of the determination of act 58-2 is negative, i.e., no geographical area identifier was provided by the access node 22-59-1, then as act 58-3 the wireless terminal 26 understands that the system information provided by access node 22-59-1 is unique to access node 22-59-1 and that such system information cannot be presumed to be valid in the cell of another access node, such as access node 22-59-2. On the other hand, if the result of the determination of act 58-2 is positive, i.e., a geographical area identifier was provided by the access node 22-59-1, then as act 58-4 the wireless terminal 26 understands that the system information provided by access node 22-59-1 may also apply (subject to possible further checking) to another cell in the same geographical area, such as access node 22-59-2, for example. Act 58-3 and act 58-4 thus together comprise an act of making a second determination regarding applicability of the second type system information to a cell served by the second access node.

Thus, in some example embodiments and modes represented by FIG. 57-FIG. 59, the presence of a geographical area identifier such as areaId may be optional. If the geographical area identifier (areaId) is omitted for a certain sibId/valueTag pair, the wireless terminal 26 may treat the non-essential SIB (or the group of non-essential SIBs) with that sibId as an node-specific SIB; only valid for the access node. Likewise, for other example embodiments and modes which utilize a list and index, the presence of areaId_idx may be optional and, if omitted, the corresponding non-essential SIB or the group of SIBs may be access node-specific.

Figure 60:
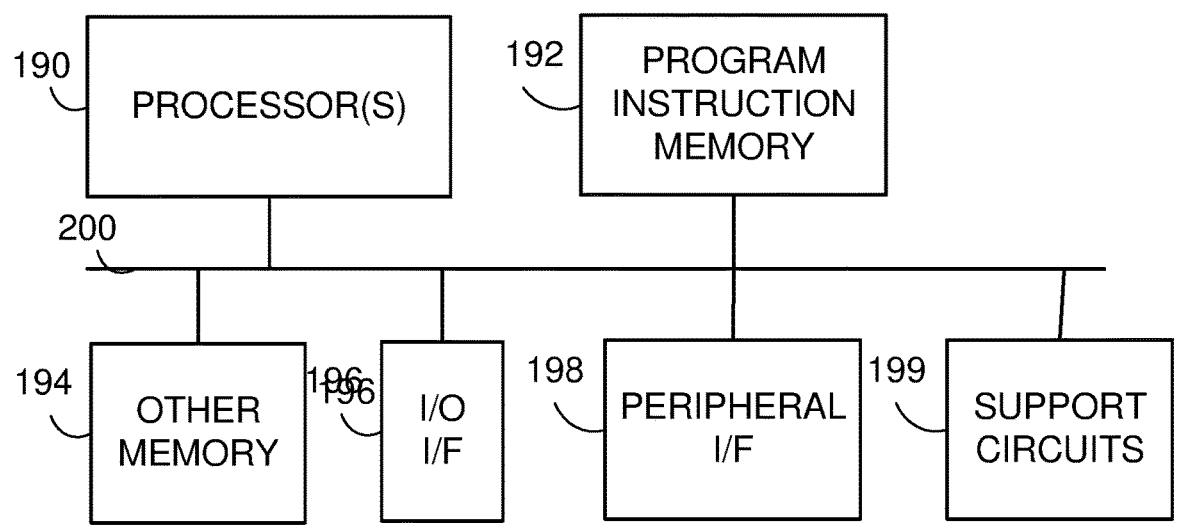
FIG. 60 is a diagrammatic view showing example electronic machinery which may comprise node electronic machinery or terminal electronic machinery.

Certain units and functionalities of node 22 and wireless terminal 26 are, in example embodiments, implemented by electronic machinery, computer, and/or circuitry. For example, the node processors 30 and terminal processors 40 of the example embodiments herein described and/or encompassed may be comprised by the computer circuitry of FIG. 60. FIG. 60 shows an example of such electronic machinery or circuitry, whether node or terminal, as comprising one or more processor(s) circuits 190, program instruction memory 192; other memory 194 (e.g., RAM, cache, etc.); input/output interfaces 196; peripheral interfaces 198; support circuits 199; and busses 200 for communication between the aforementioned units.

The program instruction memory 192 may comprise coded instructions which, when executed by the processor(s), perform acts including but not limited to those described herein. Thus is understood that each of node processor 30 and terminal processor 40, for example, comprise memory in which non-transient instructions are stored for execution.

The memory 194, or computer-readable medium, may be one or more of readily available memory such as random access memory (RAM), read only memory (ROM), floppy disk, hard disk, flash memory or any other form of digital storage, local or remote, and is preferably of non-volatile nature. The support circuits 199 are coupled to the processors 190 for supporting the processor in a conventional manner. These circuits include cache, power supplies, clock circuits, input/output circuitry and subsystems, and the like.

The technology of this application thus encompasses but is not limited to the following example embodiments, example features, and example advantages:

Example Embodiment 1

A user equipment (UE) for receiving system information, comprising:
a processor;
a memory in electronic communication with the processor, wherein instructions stored in the memory are executable to:
receive first system information periodically broadcasted from eNB;
determine types of second system information to additionally receive, wherein each of said types corresponds to a second system information block;
transmit to the eNB a request containing said types of the second system information; and,
receive the requested second system information from the eNB;

Example Embodiment 2

The UE of Example Embodiment 1, wherein contents of one or plurality of second system information blocks are associated with a value tag.

Example Embodiment 3

The UE of Example Embodiment 2, where said value tag is assigned and used separately from one or more value tags used for the first system information.

Example Embodiment 4

The UE of Example Embodiment 2, wherein said value tag is valid within one eNB.

Example Embodiment 5

The UE of Example Embodiment 2, wherein said value tag is valid within at least one geographical area consisting of plurality of eNBs.

Example Embodiment 6

The UE of Example Embodiment 2, wherein said value tag is valid within a pre-determined or network-configured time period from the time where the UE received the associated second system information blocks.

Example Embodiment 7

The UE of Example Embodiment 2, wherein from said first system information the UE obtains value tags, each of which indicates the current version of the corresponding second information system blocks.

Example Embodiment 8

The UE of Example Embodiment 7, wherein the second system blocks associated with a same value tag is identified by a group index.

Example Embodiment 9

The UE of Example Embodiment 8, wherein said group index is used in said request containing said types of the second system information.

Example Embodiment 10

The UE of Example Embodiment 7, wherein the UE saves in its memory the received second system information blocks and their associated value tags.

Example Embodiment 11

The UE of Example Embodiment 10, wherein the UE determines whether the UE transmits to the eNB a request for delivery of one or plurality of second system information blocks by comparing each of the current value tags included in said first system information and, if present, the saved value tag corresponding the same second system information blocks.

Example Embodiment 12

The UE of Example Embodiment 11, wherein the UE refrains from requesting delivery of second system information blocks if the current value tag for these second system information blocks matches the saved value tag for the same second system information blocks.

Example Embodiment 13

The UE of Example Embodiment 10, wherein the UE includes the saved value tags in said request.

Example Embodiment 14

The UE of Example Embodiment 13, wherein the UE receives from the eNB one or plurality of compressed contents, each of which is a compressed image of one or plurality of second system information blocks.

Example Embodiment 15

The UE of Example Embodiment 14, wherein each of said compressed contents is produced based on two versions of same types of second system information with different value tags.

Example Embodiment 16

The UE of Example Embodiment 15, wherein each of said compressed contents consists of differences between said two versions.

Example Embodiment 17

The UE of Example Embodiment 14, wherein the UE constructs one or plurality of second system information blocks using the compressed contents and the saved second system information blocks.

Example Embodiment 18

The UE of Example Embodiment 10, wherein upon receiving a second system information block the UE updates the corresponding value tag saved in the memory.

Example Embodiment 19

The UE of Example Embodiment 7, wherein the UE retrieves broadcast scheduling information of said second system information from said first system information.

Example Embodiment 20

The UE of Example Embodiment 19, wherein the UE receives the broadcasted second system information based on said scheduling information.

Example Embodiment 21

The UE of Example Embodiment 19, wherein the UE refrains from requesting delivery of second system information blocks if the first system information indicates broadcast delivery of said second system information

Example Embodiment 22

The UE of Example Embodiment 21, wherein the UE refrains from requesting delivery of second system information blocks if the first system information indicates broadcast delivery of said second system information and if the current value tag for these second system information blocks is different from the saved value tag for the same second system information blocks.

Example Embodiment 23

The UE of Example Embodiment 19, wherein the second system blocks associated with a same value tag is identified by a group index.

Example Embodiment 24

The UE of Example Embodiment 20, wherein the UE receives one or plurality of compressed contents based on said scheduling information, each of which is a compressed image of one or plurality of second system information blocks.

Example Embodiment 25

The UE of Example Embodiment 5, wherein the UE receives one or plurality of area identifications representing said geographical areas.

Example Embodiment 26

The UE of Example Embodiment 25, wherein each area identification represents the validity area for at least one second system information block.

Example Embodiment 27

The UE of Example Embodiment 25, wherein the UE receives a list of area identifications and indices, where each index is associated with at least one second system information block and refers to one of the area identifications in the list.

Example Embodiment 28

The UE of Example Embodiment 25, wherein the UE considers that for a given eNB the validity area of all the second system information blocks is limited to the eNB if no area identification is broadcasted from the eNB.

Example Embodiment 29

The UE of Example Embodiment 26, wherein the UE considers that for a given eNB the validity area of a second system information block is limited to the eNB if no area identification associated with said second system information block is broadcasted from the eNB.

Example Embodiment 30

The UE of Example Embodiment 27, wherein the UE considers that for a given eNB the validity area of a second system information block is limited to the eNB if no index associated with said second system information block is broadcasted from the eNB.

Example Embodiment 31

The UE of Example Embodiment 5, wherein the UE receives from an eNB error detection information that validates the contents of second system information blocks available from the eNB.

Example Embodiment 32

The UE of Example Embodiment 31, wherein said error detection code is broadcasted in the first system information.

Example Embodiment 33

The UE of Example Embodiment 31, wherein said error detection code is unicasted to the UE.

Example Embodiment 34

The UE of Example Embodiment 31, wherein the UE requests delivery of second system information blocks when the received error detection information invalidates the previously received second system information blocks.

Example Embodiment 35

The UE of Example Embodiment 5, wherein the UE transmits to an eNB error detection information derived from the contents of second system information blocks previously received.

Example Embodiment 36

The UE of Example Embodiment 35, wherein the UE receives a response from the eNB indicating the validity of said error detection information.

Example Embodiment 37

The UE of Example Embodiment 36, wherein the UE requests delivery of second system information blocks when said response indicates that the error detection code is invalid.

Example Embodiment 38

The UE of Example Embodiment 25, wherein the value tag is valid while the UE stays in the geographical area where the UE has received the corresponding second system information blocks.

Example Embodiment 39

The UE of Example Embodiment 38, wherein the value tag is further valid within a pre-determined or network-configured time period from the time the UE leaves the geographical area.

Example Embodiment 40

An evolved node B (eNB) for delivering system information, comprising:
  a processor;
  a memory in electronic communication with the processor, wherein instructions stored in the memory are executable to:
    periodically broadcast first system information that includes types of second system information available by request, wherein each of said types corresponds to a second system information block;
    receive from a UE a request for transmission of said second system information; and,
    transmit said requested second system information;

Example Embodiment 41

The eNB of Example Embodiment 40, wherein contents of one or plurality of second system information blocks are associated with a value tag.

Example Embodiment 42

The eNB of Example Embodiment 41, where said value tag is assigned and used separately from one or more value tags used for the first system information.

Example Embodiment 43

The eNB of Example Embodiment 41, wherein said value tag is valid within one eNB.

Example Embodiment 44

The eNB of Example Embodiment 41, wherein said value tag is valid within a geographical area consisting of plurality of eNBs.

Example Embodiment 45

The eNB of Example Embodiment 41, wherein said value tag is valid within a pre-determined or network-configured time period from the time where the UE received the associated second system information blocks.

Example Embodiment 46

The eNB of Example Embodiment 41, wherein the eNB includes in said first system information value tags, each of which indicates the current version of the corresponding second information system blocks.

Example Embodiment 47

The eNB of Example Embodiment 46, wherein the second system blocks associated with a same value tag is identified by a group index.

Example Embodiment 48

The eNB of Example Embodiment 41, wherein the eNB generates one or plurality of compressed contents for second system information upon receiving said request from the UE.

Example Embodiment 49

The eNB of Example Embodiment 48, wherein the eNB receives in said request at least one identification identifying at least one second system information block to deliver to the UE.

Example Embodiment 50

The eNB of Example Embodiment 49, wherein the identification is a value tag.

Example Embodiment 51

The eNB of Example Embodiment 49, wherein the identification is a group index.

Example Embodiment 52

The eNB of Example Embodiment 48, wherein each compressed content is produced based on the version of the second system information block(s) associated with the received identification and the current version of the same second system information block(s).

Example Embodiment 53

The eNB of Example Embodiment 52, wherein each of said compressed content consists of differences between said two versions.

Example Embodiment 54

The eNB of Example Embodiment 46, wherein the eNB includes broadcast scheduling information of said second system information in said first system information.

Example Embodiment 55

The eNB of Example Embodiment 46, wherein the eNB broadcasts said second system information based on said scheduling information.

Example Embodiment 56

The eNB of Example Embodiment 46, wherein the eNB includes broadcast scheduling information of said second system information in said first system information after the content of said second system information gets updated.

Example Embodiment 57

The eNB of Example Embodiment 56, wherein the inclusion of said broadcast scheduling information in the first system information is limited for pre-determined times after the content of said second system information gets updated.

Example Embodiment 58

The eNB of Example Embodiment 41, wherein the second system blocks associated with a same value tag is identified by a group index.

Example Embodiment 59

The eNB of Example Embodiment 40, wherein the eNB transmits one or plurality of compressed contents based on said scheduling information, each of which is a compressed image of one or plurality of second system information blocks.

Example Embodiment 60

The eNB of Example Embodiment 44, wherein the eNB transmits one or plurality of area identifications representing said geographical areas.

Example Embodiment 61

The eNB of Example Embodiment 60, wherein each area identification indicates the validity area of at least one second system information block.

Example Embodiment 62

The eNB of Example Embodiment 60, wherein the eNB transmits a list of area identifications and indices, where each index is associated with at least one second system information block and refers to one of the area identifications in the list.

Example Embodiment 63

The eNB of Example Embodiment 60, wherein the eNB transmits no area identification when the validity area of all the second system information blocks is limited to the eNB.

Example Embodiment 64

The eNB of Example Embodiment 61, wherein the eNB transmits no area identification for a second system information block or a group of system information blocks when the validity area of the second system information block(s) is limited to the eNB.

Example Embodiment 65

The eNB of Example Embodiment 62, wherein the eNB transmits no index associated with a second system information block or with a group of second system information blocks when the validity area of the second system information block(s) is limited to the eNB.

Example Embodiment 66

The eNB of Example Embodiment 44, wherein the eNB transmits error detection information that validates the contents of second system information blocks available from the eNB.

Example Embodiment 67

The eNB of Example Embodiment 66, wherein said error detection information is broadcasted in the first system information.

Example Embodiment 68

The eNB of Example Embodiment 66, wherein said error detection information is unicasted to the UE.

Example Embodiment 69

The eNB of Example Embodiment 66, wherein the eNB receives from the UE error detection information that validates the contents of second system information blocks.

Example Embodiment 70

The eNB of Example Embodiment 69, wherein the eNB transmits a response indicating the validity of said error detection information.

Example Embodiment 71

A method for a user equipment (UE) comprising:
receiving first system information periodically broadcasted from eNB;
determining types of second system information to additionally receive;
transmitting to the eNB a request containing said types of the second system information, wherein each of said types corresponds to a second system information block; and,
receiving the requested second system information from the eNB;

Example Embodiment 72

A method for an evolved node B (eNB) comprising:
periodically broadcasting first system information that includes types of second system information available by request;
receiving from a UE a request for transmission of said second system information, wherein each of said types corresponds to a second system information block; and,
transmitting said requested second system information.

Example Embodiment 73

An access node of a radio access network comprising:
processor circuitry configured to schedule periodic transmission of a broadcast message, the broadcast message comprising:
first type system information;
identification of second type system information available from the access node;
a value tag associated with the second type system information;
a geographical area identifier which specifies a geographical area for which the value tag is valid, the geographical area being served by the access node and a group comprising at least one other access node;
a transmitter configured to transmit the broadcast message over a radio interface.

Example Embodiment 74

The access node of Example Embodiment 73, wherein the processor circuitry is configured to generate a signal to define the geographical area.

Example Embodiment 75

The access node of Example Embodiment 73, wherein the processor circuitry is configured:
separately from the broadcast message which comprises the first type system information, to schedule transmission by the transmitter of content of the second type system information over the radio interface.

Example Embodiment 76

The access node of Example Embodiment 75, wherein the first type system information is periodically broadcasted by the transmitter and is required for initial access to the radio access network, and where in the second type system information is not required for initial access to the radio access network.

Example Embodiment 77

The access node of Example Embodiment 73, wherein the processor circuitry is further configured to include the identifier of the geographical area in a portion of the broadcast message that pertains to the first type system information.

Example Embodiment 78

The access node of Example Embodiment 77, wherein the identifier of the geographical area is applicable for all second type system identified information in the broadcast message.

Example Embodiment 79

The access node of Example Embodiment 73, wherein the processor circuitry is further configured to include the identifier of the geographical area in a portion of the broadcast message that pertains to the identification of the second type system information.

Example Embodiment 80

The access node of Example Embodiment 73, wherein the processor circuitry is further configured to include the identifier of the geographical area individually for at least one second type system information.

Example Embodiment 81

The access node of Example Embodiment 73, wherein the processor circuitry is further configured to include the identifier of the geographical area in association with a group of plural second type system information.

Example Embodiment 82

The access node of Example Embodiment 73, wherein the processor circuitry is further configured
to include in a portion of the broadcast message that pertains to the first type system information, a list of identifiers of geographical areas;

to include, in a portion of the broadcast message that pertains to the identification of the second type system information, a reference to a member of the list which is associated with (a value tag for) at least one second type system information.

Example Embodiment 83

The access node of Example Embodiment 73, wherein the processor circuitry is further configured to include, in the portion of the broadcast message that pertains to the identification of the second type system information, a reference to a member of the list which is associated with (a value tag for) a group of second type system information.

Example Embodiment 84

The access node of Example Embodiment 73, wherein the processor circuitry is further configured to include in a message to the wireless terminal a validity timer value, the validity timer value specifying a time period during which content of the second type system information remains valid in the geographical area.

Example Embodiment 85

The access node of Example Embodiment 84, wherein the processor is further configured to include in a message to the wireless terminal an indication of when a validity timer of the wireless terminal is to start assessing the validity timer value.

Example Embodiment 86

The access node of Example Embodiment 85, wherein the processor is further configured to include in a message to the wireless terminal an indication that the validity timer of the wireless terminal is to start assessing the validity timer value upon receipt of the content of the non-essential system information.

Example Embodiment 87

The access node of Example Embodiment 85, wherein the processor is further configured to include in a message to the wireless terminal an indication that the validity timer of the wireless terminal is to start assessing the validity timer value when the wireless terminal leaves the geographical area.

Example Embodiment 88

An access node of a radio access network comprising:
processor circuitry configured to generate check information based on content of system information available at the access node;
a transmitter configured to transmit the check information over a radio interface.

Example Embodiment 89

The access node of Example Embodiment 88, wherein processor circuitry is configured to include the check information in a unicast message to a wireless terminal.

Example Embodiment 90

The access node of Example Embodiment 88, wherein the processor circuitry is configured to schedule periodic transmissions which include:
first type system information;
an identification of second type system information available from the access node;
the check information based on the content of the second type system information; and
wherein the transmitter is configured to transmit the period transmissions over the radio interface.

Example Embodiment 91

The access node of Example Embodiment 88, wherein the first type system information is essential type system information that is required for initial access to the radio access network, and wherein the non-essential type system information is not required for initial access to the radio access network.

Example Embodiment 92

The access node of Example Embodiment 91, wherein the processor circuitry is further configured to schedule a transmission by the transmitter over the radio interface of the content of the second type system information separately from the periodic transmissions of the first type system information.

Example Embodiment 93

An access node of a radio access network comprising:
receiver circuitry configured to receive a message over a radio interface from a wireless terminal;
processor circuitry configured:
to perform an analysis upon check information included in the received message, the check information being based on content of system information believed current by the wireless terminal, the analysis comprising a comparison of the check information included in the received message with check information derived by the access node with respect to content of the system information deemed current by the access node;
to generate a response message for the wireless terminal in accordance with the analysis;
a transmitter configured to transmit the response message over the radio interface to the wireless terminal.

Example Embodiment 94

The access node of Example Embodiment 93, wherein the check information is based on content of non-essential system information believed current by the wireless terminal, and wherein the processor circuitry is configured to perform the analysis by making a comparison of the check information included in the received message with check information derived by the access node with respect to content of non-essential system information deemed current by the access node, the non-essential system information not being required for initial access to the radio access network.

Example Embodiment 95

The access node of Example Embodiment 93, wherein the received message comprises a connection request procedure, and wherein the response message rejects a connection if the comparison is not favorable.

Example Embodiment 96

The access node of Example Embodiment 93, wherein the received message comprises a connection request procedure, and wherein the response message permits a connection if the comparison is favorable.

Example Embodiment 97

An access node of a radio access network comprising:
processor circuitry configured:
to include system information in a message for transmission over a radio interface to a wireless terminal, the system information facilitating use of communication services provided by the access node;
to include in a message to the wireless terminal a validity timer value, the validity timer value specifying a time period during which content of the system information remains valid in a geographical area served by the access node and a group comprising at least one other access node;
transmitter circuitry configured to transmit messages to the wireless terminal over the radio interface.

Example Embodiment 98

The access node of Example Embodiment 97, wherein the validity timer value specifies a time period during which content of non-essential system information remains valid in the geographical area, the non-essential system information not being required for initial access to the radio access network.

Example Embodiment 99

The access node of Example Embodiment 97, wherein the processor is further configured to include in a message to the wireless terminal an indication of when a validity timer of the wireless terminal is to start assessing the validity timer value.

Example Embodiment 100

The access node of Example Embodiment 99, wherein the processor is further configured to include in a message to the wireless terminal an indication that the validity timer of the wireless terminal is to start assessing the validity timer value upon receipt of the content of the non-essential system information.

Example Embodiment 101

The access node of Example Embodiment 99, wherein the processor is further configured to include in a message to the wireless terminal an indication that the validity timer of the wireless terminal is to start assessing the validity timer value when the wireless terminal leaves the geographical area.

Example Embodiment 102

A method in an access node of a radio access network comprising:
scheduling periodic transmission of a broadcast message, the broadcast message comprising:
first type system information;
identification of second type system information available from the access node;
a value tag associated with the second type system information;
a geographical area identifier which specifies a geographical area for which the value tag is valid, the geographical area being served by the access node and a group comprising at least one other access node;
transmitting the broadcast message over a radio interface.

Example Embodiment 103

A method in an access node of a radio access network comprising:
generating check information based on content of system information available at the access node;
transmitting the check information over a radio interface.

Example Embodiment 104

A method in an access node of a radio access network comprising:
receiving a message over a radio interface from a wireless terminal;
performing an analysis upon check information included in the received message, the check information being based on content of system information believed current by the wireless terminal, the analysis comprising a comparison of the check information included in the received message with check information derived by the access node with respect to content of the system information deemed current by the access node;
generating a response message for the wireless terminal in accordance with the analysis;
transmitting the response message over the radio interface to the wireless terminal.

Example Embodiment 105

A method in an access node of a radio access network comprising:
generating a validity timer value which specifies a time period during which content of system information facilitating use of communication services provided by the access node remains valid in a geographical area served by the access node and a group comprising at least one other access node;
transmitting the value timer value to the wireless terminal over the radio interface.

Example Embodiment 106

The method of Example Embodiment 105, wherein the validity timer value specifies a time period during which content of non-essential system information remains valid in the geographical area, the non-essential system information not being required for initial access to the radio access network.

Example Embodiment 107

The method of Example Embodiment 105, further comprising including in a message to the wireless terminal an indication of when a validity timer of the wireless terminal is to start assessing the validity timer value.

Example Embodiment 108

The method of Example Embodiment 107, wherein the indication is configured to indicate that the validity timer of the wireless terminal is to start assessing the validity timer value upon receipt of the content of the non-essential system information.

Example Embodiment 109

The method of Example Embodiment 107, wherein the indication is configured to indicate that the validity timer of the wireless terminal is to start assessing the validity timer value when the wireless terminal leaves the geographical area.

Example Embodiment 110

A wireless terminal comprising:
a receiver configured:
to receive from a first access node:
first type system information;
second type system information;
a value tag associated with the second type system information;
a geographical area identifier which specifies a geographical area for which the value tag is valid, the geographical area being served by the access node and a group comprising at least one other access node;
to camp on a cell served by a second access node;
processor circuitry configured to make a determination regarding applicability of the second type system information to the cell served by the second access node at least partially in dependence on the geographical area identifier.

Example Embodiment 111

The access node of Example Embodiment 110, wherein the first type system information is periodically broadcasted by the transmitter and is required for initial access to the radio access network, and wherein the second type system information is not required for initial access to the radio access network.

Example Embodiment 112

The wireless terminal of Example Embodiment 110, wherein the processor circuitry is configured to make the determination based at least partially on membership of the first access node and the second access node to a same geographical area as indicated by a comparison of the geographical area identifier received from the first access node and a second geographical area identifier received from the second access node.

Example Embodiment 113

The wireless terminal of Example Embodiment 110, wherein the processor circuitry is configured to use the second type system information received from the first access node in the cell served by the second access node when the determination indicates that the second type system information obtained from the first access node is applicable to the cell served by the second access node.

Example Embodiment 114

The wireless terminal of Example Embodiment 110, wherein the processor circuitry is configured to request from the second access node the second type system information for use in the cell served by the second access node when the determination indicates that the second type system information obtained from the first access node is not applicable to the cell served by the second access node.

Example Embodiment 115

The wireless terminal of Example Embodiment 110, wherein the receiver is configured to receive a broadcast message from the first access node, the broadcast message comprising:
content of the first type system information;
an identification of the second type system information available from the first access node;
the value tag;
the geographical area identifier.

Example Embodiment 116

The wireless terminal of Example Embodiment 115, wherein the processor circuitry is configured to obtain the geographical area identifier from a portion of the broadcast message which pertains to the first type system information.

Example Embodiment 117

The wireless terminal of Example Embodiment 115, wherein the processor circuitry is configured to obtain the geographical area identifier from a portion of the broadcast message which pertains to the identification of the second type system information.

Example Embodiment 118

The wireless terminal of Example Embodiment 117, wherein the processor circuitry is further configured to obtain the geographical area identifier individually for at least one second type system information.

Example Embodiment 119

The wireless terminal of Example Embodiment 117, wherein the processor circuitry is further configured to obtain the geographical area identifier in association with a group of plural second type system information.

Example Embodiment 120

The wireless terminal of Example Embodiment 115, wherein the processor circuitry is further configured:
to obtain a list of geographical area identifiers from a portion of the broadcast message that pertains to the first type system information;
to obtain, from a portion of the broadcast message that pertains to the identification of the second type system information, a reference to a member of the list which is associated with at least one second type system information.

Example Embodiment 121

The wireless terminal of Example Embodiment 120, wherein the processor circuitry is further configured to obtain, from the portion of the broadcast message that pertains to the identification of the second type system information, a reference to a member of the list which is associated with a group of second type system information.

Example Embodiment 122

The wireless terminal of Example Embodiment 110, wherein the processor circuitry is configured to obtain from a validity timer value a time period during which content of the second type system information remains valid in the geographical area.

Example Embodiment 123

The wireless terminal of Example Embodiment 122, wherein the receiver is configured to obtain the validity timer value from the access node.

Example Embodiment 124

The wireless terminal of Example Embodiment 122, wherein the validity timer value is configured at the wireless terminal.

Example Embodiment 125

The wireless terminal of Example Embodiment 122, wherein the processor is further configured to obtain an indication of when a validity timer of the wireless terminal is to start assessing the validity timer value.

Example Embodiment 126

The wireless terminal of Example Embodiment 125, wherein the receiver is configured to obtain the indication of when a validity timer of the wireless terminal is to start assessing the validity timer value from the access node.

Example Embodiment 127

The wireless terminal of Example Embodiment 125, wherein the indication of when a validity timer of the wireless terminal is to start assessing the validity timer value is configured at the wireless terminal.

Example Embodiment 128

The wireless terminal of Example Embodiment 125, wherein the processor is further configured to start assessing the validity timer value upon receipt of the content of the non-essential system information.

Example Embodiment 129

The wireless terminal of Example Embodiment 125, wherein the processor is further configured to start assessing the validity timer value when the wireless terminal leaves the geographical area.

Example Embodiment 130

The wireless terminal of Example Embodiment 110, wherein the receiver is further configured to receive, from the second access node, node-obtained second check information based on content of second type of system information available from the second access node; and
 wherein the processor circuitry is further configured:
  to determine terminal check information based on content of the second type of system information currently stored at the wireless terminal;
  to make a check information comparison of the node-obtained check information and the terminal check information, and
  to make the determination regarding the applicability of the second type system information to the cell served by the second access node at least partially in dependence of the check information comparison.

Example Embodiment 131

The wireless terminal of Example Embodiment 130, wherein the receiver is further configured to receive the node-obtained second check information from a broadcast message, the broadcast message comprising first type system information and an identification of second type system information available at the second access node.

Example Embodiment 132

The wireless terminal of Example Embodiment 110, wherein the processor circuitry is further configured:
 to make a determination that at least a first portion of the second type system information currently stored at the wireless terminal is not applicable to the cell served by the second access node;
 to request a node-available first portion of the second type system information from the second access node;
 to obtain from the second access node both the node-available first portion of the second type system information from the second access node and node-obtained second check information based on content of second type of system information available from the second access node;
 to determine updated terminal check information based on content of the second type of system information currently stored at the wireless terminal as updated by the node-available first portion of the second type system information;
 to make a check information comparison of the node-obtained check information and the updated terminal check information, and
 to make the further determination regarding the applicability, to the cell served by the second access node, of second type of system information currently stored at the wireless terminal as updated by the node-available first portion of the second type system information.

Example Embodiment 133

The wireless terminal of Example Embodiment 132, wherein the receiver is further configured to receive the node-obtained second check information from a unicast message transmitted by the second access node.

Example Embodiment 134

The wireless terminal of Example Embodiment 110, wherein the processor circuitry is configured, upon making a determination that the second type system information is applicable to the cell served by the second access node, to:
 determine terminal check information based on content of the second type of system information currently stored at the wireless terminal;
 to include the terminal check information in a message transmitted to the second access node.

Example Embodiment 135

The wireless terminal of Example Embodiment 134, wherein the processor circuitry is configured, upon receiving a response message indicating invalid check information, to request the second type system information from the second access node.

Example Embodiment 136

The wireless terminal of Example Embodiment 135, wherein the message transmitted to the second access node is a connection request message, and wherein the response message is a connection rejection message.

Example Embodiment 137

A wireless terminal comprising:
a receiver configured:
to receive from an access node:
first type system information;
second type system information;
a value tag associated with the second type system information;
a geographical area identifier which specifies a geographical area for which the value tag is valid, the geographical area being served by the access node and a group comprising at least one other access node;
processor circuitry configured to make a determination regarding applicability of the second type system information to a cell served by the access node at least partially in dependence on the geographical area identifier and a validity timer value, the validity timer value specifying a time period during which the second type system information system information obtained from the first access node remains valid in the geographical area.

Example Embodiment 138

The wireless terminal of Example Embodiment 137, wherein the receiver is configured to obtain the validity timer value from the access node.

Example Embodiment 139

The wireless terminal of Example Embodiment 137, wherein the validity timer value is configured at the wireless terminal.

Example Embodiment 140

The wireless terminal of Example Embodiment 137, wherein the processor circuitry is configured to obtain an indication indicating that the wireless terminal is to start the validity timer upon receipt of the second type system information from the first access node, and to permit use of the second type system information should the wireless terminal exit and then re-enter the geographical area before the validity timer expires.

Example Embodiment 141

The wireless terminal of Example Embodiment 140, wherein the receiver is configured to obtain from the access node the indication of when the wireless terminal is to start the validity timer.

Example Embodiment 142

The wireless terminal of Example Embodiment 140, wherein the processor circuitry is pre-configured with the indication of when the wireless terminal is to start the validity timer.

Example Embodiment 143

The wireless terminal of Example Embodiment 137, wherein the processor circuitry is configured to obtain an indication indicating that the wireless terminal is to start the validity timer upon the wireless terminal leaving the geographical area, and to permit use of the second type system information should the wireless terminal exit subsequently re-enter the geographical area before the validity timer expires.

Example Embodiment 144

The wireless terminal of Example Embodiment 143, wherein the receiver is configured to obtain from the access node the indication of when the wireless terminal is to start the validity timer.

Example Embodiment 145

The wireless terminal of Example Embodiment 143, wherein the processor circuitry is pre-configured with the indication of when the wireless terminal is to start the validity timer.

Example Embodiment 146

A wireless terminal comprising:
a receiver configured:
to receive from a first access node:
first type system information;
second type system information;
a value tag associated with the second type system information; and,
if provided by the first access node, a geographical area identifier which specifies a geographical area for which the value tag is valid, the geographical area being served by the access node and a group comprising at least one other access node;
to camp on a cell served by a second access node;
processor circuitry configured to make a first determination regarding provision by the first access node of the geographical area identifier and on the basis of the first determination to make a second determination regarding applicability of the second type system information to the cell served by the second access node.

Example Embodiment 147

The wireless terminal of Example Embodiment 146, wherein the processor circuitry makes the second determination that the second type system information is not applicable to the cell served by the second access node if the geographical area identifier is not provided by the first access node.

Example Embodiment 148

A method in a wireless terminal comprising:
receiving from a first access node:
first type system information;
second type system information;
a value tag associated with the second type system information;
a geographical area identifier which specifies a geographical area for which the value tag is valid, the geographical area being served by the access node and a group comprising at least one other access node;
camping on a cell served by a second access node;

making a determination regarding applicability of the second type system information to the cell served by the second access node at least partially in dependence on the geographical area identifier.

Example Embodiment 149

The method of Example Embodiment 148, further comprising the wireless terminal using use the second type system information received from the first access node in the cell served by the second access node when the determination indicates that the second type system information obtained from the first access node is applicable to the cell served by the second access node.

Example Embodiment 150

The method of Example Embodiment 148, further comprising the wireless terminal requesting from the second access node the second type system information for use in the cell served by the second access node when the determination indicates that the second type system information obtained from the first access node is not applicable to the cell served by the second access node.

Example Embodiment 151

The method of Example Embodiment 148, further comprising obtaining the geographical area identifier from a portion of a broadcast message which pertains to the first type system information.

Example Embodiment 152

The method of Example Embodiment 148, further comprising obtaining the geographical area identifier from a portion of a broadcast message which pertains to the identification of the second type system information.

Example Embodiment 153

The method of Example Embodiment 152, further comprising obtaining the geographical area identifier individually for at least one second type system information.

Example Embodiment 154

The method of Example Embodiment 152, further comprising obtaining the geographical area identifier in association with a group of plural second type system information.

Example Embodiment 155

The method of Example Embodiment 148, further comprising:
receiving, from the second access node, node-obtained second check information based on content of second type of system information available from the second access node;
determining terminal check information based on content of the second type of system information currently stored at the wireless terminal;
making a check information comparison of the node-obtained check information and the terminal check information; and
making the determination regarding the applicability of the second type system information to the cell served by the second access node at least partially in dependence of the check information comparison.

Example Embodiment 156

The method of Example Embodiment 148, wherein the method further comprises:
making a determination that at least a first portion of the second type system information currently stored at the wireless terminal is not applicable to the cell served by the second access node;
requesting a node-available first portion of the second type system information from the second access node;
obtaining from the second access node both the node-available first portion of the second type system information from the second access node and node-obtained second check information based on content of second type of system information available from the second access node;
determining updated terminal check information based on content of the second type of system information currently stored at the wireless terminal as updated by the node-available first portion of the second type system information;
making a check information comparison of the node-obtained check information and the updated terminal check information; and
making the further determination regarding the applicability, to the cell served by the second access node, of second type of system information currently stored at the wireless terminal as updated by the node-available first portion of the second type system information

Example Embodiment 157

The method of Example Embodiment 148, further comprising, upon making a determination that the second type system information is applicable to the cell served by the second access node:
determining terminal check information based on content of the second type of system information currently stored at the wireless terminal;
including the terminal check information in a message transmitted to the second access node.

Example Embodiment 158

The method of Example Embodiment 157, further comprising, upon receiving a response message indicating invalid check information, requesting the second type system information from the second access node.

Example Embodiment 159

The method of Example Embodiment 158, wherein the message transmitted to the second access node is a connection request message, and wherein the response message is a connection rejection message.

Example Embodiment 160

A method in a wireless terminal comprising:
receiving from an access node:
first type system information;
second type system information;
a value tag associated with the second type system information;
a geographical area identifier which specifies a geographical area for which the value tag is valid, the geographical area being served by the access node and a group comprising at least one other access node;

a validity timer value, the validity timer value specifying a time period during which the second type system information system information obtained from the first access node remains valid in the geographical area;

making a determination regarding applicability of the second type system information to a cell served by the access node at least partially in dependence on the geographical area identifier and the validity timer value.

Example Embodiment 161

The method of Example Embodiment 160, further comprising starting the validity timer upon receipt of the second type system information from the first access node, and permitting use of the second type system information should the wireless terminal exit and then re-enter the geographical area before the validity timer expires.

Example Embodiment 162

The method of Example Embodiment 160, further comprising starting the validity timer upon the wireless terminal leaving the geographical area, and permitting use of the second type system information should the wireless terminal exit subsequently re-enter the geographical area before the validity timer expires.

Example Embodiment 163

A method in a wireless terminal comprising:
receiving from a first access node:
first type system information;
second type system information;
a value tag associated with the second type system information; and,
if provided by the first access node, a geographical area identifier which specifies a geographical area for which the value tag is valid, the geographical area being served by the access node and a group comprising at least one other access node;
making a first determination regarding provision by the first access node of the geographical area identifier and on the basis of the first determination to make a second determination regarding applicability of the second type system information to a cell served by the second access node.

Although the processes and methods of the disclosed embodiments may be discussed as being implemented as a software routine, some of the method steps that are disclosed therein may be performed in hardware as well as by a processor running software. As such, the embodiments may be implemented in software as executed upon a computer system, in hardware as an application specific integrated circuit or other type of hardware implementation, or a combination of software and hardware. The software routines of the disclosed embodiments are capable of being executed on any computer operating system, and is capable of being performed using any CPU architecture. The instructions of such software are stored on non-transient computer readable media.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and/or field programmable gate array(s) (FPGA(s)), and (where appropriate) state machines capable of performing such functions.

In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and thus machine-implemented.

Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

It will be appreciated that the technology disclosed herein is directed to solving radio communications-centric issues and is necessarily rooted in computer technology and overcomes problems specifically arising in radio communications. Moreover, in at least one of its aspects the technology disclosed herein improves the functioning of the basic function of a wireless terminal and/or node itself so that, for example, the wireless terminal and/or node can operate more effectively by prudent use of radio resources.

Although the description above contains many specificities, these should not be construed as limiting the scope of the technology disclosed herein but as merely providing illustrations of some of the presently preferred embodiments of the technology disclosed herein. Thus the scope of the technology disclosed herein should be determined by the appended claims and their legal equivalents. Therefore, it will be appreciated that the scope of the technology disclosed herein fully encompasses other embodiments which may become obvious to those skilled in the art, and that the scope of the technology disclosed herein is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the technology disclosed herein, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A base station comprising:
   processor circuitry configured to generate a first type system information block (SIB) including:
      an area identifier,
      an identification of each of one or more second type system information blocks (SIBs), and
      information indicating whether or not the area identifier is associated with the identification of the each of the one or more second type SIBs;
      the first type SIB being used for transmitting minimum system information, the minimum system information comprising, at least, information required for an initial access,
   transmitter circuitry configured to transmit the first type SIB, wherein,
      the first type SIB provides a validity of a second type SIB stored in a user equipment (UE) for a cell served by the base station, based on whether or not the area identifier is associated with an identification of a corresponding second type SIB; and
      the validity of the corresponding second type SIB is only limited to the cell in case the area identifier is not presented.

2. The base station according to claim 1, wherein in a case that the area identifier is associated with the identification of the corresponding second type SIB, the corresponding second type SIB is specific to an area defined by the area identifier.

3. The base station according to claim 1, wherein in a case that the area identifier is not associated with the identification of the corresponding second type SIB, the corresponding second type SIB is cell specific.

4. A method in a base station comprising:
   generating a first type system information block (SIB) including:
      an area identifier,
      an identification of each of one or more second type system information blocks (SIBs), and
      information indicating whether or not the area identifier is associated with the identification of the each of the one or more second type SIBs;
      the first type SIB being used for transmitting minimum system information, the minimum system information comprising, at least, information required for an initial access,
   transmitting the first type SIB, wherein:
   the first type SIB provides a validity of a second type SIB stored in a user equipment (UE) for a cell served by the base station, based on whether or not the area identifier is associated with an identification of a corresponding second type SIB; and
   the validity of the corresponding second type SIB is only limited to the cell in case the area identifier is not presented.

5. The method according to claim 4, wherein in a case that the area identifier is associated with the identification of the corresponding second type SIB, the corresponding second type SIB is specific to an area defined by the area identifier.

6. The method according to claim 4, wherein in a case that the area identifier is not associated with the identification of the corresponding second type SIB, the corresponding second type SIB is cell specific.

7. A user equipment (UE) comprising:
   processor circuitry configured to camp on a cell;
   receiving circuitry configured to receive from the cell, a first type system information block (SIB) including:
      an area identifier,
      an identification of each of one or more second type system information blocks (SIBs), and
      information indicating whether or not the area identifier is associated with the identification of the each of the one or more second type SIBs;
      the first type SIB being used for transmitting minimum system information, the minimum system information comprising, at least, information required for an initial access,
      the processor circuitry configured to determine a validity of a stored second type SIB for the cell, based on whether or not the area identifier is associated with an identification of a corresponding second type SIB; and
   the validity of the corresponding second type SIB is only limited to the cell in case the area identifier is not presented.

8. The UE according to claim 7, wherein, in a case that the area identifier is associated with the identification of the corresponding second type SIB, the corresponding second type SIB is specific to an area defined by the area identifier.

9. The UE according to claim 7, wherein in a case that the area identifier is not associated with the identification of the corresponding second type SIB, the corresponding second type SIB is cell specific.

10. A method in a user equipment (UE) comprising:
    camping on a cell;
    receiving, from the cell, a first type system information block (SIB) including:
       an area identifier,
       an identification of each of one or more second type system information blocks (SIBs), and
       the first type SIB being used for transmitting minimum system information, the minimum system information comprising, at least, information required for an initial access,
    determining a validity of a stored second type SIB for the cell, based on whether or not the area identifier is associated with an identification of a corresponding second type SIB; and
    the validity of the corresponding second type SIB is only limited to the cell in case the area identifier is not presented.

11. The method according to claim 10, wherein in a case that the area identifier is associated with the identification of the corresponding second SIB, the corresponding second type SIB is specific to an area identified by the area identifier.

12. The method according to claim 10, wherein in a case that the area identifier is not associated with the identification of the corresponding second type SIB, the corresponding second type SIB is cell specific.

* * * * *